(12) United States Patent
Ho et al.

(10) Patent No.: US 10,353,224 B2
(45) Date of Patent: *Jul. 16, 2019

(54) OPTICAL SIGNAL PROCESSING DEVICES WITH HIGH DEVICE PERFORMANCES

(71) Applicant: Electronic Photonic IC Inc., Wheeling, IL (US)

(72) Inventors: Seng-Tiong Ho, Wheeling, IL (US); Yingyan Huang, Wilmette, IL (US)

(73) Assignee: Electronic Photonic IC Inc. (EPIC Inc.), Wheeling, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,391

(22) Filed: Mar. 29, 2018

(65) Prior Publication Data
US 2018/0246351 A1 Aug. 30, 2018

Related U.S. Application Data

(63) Continuation-in-part of application No. 14/894,823, filed as application No. PCT/US2014/041550 on Jun. 9, 2014, now Pat. No. 9,952,456.

(60) Provisional application No. 61/913,945, filed on Dec. 10, 2013, provisional application No. 61/833,488, filed on Jun. 11, 2013, provisional application No. 61/832,940, filed on Jun. 9, 2013.

(51) Int. Cl.
*G02F 1/017* (2006.01)
(52) U.S. Cl.
CPC .... *G02F 1/01708* (2013.01); *G02F 2202/108* (2013.01)

(58) Field of Classification Search
None
See application file for complete search history.

(56) References Cited

U.S. PATENT DOCUMENTS

| 8,462,338 B1 * | 6/2013 | Ho | H04B 10/07 356/328 |
| 9,134,553 B2 * | 9/2015 | Lim | G02F 1/025 |

(Continued)

*Primary Examiner* — Rhonda S Peace
(74) *Attorney, Agent, or Firm* — Christopher M. Scherer; DeWitt LLP

(57) ABSTRACT

Integrated active photonic device such as optical amplifiers, lasers, light emitters, photodetectors, optical modulators, optical switches, plasmonic devices, all-optical devices, and active photonic devices with high efficiency capable of very low power consumption, low optical loss, and small device size are of interest. An efficient optical waveguide structure for achieving high overlapping between the optical beam mode and the active electro-active region leads to reduced power consumption, low optical loss, and small device size. In an embodiment, low power consumption, low optical loss, and small device size are enabled by a semiconductor active photonic device structure, together with an active semiconductor material that is an electro-optic or electro-absorption or gain material, that are appropriately doped with carriers to substantially lower the power consumption and still maintain the high device performance. In another embodiment, an efficient optical coupling structure further enables low optical loss. Various embodiments combined enable the active photonic device to reach lower power consumption, lower optical loss, and smaller device size than previously possible in the prior arts.

19 Claims, 40 Drawing Sheets

(56) References Cited

U.S. PATENT DOCUMENTS

| 9,952,456 B2* | 4/2018 | Huang | G02F 1/015 |
| 2016/0109731 A1* | 4/2016 | Huang | G02F 1/015 385/3 |

* cited by examiner

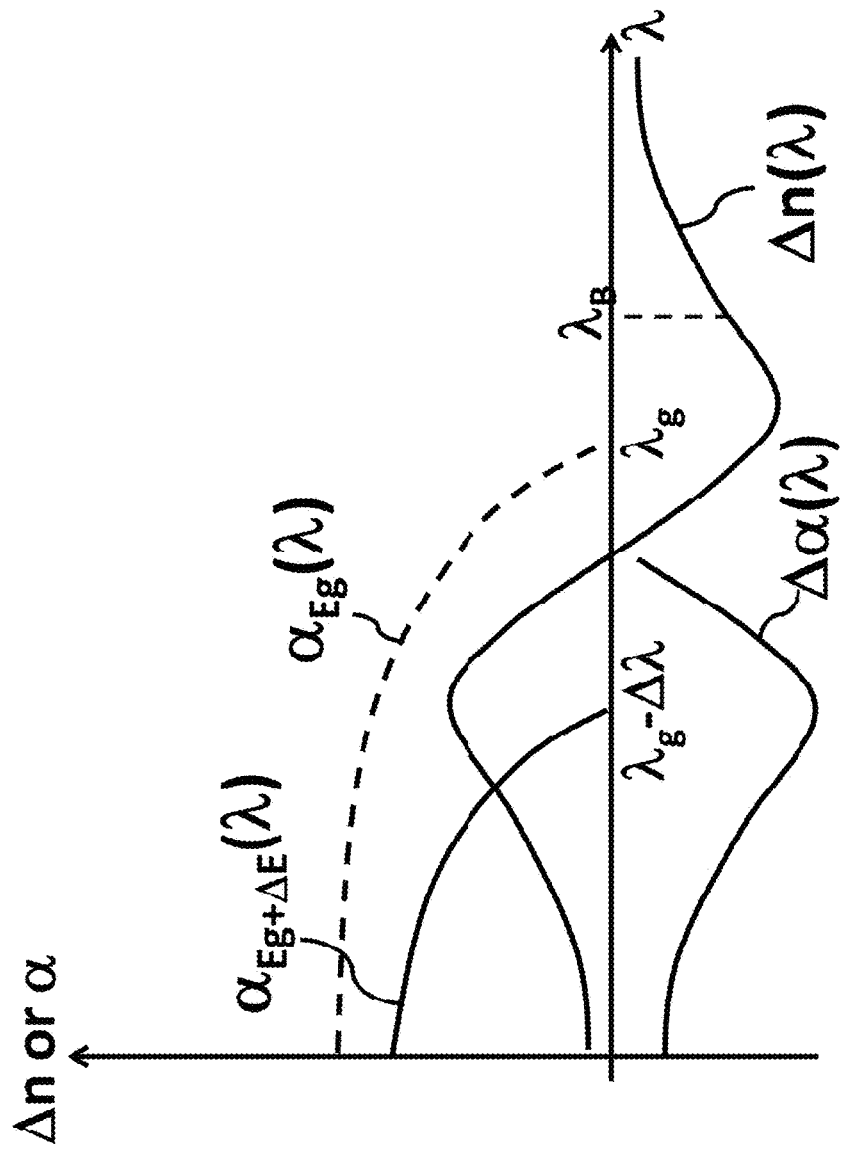

| | | | | |
|---|---|---|---|---|
| 1 n-Clad/contact | 110nm | InP | | 3x10^18 | n | 150 |
| 2 SCH | 53nm | AlGaInAs 1.3μm | | 3x10^18 | n | 123 |
| 3 Barrier | 5.5nm barrier | AlGaInAs/1.1μm/-0.8% tensile strained | | | i | 5.5 |
| 4 QWS AlInGaAs | 14x7nm barrier inside | AlGaInAs/1.1μm/-0.8% tensile strained | | | i | 98 |
| 5 | 15x6.5nm Well (PL=1350nm) | AlGaInAs/1.55μm/0.9% compressive strained | | | i | 97.5 |
| 6 Barrier | 5.5nm barrier | AlGaInAs/1.1μm/-0.8% tensile strained | | | i | 5.5 |
| 7 SCH | 100nm | AlGaInAs 1.3μm | | 1x10^18 | p | 120 |
| 8 Cladding | 1500nm | InP | | 1x10^18 | p | 1400 |
| 9 Contact | 100nm | InGaAs | | 1x10^19 | P | 100 |
| 10 Buffer | 200-300nm | InP | | 1x10^17 | p | |
| 11 Substrate | N+ | c | | | | 2000 |

Fig. 2b

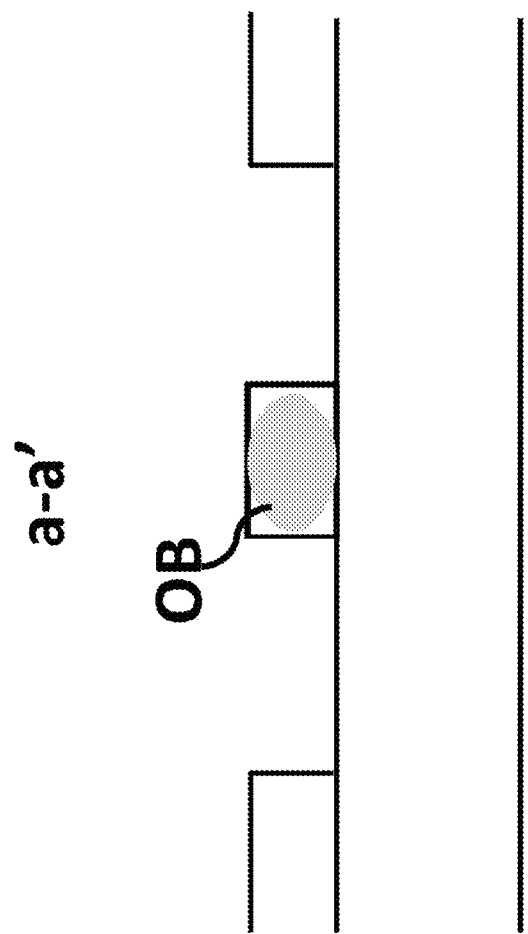

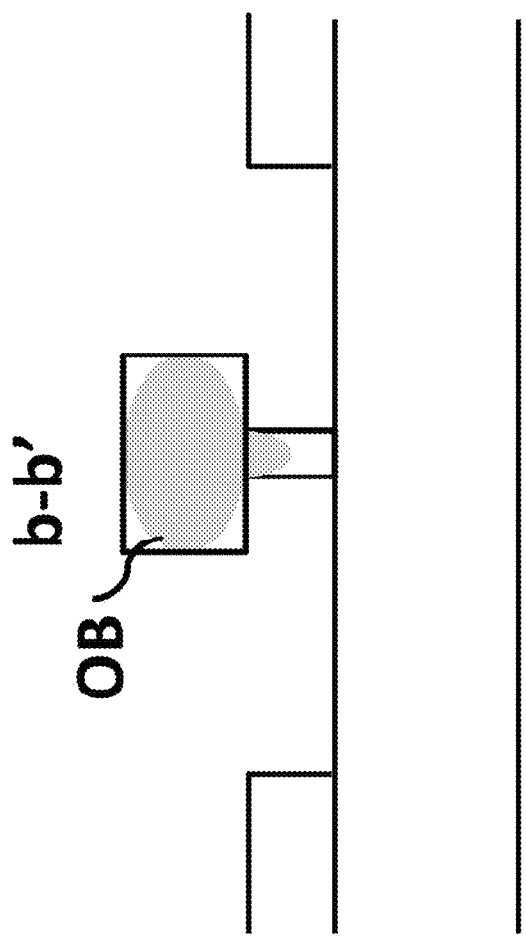

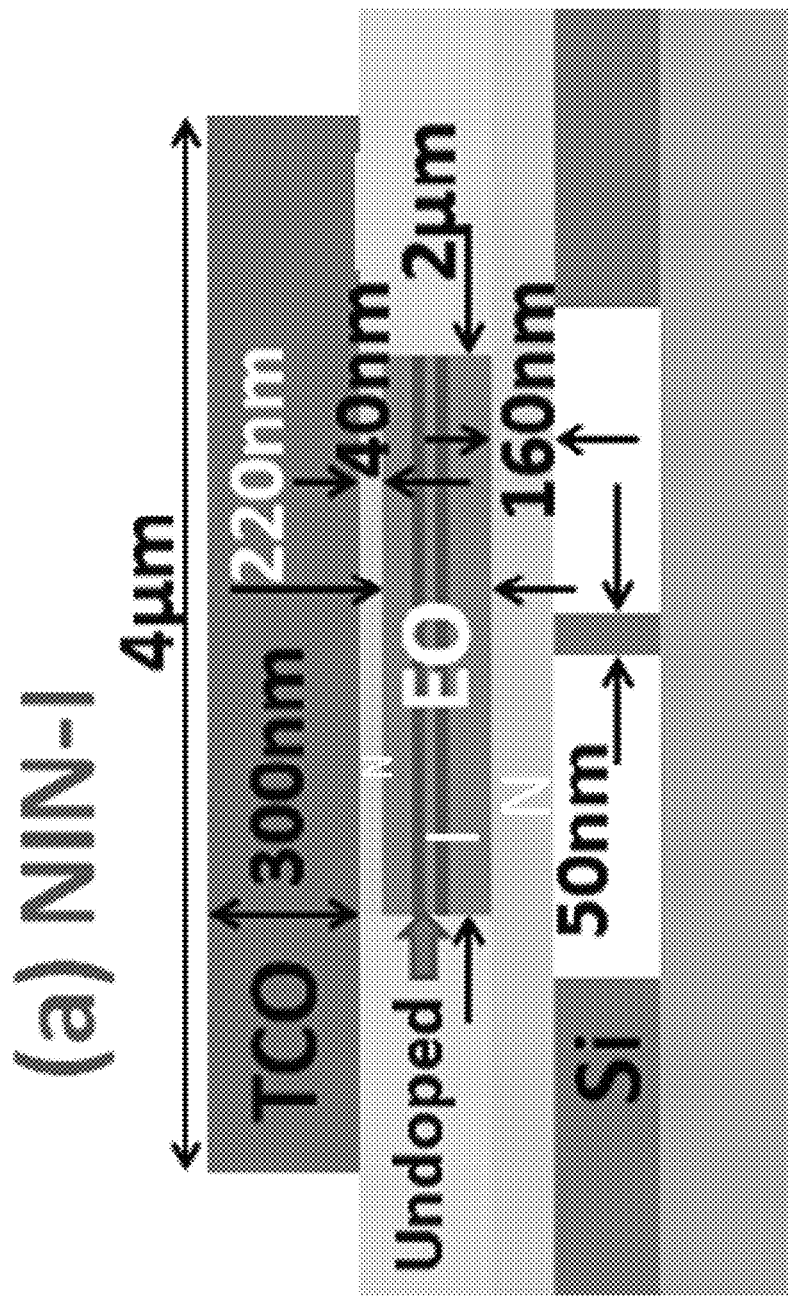

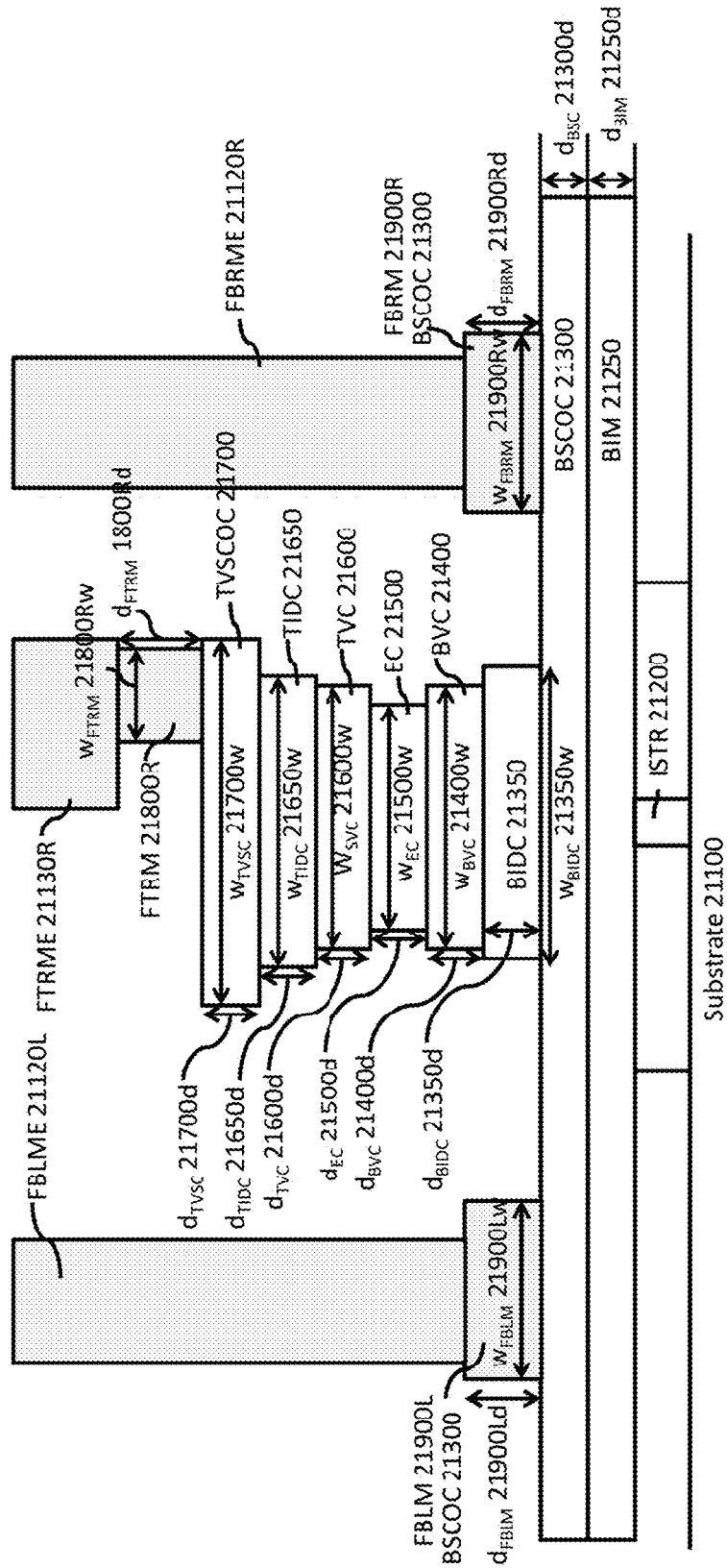

An Example of EWCoS 22600

OPTICAL SIGNAL PROCESSING DEVICES WITH HIGH DEVICE PERFORMANCES

CROSS-REFERENCES TO RELATED APPLICATIONS

The present application is a continuation-in-part of U.S. application Ser. No. 14/894,823, filed Nov. 30, 2015, which application is the U.S. national stage application of International Application No. PCT/US2014/041550, filed Jun. 9, 2014, which application published on Dec. 18, 2014, as WO2014/200920, and further claims priority to U.S. Provisional Application No. 61/832,940, filed Jun. 9, 2013; U.S. Provisional Application No. 61/833,488, filed Jun. 11, 2013; and U.S. Provisional Application No. 61/913,945, filed Dec. 10, 2013, the contents of which are incorporated herein by reference in their entireties.

BACKGROUND

The present invention relates to semiconductor photonic, discrete optic, integrated optic, and opto-electronic devices. In particular, the present invention relates to active photonic device such as an optical amplifier, laser, light-emitting device, plasmonic optical waveguide based device, photo-detector, optical intensity or phase modulator, optical switch (controlled electrically), wavelength converter, and all-optical device (including devices that are controlled optically, such as all-optical wavelength converter, all-optical switch, all-optical logic gate, and all-optical signal processing device), all of which involve optical beam interaction with an active optical gain/absorption medium in the device and all referred to collectively as active photonic devices for the purpose of this invention. These devices can be used to perform optical signal processing and are also referred to as optical signal processing devices. While they are devices that have different functionalities, they can share the same general device structure that give high device operating efficiency or high device performance. This general device structure capable of giving high device efficiency or high device performance is the focus of the present invention. Such active photonic devices are required for forming a photonic subsystem, converting electrical signals into optical signals and vice versa, and manipulating optical and electrical signals, so that the light beam can be used to transmit information over an optical communication system. The light source in an optical communication system typically involves a semiconductor laser. The transmission and propagation of light typically involves an optical fiber or optical waveguide. The receiver in an optical communication system typically involves a photodetector. Optical amplifier is typically needed to amplify the power of the optical beam to compensate the beam's power loss during beam's propagation. Active photonic devices are devices that perform functions such as optical amplification, light emission, optical detection, beam's intensity modulation, beam's phase modulation, electro-optical beam switching, all-optical beam switching, and beam's wavelength or spectral conversion, as is known to those skilled in the art. They are functions that typically require energies to be consumed (e.g. consumption of electrical or optical energy) or exchanged (e.g. exchange between optical energy and electrical energy).

The typical active photonic devices available currently such as optical amplifiers based on utilizing semiconductor quantum wells in compound semiconductors with direct energy bandgap typically have high electrical power consumption. For example, a typical optical amplifier available in the market today to amplify the power of an optical beam (at the optical wavelength of 1550 nm) requires over 100 milli-Ampere of electrical current to power up under a 2V applied voltage. This means over 200 mW of electrical power just to power an optical amplifier for the amplification of one optical beam. This power is very high especially when the optical amplifier is used in an electronic-photonic integrated circuit (EPIC) or photonic integrated circuit (PIC), as the total power consumption of a large electronic microprocessor chip with millions of transistor is only a few Watts. Viewing the optical amplifier as just one active photonic device, its power requirement is extremely high when compared to a single electronic transistor, considering the fact that the typical power consumption of an electronic transistor in a typical micro-processor-type electronic chip is in the 0.2 to 1 micro-Watt (200 to 1,000 nanoWatts) range per transistor at the operating speed of 1 GHz. Beside power consumption, it is also of interest to reduce the physical size of active photonic devices so that they are not too large comparing to the size of electronic devices. Thus, active photonic devices capable of operating with low power consumption or have small device size would be of great interest to make it compatible with CMOS circuits. Achieving low power consumption and small device size is part of the device efficiency. In addition, the device structure must have low optical losses such as due to unwanted optical absorption or scattering. Active photonic devices that have low operating power consumption, small device size, and preferably low device insertion loss are referred to collectively as high-efficiency or high-performance active photonic devices.

Advantages of the Present Invention

Let $P_{DEV}$ be the operating power of the active photonic device, meaning the minimal electrical or optical power needed to operate the device. Then it is typically desirable that $P_{DEV}$ be low or the device size be small or both. As noted, achieving low operating power consumption or small device size alone for the active photonic devices is not sufficient for these applications. The device must also have low device optical insertion loss (i.e. high optical throughput power) or high optical power transmissivity $T_{DEV}$ defined as the device's output optical power over input optical power $T_{DEV}$=(optical power output)/(optical power input). Such active photonic devices are collectively referred to as high efficiency active photonic devices (have low power consumption or small device size, and preferably low device optical insertion loss).

In the present invention, the major limitations of the prior arts are overcome, making it possible for the devices of the present invention to have lower $P_{DEV}$ or smaller device's physical size than those in the prior art while maintaining similar device optical loss or similar $T_{DEV}$ as devices in the prior art, resulting in significant advantage for the present invention over the active photonic devices based on the prior arts with comparable functionalities. When either the power consumption or device size is lower or smaller than those devices of comparable functionalities based on prior arts, we will call them collectively as high-efficiency or high-performance active photonic devices.

Exemplary Optical Amplifier in the Prior Art

An exemplary embodiment of the present invention for an active photonic device is based on utilizing the electron population inversion in semiconductor quantum wells to achieve optical power amplification (also called optical power gain) in a device commonly referred to as an optical amplifier.

In a typical semiconductor optical amplifier, an electrical current injection into the quantum wells, typically through a PN junction, is needed to achieve optical gain. This current requirement is typically high, around 100 mA to achieve an optical power gain of about 100 (20 dB) under a 2V applied voltage. This means a power consumption of about 200 mW. A large portion of this current (called transparency current) is to achieve what is well-known to those skilled in the art as optical transparency for the quantum wells involved (i.e. make the electron population to begin to be inverted or the optical loss to be zero). Another large portion of this electric current (called additional gain current) above the transparency current is to achieve the required optical power gain.

Physics of Optical Gain in Compound Semiconductor Based Optical Amplifier

Below, a material is said to be an active optical gain material if the material's optical gain can be altered by an applied voltage, an electric current, or an excitation optical beam. The active gain materials are more generally referred to as active optical amplifier material or medium.

In compound semiconductor, the energy bandgap of the compound semiconductor, whether it is bulk compound semiconductor or quantum wells, can be designed to be close to the wavelength of operation. For example, in some situation, such as in optical amplification, it is advantages to design the bandgap to be at 1550 nm for operation at 1550 nm wavelength range.

In the case of electrical excitation, the optical gain coefficient for an optical amplifier in a waveguiding configuration containing a gain medium (such as quantum wells) described by the value of an effective absorption coefficient $\alpha_{opt}$, which describes the fraction of optical power absorbed per unit beam propagation length in the waveguide (note that $\alpha_{opt}<0$ means optical gain) is given approximately in terms of the electric current injected into the gain material by equation Eq. (1):

$$\alpha_{opt} = -K_{gain}(J - J_{trans}) * A_{DEV}, \quad (1)$$

Where $A_{DEV}$ is the device electrical current or voltage conduction area from the top view (i.e. from above the substrate), $J_{trans}$ is the transparency current density (transparency current per unit area), J is the current density (current per unit area), and $K_{gain}$ is a constant. The waveguide is assumed to be propagating light in the horizontal direction (horizontal is the direction parallel to the surface of the substrate). $K_{gain}$ is dependent on the amount of overlap between the optical beam mode energy and the active medium called the mode-medium overlapping factor $\Gamma_{MOF}$ so that:

$$K_{gain} = C_{gain} * \Gamma_{MOF}, \quad (2)$$

where $C_{gain}$ is a constant. The mode-medium overlapping factor, $\Gamma_{MOF}$, typically has a value below one (or unity). The device electrical conduction area $A_{DEV}$ is typically given approximately by the device current injection (or voltage conducion) length $L_{DEV}$ multiplied by the device current injection (or voltage conduction) width $W_{DEV}$. The device size in terms of its top view cross-section is typically close to but larger than the top current/voltage conduction area $A_{DEV}$.

Various changes in optical gain or absorption, or even changes in the refractive index of the active medium layer can happen under an injection current or an applied voltage into the active medium layer, as is known to those skilled in the art. For example, an effect under an injection current is due to carrier excited to the conduction bands (from the valence bands). It is called electron population excitation. FIG. 1a illustrates the case for which the electron carriers fill up the conduction band, leading to an optical gain. As shown in FIG. 1b, this change in the optical absorption or gain spectrum of the active medium from absorption curve $\alpha_{Eg}(\lambda)$ to $\alpha_{Eg}'(\lambda)$ with negative values (negative values means achieving optical gain) will also lead to a change in the refractive index of the material $\Delta n(\lambda)$ due to what is known to those skilled in the art as the Kramer's Krognig's relation which says that a change in the absorption spectrum $\Delta\alpha(\lambda) = \alpha_{Eg}'(\lambda) - \alpha_{Eg}(\lambda)$ as a function of the wavelength ($\lambda$) must lead to a change in the spectrum for the refractive index $\Delta n(\lambda)$ as a function of the wavelength. This results in a change in the refractive index around the operating wavelength of the beam at $\lambda_B$ (say at 1550 nm) because of electron carriers excited to the semiconductor upper energy bands.

An Exemplary Optical Amplifier in Prior Art

FIG. 2 shows an optical amplifier (OA) in prior art in a waveguide geometry. The optical amplifier utilizes semiconductor quantum well as the main gain medium. Under an applied electric current, the quantum well is excited to achieve electron carrier population inversion, resulting in optical gain. For 1550 nm operation, a typical OA structure is shown in FIG. 2 showing device 10000. In device 10000, the device is fabricated on a semiconductor substrate SUB 10010. In an exemplary device substrate SUB 10010 is N-doped InP with N-type doping density of $N=3\times10^{18}/cm^3$. Above the substrate is a lower electrical Ohmic contact layer LOHC 10020. In an exemplary device LOHC 10020 is N-doped InGaAs with N-type doping density of $N=1\times10^{18}/cm^3$ and a thickness of 0.1 µm. Above the LOHC 10020 is a lower conducting waveguide cladding layer (LCWCd) 10030. In an exemplary device LCWCd 10030 is N-doped InGaAs with N-type doping density of $N=1\times10^{18}/cm^3$ and a thickness of 1.5 µm. Above the LCWCd 10030 is a lower waveguide core separate confinement heterostructure (SCH) layer (LWCoSCH) 10040. In an exemplary device LWCoSCH 10040 is N-doped InGaAlAs with energy bandgap wavelength of 1.3 µm and N-type doping density of $N=1\times10^{17}/cm^3$, a thickness of 0.1 µm. Above the LWCoSCH 10040 is an active optical gain (OG) and waveguide core layer (AOGWCo) 10050. In an exemplary device AOGWCo 10050 is comprising of 4 quantum wells (8 nm thick) and 5 barrier layers (5 nm thick) made of InGaAlAs material with no or low doping (called intrinsic semiconductor or I-type semiconductor), and a thickness of 0.182 µm. The quantum well layer is unstrained with respect to InP lattice and the barrier layer is also unstrained with respect to InP lattice. Above the AOGWCo 10050 is an upper waveguide separate confinement heterostructure (SCH) layer (UWCoSCH) 10060. In an exemplary device UWCoSCH 10060 is P-doped InGaAlAs with energy bandgap wavelength of 1.3 µm and P-type doping density of $P=1\times10^{17}/cm^3$, a thickness of 0.1 µm. Above the UWCoSCH 10060 is an upper conducting waveguide cladding layer (UCWCd) 10070. In an exemplary device UCWCd 10070 is P-doped InP with energy bandgap wavelength of 0.9 µm and P-type doping density of $P=1\times10^{18}/cm^3$, a thickness of 1.5 µm. Above the UCWCd 10070 is a upper electrical Ohmic contact layer UOHL 1080. In an exemplary device UOHC 10080 is P-doped InGaAs with P-type doping density of $P=1\times 10^{19}/cm^3$ and a thickness of 0.1 µm. Above the UOHC 10080 is an upper metal contact layer UMC 10090. In an exemplary device UMC 10090 is single or multi-layer metal denoted by layer UM1 10091, UM2 10092, UM3 10093, . . . with UM1 layer directly on top of UOHC 10080. In one exemplary embodiment, UM1 is 20 nm of Ti, UM2 is 50 nm of Pt, UM3 is 1000 nm of Au. On the lower side above the LOHC 10020 is a lower metal contact layer LMC 10100. LMC 10100 is single or multi-layer metal denoted by layer LM1 10101, LM2 10102, LM3 10103, . . . with LM1 layer directly on top of LOHC 10020. In one exemplary embodiment, LM1 is 17 nm of Au, LM2 is 17 nm of Ge, LM3 is 17 nm of Au, LM4 is 17 nm of Ni, LM5 is 1000 nm of Au.

Summary of Limitations of Prior Arts in Active Photonic Devices

Below, we summarize further the limitations of prior arts in active photonic devices by using the example of a semiconductor based optical amplifier. The typical semiconductor amplifiers have operating current of around 100 mA under 2V applied voltage (giving an operating power of around 200 mW), with device lengths of around 0.5 millimeter. The optical mode is confined by weakly-guiding structure in the vertical direction with effective mode size of 0.5-11 m and thick optical cladding of ~1.5 µm to prevent the guided optical energy from reaching the top or bottom metal electrode with high metal optical absorption loss. The waveguide core usually has quantum wells (QWs) to provide optical gain under an applied electric current. Based on such structure, compound semiconductor optical amplifiers have been achieved with use of QWs and a PIN (P-doped, Intrinsic (i.e. undoped or being an Intrinsic semiconductor material), N-doped) type structure. FIG. 3 shows the general cross-section of such a PIN optical amplifier structure, which is a general schematic of the more detailed exemplary device structure shown in FIG. 2. The optical amplifier performance gives an operating electrical power of over 200 mW.

The operating current of 100 mA can be divided into two main components: (1) transparency current that is needed to excite the active gain medium such as the quantum wells until they reach optical transparency at which the electron population begins to be inverted; (2) additional gain current, which is the current above the transparency current needed to achieve sufficient electron population inversion so as to give the required optical gain.

The operating power is usually high (over 200 mW) in prior arts partly because these conventional optical amplifier used a weakly confined waveguide structure with thick cladding of typically 1.5 micrometer thickness to avoid metal optical absorption loss. This resulted in a vertical optical mode with width of approximately 0.5 to 1 micrometer at full-width-at-half-maximum (FWHM) power points but the full optical energy is extended to 2-3 micrometer in size vertically. The percentage of the gain medium overlapping for the 40 nm thick quantum-well gain medium (assuming 4 quantum wells with 10 nm thick each) with the 1,000 nm large optical beam mode is relatively small (around 10%). This 10% is called the mode-medium overlapping factor. As a result, with the optical gain, the fraction of energy absorbed per unit length or the absorption coefficient $\alpha_{opt}$ is typically around $-0.05$/micrometer$=-0.05$/µm in which negative absorption coefficient means optical gain (note the typical bulk gain of a quantum well medium is around $-0.2$/µm, multiplied by 10% gives $\alpha_{opt}=-0.02$/µm) which means a 300-micrometer long device length will be needed to achieve an optical gain of over 100. The horizontal optical mode width for the typical weakly-guiding structure is about 3 micrometers and the mode energy extends to over 5 micrometer wide. The device area is about 500-micrometer long by 10-micrometer wide (or an area of 5000 µm$^2$). The typical transparency current density for such quantum-well gain medium is about $J_{trans}=1$ kA/cm$^2$. For an area of 5000 µm$^2$, this gives a transparency current of $I_{Trans}=1$ kA/cm$^2$*5000*10$^{-8}$ cm$^2$=50 mA. The additional gain current is another 50 mA, resulting in a total current of over 100 mA.

Due to one or more of the abovementioned reasons as illustrated via an optical amplifier in the prior art, a conventional semiconductor optical amplifier in a waveguide geometry has high operating power of over 200 mW depending on its device length and mode-medium overlapping factor. Typically 200 mW operating current is required with 0.5 mm long device to achieve an optical power gain of over 100.

In the present invention, the above limitations of the prior arts are overcome, resulting in active photonic devices such as an optical amplifier, laser, light-emitting device, plasmonic optical waveguide based device, photodetector, optical intensity or phase modulator, optical switch (controlled electrically), wavelength converter, and all-optical device (including devices that are controlled optically, such as all-optical wavelength converter, all-optical switch, all-optical logic gate, and all-optical signal processing device), all of which involve optical beam interaction with an active optical gain/absorption medium in the device, that can be operated with much lower operating power or smaller device's physical size and yet often with similar optical insertion loss than those devices in prior arts.

SUMMARY

It is an aim of the present invention to provide an active photonic device such as an optical amplifier, laser, light-emitting device, plasmonic optical waveguide based device, photodetector, optical intensity or phase modulator, optical switch (controlled electrically), wavelength converter, and all-optical device (including devices that are controlled optically, such as all-optical wavelength converter, all-optical switch, all-optical logic gate, and all-optical signal processing device), all of which involve optical beam interaction with an active optical gain/absorption medium in the device and all referred to collectively as active photonic devices for the purpose of this invention, with lower power consumption or lower optical loss or smaller device size or all of these properties combined together that are desirable in an efficient device than those based on prior arts. When the power consumption or optical loss or device size of an active photonic device is lower or smaller than those devices of comparable functionalities based on prior arts, we will call them collectively as high-efficiency or high-performance active photonic devices.

It is another aim of the invention to provide an efficient active photonic device that can be used as a device with integration possibility or as an isolated photonic device component, using either integration technology or free-space and discrete optics.

The efficient active photonic device can be constructed with discrete optical and mechanical components or can be integrated in a photonic integrated circuit (PIC) or an electronic-photonic integrated circuit (EPIC).

The present invention discloses means to realize efficient active photonic devices that will have a wide range of utilities and can be used as a device on chips including but not limited to photonic integrated circuits (PICs) or EPICs and methods of making the same.

The present invention has overcome the aforementioned limitations of the prior arts on active photonic devices. In one embodiment of the present invention involving semiconductor as the gain/absorption medium (called the active medium ACM), the limitation is overcome by utilizing structures that can greatly increase the mode-medium overlapping factor between the optical beam mode and the active gain/absorption medium. The mode-medium overlapping factor is the percentage of optical mode energy overlapping with the active medium material. It is also called the "optical mode energy to active layer overlapping factor" or "optical mode energy to active medium overlapping factor".

In the case whereby the active medium is in the form of layered structure parallel to the substrate (e.g. quantum wells), the present invention achieves this by employing substantially thinner waveguiding layer with substantially higher refractive-index contrast between the waveguide core and cladding in the vertical direction (direction perpendicular to the substrate). The high mode-medium overlapping factor increases the strength of interaction between the optical beam and the gain/absorption medium and drastically reduces the length of beam propagation needed for the active photonic device thereby reducing the device size. In the case of an electrically powered device the smaller device length reduces the injection current area $A_{DEV}$ so that less electrical current is needed to power the device thereby reducing the total operating current or operating electrical power. In the case of an optically powered device larger mode-medium overlapping factor also increases the strength of interaction between the optical powering beam (or optical power-supply beam) and the medium so that lower power is needed for the optical powering beam thereby reducing the total operating optical power.

Normally, such thin waveguiding layer can increase the device optical insertion loss as it is hard to couple light into the layer optically, especially from an optical fiber. The present invention overcomes the disadvantage and can achieve the high device efficiency (have low power consumption or small device size or low device optical insertion loss). The present invention achieves this by employing an efficient optical beam mode coupling structure to couple light between an input/output transparent waveguide to the waveguide containing the active gain/absorption medium (called up/down coupler).

In another aspect of the present invention, the up/down coupler is has low alignment sensitivity.

In another aspect of the present invention, the lateral width of the device waveguide is also reduced that further reduces the injection current area $A_{DEV}$ ($A_{DEV}$ is typically close to but smaller than the device waveguide width times the device length) so that less electrical current is needed to power the device thereby reducing the total operating current or operating electrical power. The present invention achieves this by employing substantially higher refractive-index contrast between the waveguide core and cladding in the lateral (horizontal) direction (direction parallel to the substrate).

One or more of the advantaging factors above may be employed separately or jointly and when more than one of these factors are applied jointly, they could mutually enhance each other. For example, the higher vertical mode overlapping factor may be applied by itself with the efficient mode coupling structure without applying the narrower lateral waveguide width.

An additional embodiment of the present invention is the compatibility of the active photonic device with electronic-photonic (EPIC) integrated circuit platform based on silicon-on-insulator (SOI) substrate. This embodiment is for the purpose of illustration and not limitation. For example, other types of substrate such as Gallium Arsenide (GaAs) and Indium Phosphide (InP) can be used as long as the general structural requirements of the device in the present invention are met.

In one aspect of the present invention, the low "mode energy to active medium overlapping factor" or simply called the "mode-medium overlapping factor", with the quantum wells in the prior art is overcome by eliminating the top and bottom metal contact and hence reducing the thicknesses of the top and bottom cladding layers without causing optical loss due to metal by replacing the usual metal contact with a Low-Refractive-Index Ohmic transparent conducting (LRI-OTC) material that has low optical refractive index to serve as the low-resistance electrical contact to the P-doped or N-doped semiconductor. Top and bottom is relative to the substrate. Bottom location (or layer) means location (or layer) closer to the substrate relative to top location (or layer).

In another aspect of the present invention, the low-refractive-index Ohmic transparent conducting (TCO) material is capable of achieving "Ohmic contact" by having an electron work function reasonably matched to a P-type or N-type semiconductor adjacent to the TCO material.

In another aspect of the present invention, the Low-Refractive-Index Ohmic transparent conducting material is a transparent conducting oxide (TCO) or large bandgap semiconductor with Fermi level reasonably matched to a P-type or N-type semiconductor next to it so that Ohmic contact can be achieved between the TCO and the P-type or N-type semiconductor layer.

In as yet another aspect of the present invention, the low-refractive-index Ohmic transparent conducting oxide for N-side Ohmic contact is Indium Oxide (InO), Indium Tin Oxide (ITO), Zinc Oxide (ZnO), Zinc Indium Tin Oxide (ZITO), Gallium Indium Oxide (GIO), Gallium Indium Tin Oxide (GITO), and Cadmium Oxide (CdO) or materials containing any one or more than one of these oxides.

In as yet another aspect of the present invention, the low-refractive-index Ohmic transparent conducting oxide for P-side Ohmic contact is Indium Oxide (InO), Indium Tin Oxide (ITO), Zinc Oxide (ZnO), Zinc Indium Tin Oxide (ZITO), Gallium Indium Oxide (GIO), Gallium Indium Tin Oxide (GITO), and Cadmium Oxide (CdO), or materials containing any one or more than one of these oxides.

In as yet another aspect of the present invention, the low mode-medium overlapping factor of the prior art with the quantum wells is overcome by using a side conduction structure for the top metal contact to the top P-doped or N-doped semiconductor.

In another aspect of the present invention, the difference between the refractive index in the waveguide cladding and refractive index in the waveguide core is in the very-strongly to medium-strongly waveguiding region for waveguide confinement in the direction perpendicular to the substrate.

In another aspect of the present invention, the difference between the refractive index in the waveguide cladding and refractive index in the waveguide core is in the weakly waveguiding region for waveguide confinement in the direction perpendicular to the substrate.

In another aspect of the present invention, the thickness of the central waveguide core in the active layer structure (ALS) called the electro-active waveguiding core is either in the ultra-thin or very-thin regime.

In another aspect of the present invention, the thickness of the central waveguide core in the active layer structure (ALS) called the electro-active waveguiding core is either in the ultra-thin, very-thin, or medium-thin regime.

In another aspect of the present invention, the thickness of the central waveguide core in the active layer structure (ALS) called the electro-active waveguiding core is in the thin regime.

In another aspect of the present invention, the electro-active waveguiding structure shall be in the very-strongly guiding regime, and the thickness of the electro-active waveguiding core shall either be in the ultra-thin regime or very-thin regime.

In another aspect of the present invention, the electro-active waveguiding core structure shall be in the medium-strongly guiding or very-strongly guiding regime, and the thickness of the electro-active waveguiding core shall either be in the ultra-thin regime, very-thin regime, or medium-thin regime.

In another aspect of the present invention, the electro-active waveguiding core structure shall be in the weakly guiding regime, and the thickness of the electro-active waveguiding core shall either be in the ultra-thin, very-thin, medium-thin, or thin regime.

In as yet another aspect of the present invention, the contact made by the low-refractive-index Ohmic transparent conducting material is preferably to N-doped semiconductor at both top and bottom part of the device structure, as N-doped semiconductor has lower electrical resistance than P-doped semiconductor and also has low optical absorption loss than P-doped semiconductor.

In as yet another aspect of the present invention, only one of the top and bottom contacts employs contact via low-refractive-index Ohmic transparent conducting material.

In as yet another aspect of the present invention, a pair of doped thin P-N layers serves as a hole-to-electron PN-changing PN junction or PN tunnel junction so as to change the metal contact with P-doped semiconductor to a metal contact with N-doped semiconductor, which enables drastic reduction in the Ohmic contact resistance as N-doped semiconductor is easier to achieve low Ohmic contact resistance.

In as yet another aspect of the present invention, the low mode-medium overlapping factor of the prior art with the quantum wells is overcome by using a side conduction structure for the top metal contact to the top P-doped or N-doped semiconductor. The side conduction geometry enables the waveguiding layer to be thin giving high mode-medium overlapping factor and yet maintaining low optical loss as the optical beam energy will not touch the optically lossy metal that is already moved to the side. Often the top cladding in such thin waveguide structure can be made to be either air or some low-refractive-index dielectric material. In as yet another aspect of the present invention, the metal is deposited on both sides of the contact with as large an area as possible to reduce the Ohmic contact resistance. The side conducting layer is highly doped to reduce side conduction resistance but not so highly doped as to cause excessive optical absorption loss due to free carriers.

In as yet another aspect of the present invention, the top side conduction structure is preferably N-doped semiconductor with lower electrical resistance than P-doped semiconductor and also has low optical absorption loss than P-doped semiconductor.

In as yet another aspect of the present invention, the low mode-medium overlapping factor of the prior art with the quantum wells is overcome by using a side conduction structure for the bottom metal contact to the bottom P-doped or N-doped semiconductor. The side conduction geometry enables the waveguiding layer to be thin giving high mode-medium overlapping factor and yet maintaining low optical loss as the optical beam energy will not touch the optically lossy metal that is already moved to the side. Often the bottom cladding in such thin waveguide structure can be made to be either air or some low-refractive-index dielectric material.

In as yet another aspect of the present invention, the bottom side conduction structure is preferably N-doped semiconductor with lower electrical resistance than P-doped semiconductor and also has low optical absorption loss than P-doped semiconductor.

In as yet another aspect of the present invention, both the top and bottom side conduction structure is preferably N-doped semiconductor with lower electrical resistance than P-doped semiconductor and also has low optical absorption loss than P-doped semiconductor.

In as yet another aspect of the present invention, only one of the top and bottom contacts employs side conduction structure.

In as yet another aspect of the present invention, the side conduction structure includes a top transparent dielectric region over which and on both sides are deposited with metal for mechanical robustness.

In as yet another aspect of the present invention, a top transparent dielectric region acts as a lateral confining rib waveguiding structure.

In as yet another aspect of the present invention, a bottom transparent dielectric region acts as a lateral confining rib waveguiding structure.

In as yet another aspect of the present invention, a center dielectric region acts as a lateral confining rib waveguiding structure.

In as yet another aspect of the present invention, a wide top contact region acts to reduce the device contact resistance and conduction resistance, and together with the top metal side contact structure, acts to increase the optical mode energy overlapping with the active medium.

In as yet another aspect of the present invention, a waveguiding structure acts to propagate the optical beam into the active photonic device structure and avoid the extension of the highly doped quantum wells or bulk material to the transparent waveguiding region, thereby reducing the beam propagation length through the quantum wells or bulk material region that has high optical absorption. This reduces the total optical beam absorption loss through the active photonic device.

In as yet another aspect of the present invention, the waveguiding structure tapers down to a width smaller than a wavelength in the waveguiding material so as to strongly push the mode away from the lower transparent waveguiding structure towards the quantum wells or bulk material, thereby increasing the optical mode energy overlapping with the quantum wells or bulk material.

In another aspect of the present invention, the gain and absorption is altered by depleting carrier from or injecting carrier to the active medium region. This injection or depletion can be achieved by an electrical current, and applied voltage, or an optical beam (called optical power supply beam).

In one aspect of the present invention, this carrier depletion or injection is from or to one or more quantum wells in the waveguiding beam energy area.

In one aspect of the present invention, this carrier depletion or injection is from or to bulk semiconductor material in the waveguiding beam energy area.

In another aspect of the present invention, the active medium is made up of compound semiconductor in which the material composition is chosen to result in an energy bandgap reasonably close to the optical wavelength of operation to result in high enough interaction strength between the gain/absorption medium or the electro-active layer and the optical beam.

In another aspect of the present invention, the energy bandgap of the active medium is less than 30% of the photon energy away from the photon energy of operation.

In as yet another aspect of the present invention, the active material (ACM) can be formed by non III-V materials such as silicon-germanium (SiGe) quantum wells or SiGe bulk materials.

In as yet another aspect of the present invention, the active medium (ACM) has high-level doped carrier density with P-type or N-type doping and a doping density higher than $2 \times 10^{17}/cm^3$ and lower than $5 \times 10^{17}/cm^3$.

In as yet another aspect of the present invention, the quantum wells have medium-high-level doped carrier density with P-type or N-type doping and a doping density higher than or equal to $5 \times 10^{17}/cm^3$ and lower than $1.5 \times 10^{18}/cm^3$.

In as yet another aspect of the present invention, the quantum wells have very-high-level doped carrier density with P-type or N-type doping and a doping density higher than or equal to $1.5 \times 10^{18}/cm^3$ and lower than $5 \times 10^{18}/cm^3$.

In as yet another aspect of the present invention, the quantum wells have ultra-high-level doped carrier density with P-type or N-type doping and a doping density higher than or equal to $5 \times 10^{18}/cm^3$.

In as yet another aspect of the present invention, the quantum wells can be strained, unstrained, double-well, or multi-well quantum wells.

In as yet another aspect of the present invention, the active layer structure (ALS), including the electro-active layer (ECL) will be largely made of material layers that are undoped or are intrinsic semiconductor materials for application to all-optical devices (for example, optical wavelength converter, all-optical switch, all-optical logic gate, optically-pumped device, and all-optical signal processing device).

In as yet another aspect of the present invention, highly strained quantum wells are used to achieve higher device efficiency or performance. The higher mode-overlapping factor achieved in these structures enables fewer quantum wells to be used and yet still can achieve the same or higher optical gain/absorption. The use of fewer quantum wells will reduce the transparency pumping current. Moreover, the use of fewer quantum wells will enable quantum wells with higher material strain to be used. High strained quantum wells have even lower transparency pumping current and higher material gain (for the same electric current injected), which will significantly lower the power consumption of the device with the same optical gain/absorption performances (transparency pumping current is to achieve zero gain or material transparency before net optical gain can be achieved, and hence is a resting or quiescent electric current or power that gives the baseline power consumption).

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 1b is a diagram showing a change in the "absorption energy edge" from absorption curve $\alpha_{Eg}(\lambda)$ to $\alpha_{Eg+\Delta E}(\lambda)$ leads to a change in the refractive index of the material Δn(λ).

FIG. 2a and FIG. 2b are diagrams showing an optical amplifier (OA) of prior art. In particular an optical amplifier made of III-V compound semiconductor material.

FIG. 4b is an exemplary schematic for a cross-section of the input waveguide region. The region occupied by the optical beam (OB) is shown as a shaded region.

FIG. 4c is an exemplary schematic for a cross-section of IBCS region or OBCS region. The region occupied by optical beam (OB) is shown as a shaded region.

FIGS. 9a, 9b, 9c and 9d is a diagram showing the details structures for an exemplary NIN active device.

FIG. 11b is a semi-transparent illustration of FIG. 11a.

FIG. 13a show the input beam coupler structure (IBCS) comprises at least a tapering waveguide section generally tapering from wide to narrow. Optionally, the active layer structure ALS on top of the input tapering waveguide section can also be tapering in the form of an up taper (tapering from narrow to wide in the direction toward the active layer structure ALS). See for example FIG. 13b.

FIGS. 14a, 14b, and 14c show diagrams illustrating a few exemplary cases for the top metal contact pad placements.

Skilled artisans will appreciate that the elements in the figures are illustrated for simplicity and clarity, and have not necessarily been drawn to scale. For example, the dimensions of some of the elements in the figures may be exaggerated, relative to the other elements, to help in improving understanding of the embodiments of the present invention.

DETAILED DESCRIPTION

Motivations of the Present Invention

There are various needs for low-power-consumption or low optical loss or compact active photonic devices for various applications. The active photonic devices in the present invention are capable of Low Power consumption or low optical loss or Smaller Device Size than those devices in prior arts with comparable functionalities. In addition, they are compact, can be integrated on mass-producible silicon-photonic platform with EPIC (electronic-photonic integrated circuit) capability enabling future expansions to integrate with RF circuits or other photonic devices on chip.

Needs for Compact Active Photonic Devices

New applications in communications and sensing require transmission of high-frequency electronic signals. Transmission of ultra-fast digital data over optical fiber system is also important for next generation data centers. In order to address such needs, active photonic devices that are capable of ultra-low operating power consumption or low device optical insertion loss or compact device size. Prior arts in active photonic devices are not able to realize such devices. For example, the commonly available semiconductor optical amplifiers in the market have power consumption over 200 mW, that is high comparing to that of typical electronic transistors.

The present invention described below will utilized a few key factors combined to fully address the abovementioned problems resulting in lower power consumption or smaller device size for the active photonic devices typically over 5 times lower or smaller than those devices of comparable functionalities based on prior arts. The typical active photonic devices utilizing the embodiments in the present invention may thus be referred to as very-high-efficiency active photonic devices.

Broad Overview of the Present Invention

Figure 1A:
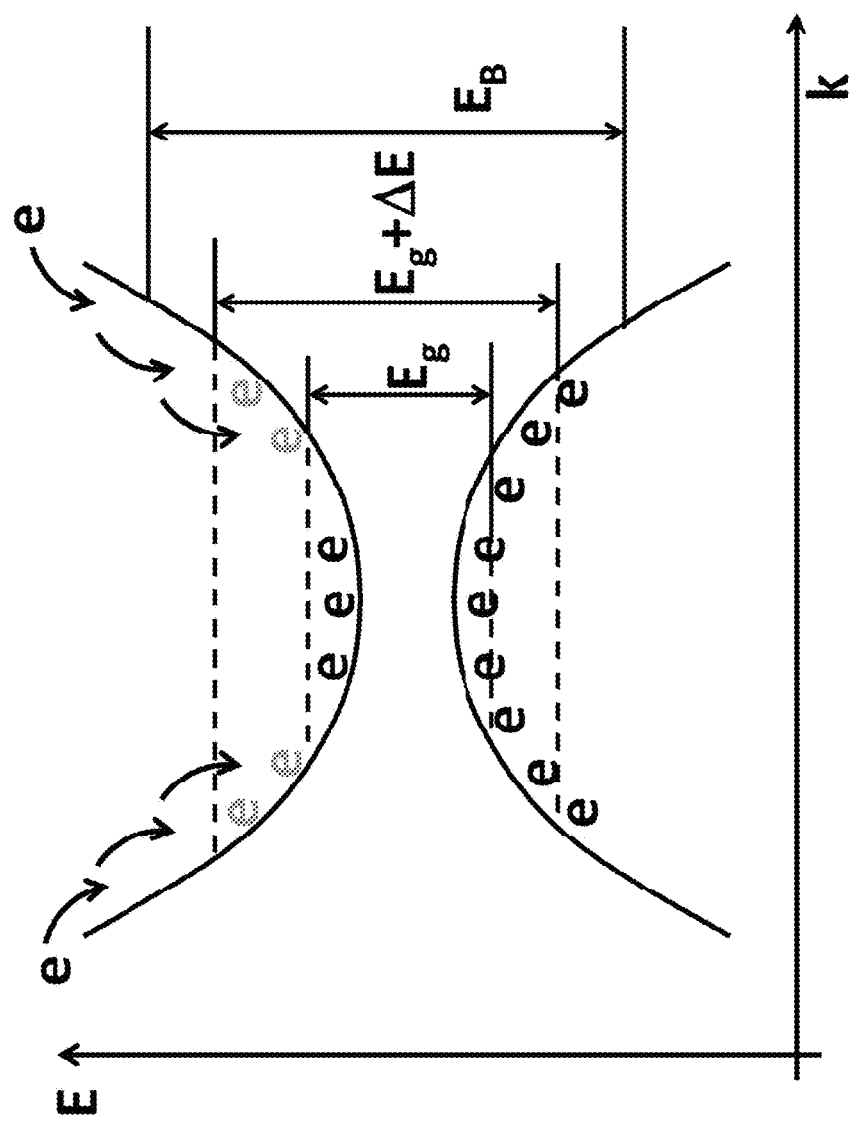
FIG. 1a is a diagram illustrating the case for which the electron carriers fill up the conduction band, leading to a shift in the absorption energy from close to the bandgap energy Eg to larger than the bandgap energy Eg+ΔE (or in wavelength λg-Δλ)
Figure 2A:
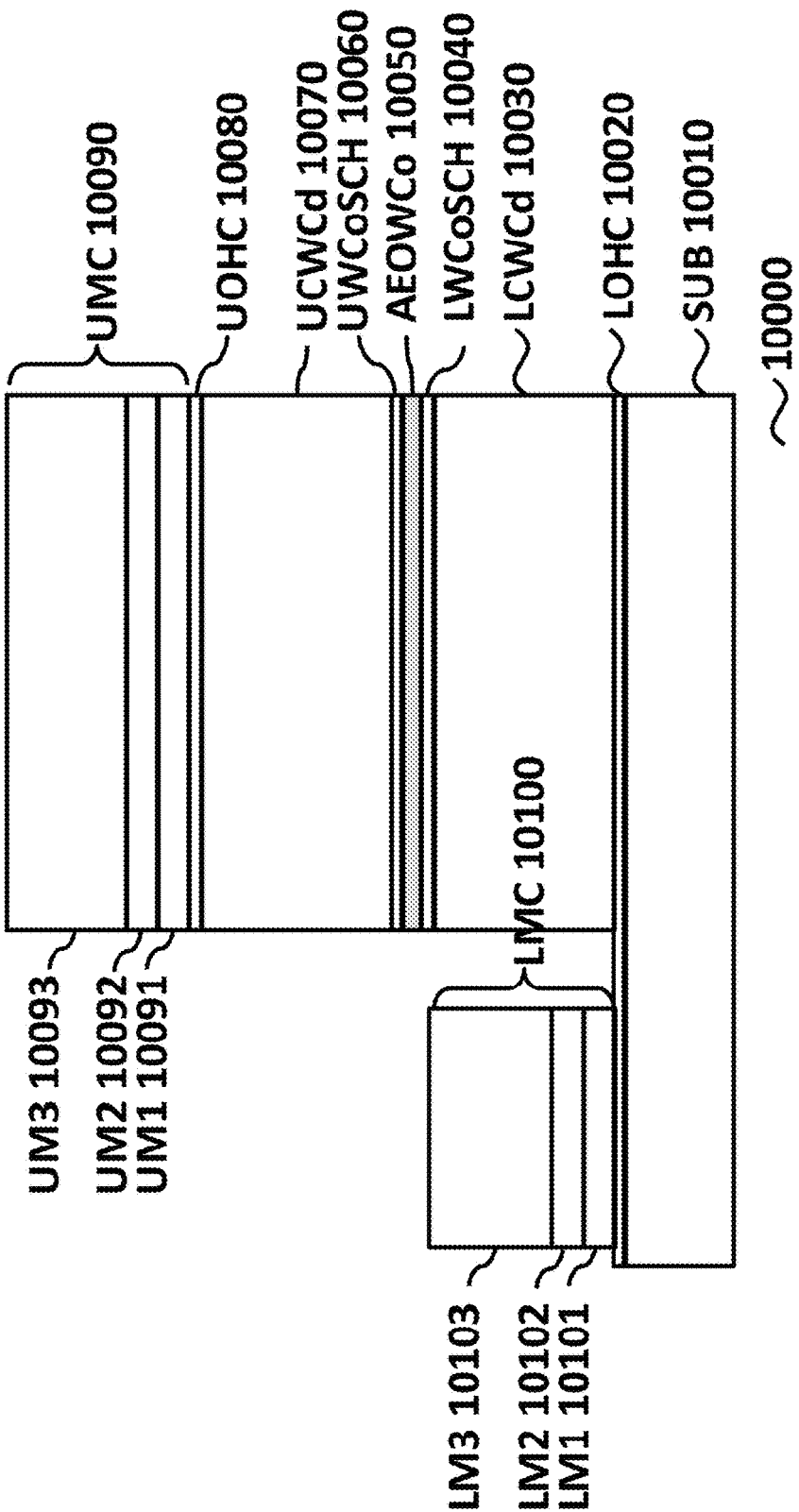
Figure 3:
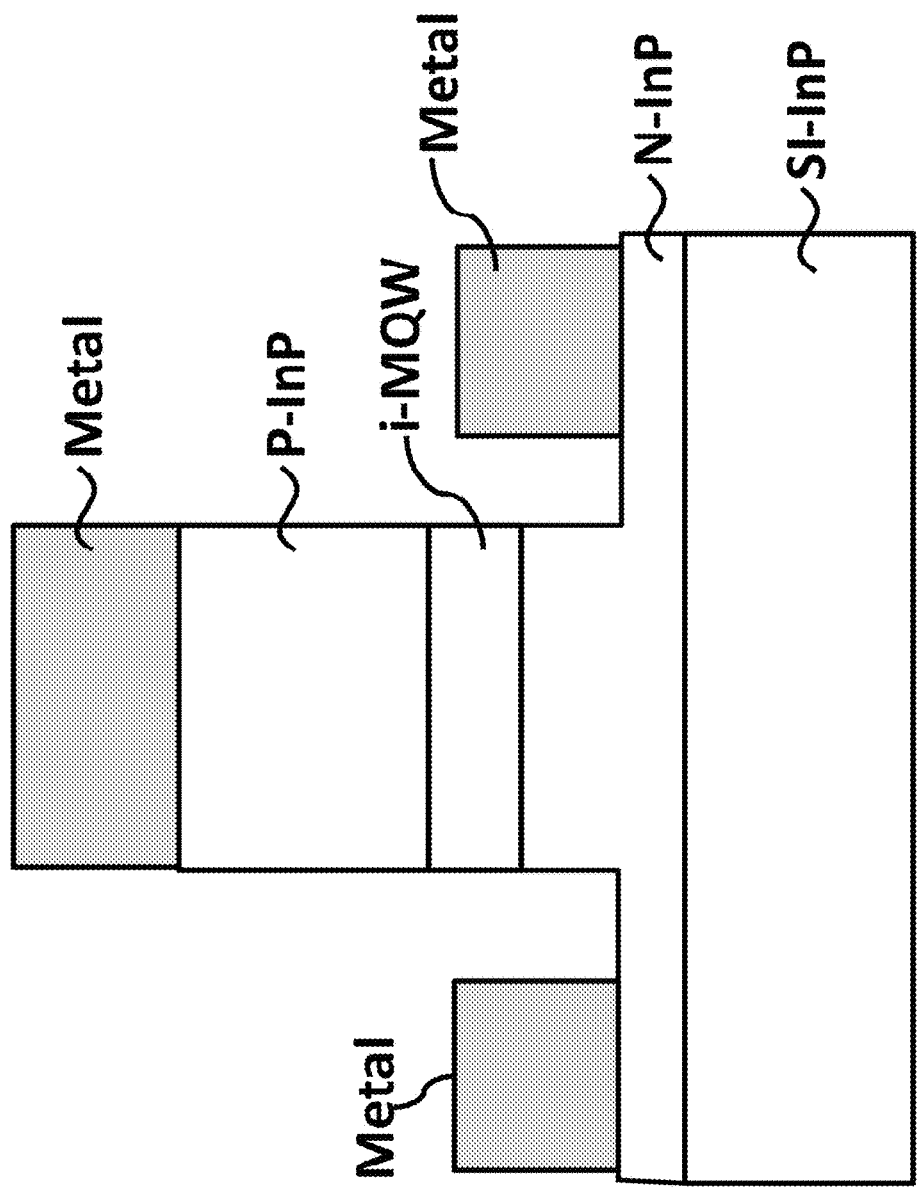
FIG. 3 is a diagram illustrating the cross-section of the PIN optical amplifier structure.
Figure 4A:
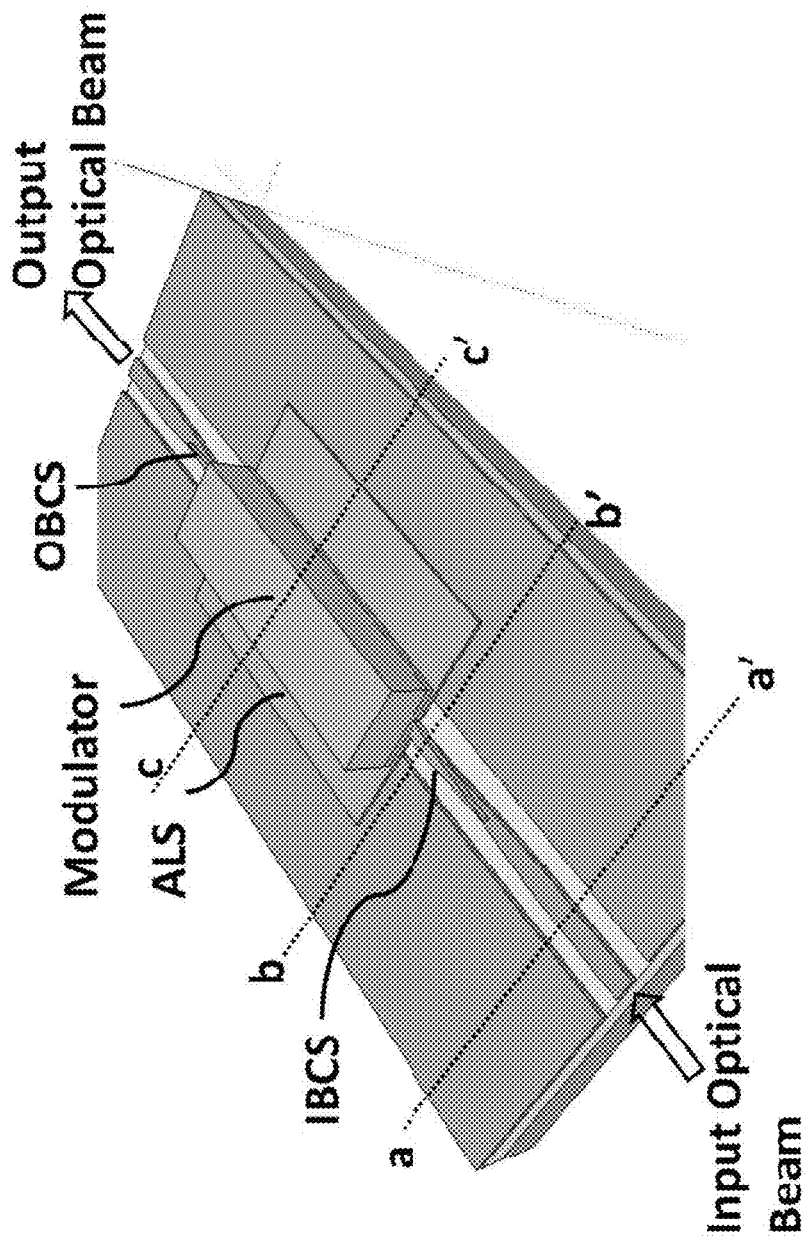
FIG. 4a is a diagram showing the location of the "input beam coupler structure (IBCS)", the "Active Layer structure (ALS)", and the "output beam coupler structure (OBCS)"

An active photonic device can be divided into a few key components composing the device. An input optical beam must be channeled to the device's active material medium layer efficiently without too much loss of the beam's optical power. In conventional active photonic device, this is just done by joining input waveguide to the device waveguide. In the active photonic devices of the present invention, due to the small optical mode in the active photonic device, in one exemplary embodiment, this input structure is an integral part of the active photonic devices of the present invention. We call this the "device input beam coupler structure (IBCS)". A diagram illustrating such IBCS is shown in FIG. 4.

The device input beam coupler structure brings the optical beam from a waveguide into the device's main waveguide that contains the active material medium. An active material medium in the present invention is a gain or absorption material whose optical properties can be altered by an applied electric field or electrical current. The optical properties generally include optical gain, optical absorption, and optical refractive index. The active medium plus the immediately connected structure next to it for applying the required electric field or introducing the required current is called the electro-active layer (ECL).

Figure 4D:
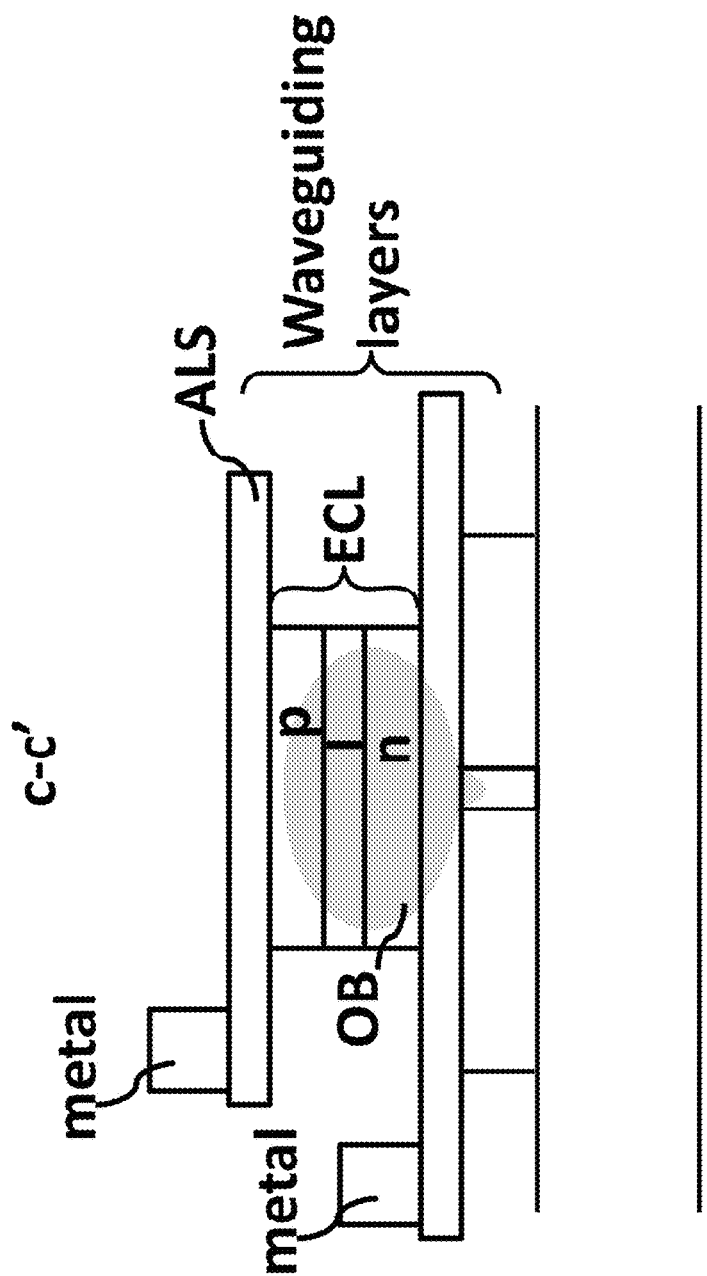
FIG. 4d is an exemplary schematic for a cross-section of ALS region showing the active material (ACM) layer, the electro-active layer (ECL), and the waveguiding layers. The region occupied by the optical beam (OB) is shown as a shaded region.

A most commonly used structure immediately connected to and next to the active material for applying the required electric field or introducing the required current is a PIN structure, meaning that the electrical conduction to the active material is with a P-doped semiconductor followed by an intrinsic ("I") semiconductor, and then followed by another N-doped semiconductor. An exemplary schematic for such PIN structure is shown by FIG. 4d. The active medium is typically in the I layer but can also be in any of the P or N layer, including the transition region between the I and any of the P and N layer, or in plurality of these layers. The active medium can be the layer itself, or a quantum-well structure, or other active-medium structure embedded in the layer. Most commonly, the active material is quantum wells in the intrinsic layer. Most active photonic devices with such PIN structure and quantum wells in the intrinsic layer as the electro-active layer operates under a forward bias to such a PIN structure (with positive voltage applied to P side and negative voltage applied to the N side). Forward bias brings a strong current to the active material. The electric current acting on the quantum well then changes its optical gain or absorption (or refractive index) at the beam's optical wavelength. In some situation, an active photonic device can operate with a reverse bias applied to such PIN structure (with negative voltage applied to P side and positive voltage applied to the N side), which can create a strong electric field at the active material such as the quantum wells though there will not be much of an electrical current to the active material. The strong electric field can also change the absorption and refractive index of the active material such as the quantum wells. It can also sweep away excited carriers generated at the quantum wells by say an optical beam. Typically, active photonic devices based on reverse bias are used in optical modulating or optical beam switching devices (i.e. in optical modulators or switches), and also in photodetectors.

For devices with, for example PIN junction or the like, the Electro-Active layer (ECL) will be the active material and the immediate P and N doped regions or the like.

An exemplary schematic for such ECL with a PIN structure and the active material (ACM) layer is shown by FIG. 4d.

In addition, a more extensive electrical conduction structure is integrated with the electro-active layer and a waveguiding structure so that an electric field or electrical current can be brought into the electro-active layer encompassing the active material, and at the same time the waveguiding structure will guide an optical beam so that part of its beam power overlaps with the active material. This enables the optical beam to interact with the active material.

The entire larger structure is called the active layer structure (or ALS) below. In short, the entire structure comprising: (1) the waveguiding layers; (2) the Electro-Active layers; and (3) the other electrical conduction layers, is called the active layer structure (ALS) of the devices in the present invention. An exemplary schematic for such ALS is shown by FIG. 4d. In many situations, part of the Electro-Active layer or part of the other electrical conduction layers also serve the double function as part of the waveguiding layers. Thus, each these layers often by itself, serves as multiple-function layer.

The optical waveguide in the ALS is called active waveguide, so as to distinguish it from the input and output waveguides that have no active material. In another exemplary embodiment, the present invention is concerning on the specific structure of the active layer structure independent of the input and output mode coupling structures. The location of such ALS layer is shown in FIG. 4.

At the output, we have a "device output beam coupler structure (OBCS)" that couples the optical beam efficiently from the device active layer structure into a primarily passive output optical waveguide. Passive in this context means the waveguide acts primarily to transmit the optical beam energy. Primarily passive means it can also be active (e.g. with optical gain, absorption, or modulation) but for the purpose of this invention, the passive beam transmission function is the function utilized. In as yet another exemplary embodiment, this output structure is an integral part of the device of the present invention. The location of such OBCS is shown in FIG. 4. The cross section of OBCS is similar to that of IBCS, An exemplary schematic for the cross-section of such OBCS region is similar to that of IBCS and is shown by FIG. 4c. The region occupied by the optical beam (OB) is shown as a shaded region.

For the purpose of illustration but not limitation, it is useful to provide an overview of exemplary active devices employing the present invention. The Active-Layer Structure in an exemplary device of the present invention could make use of up to six main key elements, namely: (1) The use of an efficient coupling waveguide platform (EC-WG); (2) Low-Optical-Loss Ohmic Contact (LOL-OC), such as the use of transparent conductor and side conduction geometry, (3) Low-Optical-Loss and High Electrical Conductivity Waveguide Structure (LOL-HEC-WS) such as the use of PN-changing PN junction or PN tunnel junction to reduce the region with P-doping, (4) High-Response Active Material, such as material that has high optical gain or electro-optic (EO) or electro-absorption (EA) response under applied voltage, an electric current, or either injection or depletion of carriers (HR-AM); in an exemplary embodiment of the present invention, this is achieved with appropriately high carrier doping in quantum wells; in another exemplary embodiment, this is achieved with highly strained quantum wells, and (5) Highly-Confined Thin-Film Electro-Active Waveguide (TF-ECW), so as to increase the amount of overlapping between the optical mode energy and the active material.

To summarize these few advantages, the devices of the present invention encompass one or more of the above five main key elements, including the advantages in Beam input/output Coupling Waveguide, Ohmic Contact, Waveguide Conductive Structure, Active Layer, and Strongly Confined Thin-Film Active Waveguide. For general references, optoelectronic or photonic device structures that take advantage of a few of the above five main factors will be generally referred to as WOCAT device structures. The WOCAT device structures have applications to optical amplifier, photodetector, laser, light-emitting device, optical switching and logic device, optical modulators and optical signal processing device.

As an exemplary embodiment, for the purpose of illustration and not limitation, the devices of the present invention are capable of achieving the significant advantages of very-low-power-consumption, short device length, or low optical loss, or a plurality of the above. As an exemplary illustration but not limitation, such an active photonic device could make use of one or more the following few key factors in its structure.

Key Factor I: Low Voltage Via Strong Mode Confinement

For the purpose of discussion and not limitation, for an operating optical wavelength of 1550 nm, an exemplary approach will be based on InP/InAlGaAs material system (called simply as InP/III-V). When used as 1550 nm active photonic device material, the InP/III-V material system will involve quantum wells (QWs) at 1500 nm wavelength range that is close enough to the 1550 nm operation wavelength to give high interaction strength between the optical beam and the active medium In order to achieve very low operating power consumption, one way is to make the optical mode confinement a lot tighter. This will enable high mode-medium overlapping factor, which will increase the strength of interaction between the optical beam and the active medium. In that case, the device length can be shorter leading to smaller device electrical conduction area $A_{DEV}$. This reduces the total current needed to operate and hence the total power consumption of the device.

For a conventional semiconductor active photonic device, the vertical mode size (FWHM) is about 0.5 µm to 1 µm. With high-refractive-index-contract material using semiconductor with high refractive index (n~3 to 4) as the waveguide core surrounded by air, dielectric material, or polymer with low refractive index of n~1 to 2 as waveguide cladding, it is possible to reduce the vertical mode size by about 2.5 times to 10 times to ~0.1-0.2 µm (at λ=1550 nm). For example, using the high refractive index of III-V semiconductor with n~3.5 as the waveguide core and air as cladding will result in a single-mode strongly confined waveguide physical height of about 0.2 µm, given by $d_{SM} \sim \lambda/(2n) = 1500$ nm/(2*3.5)=0.214 µm. This gives a vertical mode size of ~0.1 µm, which is a 5 to 10 times reduction in mode size or 5 to 10 times increase in the mode-medium overlapping factor. The 5 to 10 times higher mode-medium overlapping factor will increase the interaction strength between the optical beam and the active medium or the device length can be reduced by 5-10 times. This results in 5-10 times reduction in the device current or the device power consumption. It also results in 5-10 times smaller device size.

For the purpose of illustrations and not limitations, unless otherwise stated, all the dimensional numbers such as mode size and structural sizes given in this invention assume that the operating optical wavelength is around the wavelength of 1550 nm. As is well known to those skilled in the arts, all these dimensions will scale proportionally when operating at other wavelength so that if the operating wavelength is at around 750 nm, all the physical dimensions will be about half of that given for the 1550 nm wavelength case. This invention is applicable to all other wavelengths and is not limited to the exemplary operating wavelength of 1550 nm.

Key Factor II: Efficient Coupling into Strongly-Confined Waveguide

In the present invention, the vertical mode confinement is reduced to <0.2-0.3 µm. A challenge is how to achieve efficient optical beam coupling to the sub-micrometer waveguide. We will solve this problem using tapered waveguide that can be fabricated on a substrate and the ALS thin film on top of it can be attached via wafer bonding method or other methods after the waveguide is fabricated. Such tapered waveguide coupling structure can achieve over 90-95% optical power coupling efficiency.

Key Factor III: High Device Performance Via Low Ohmic Contact Resistance & Low-Optical-Loss High-Conductivity Waveguide Structure; and Doped Active Medium.

To enable electrical current injection and voltage conduction into the active devices with strong optical mode confinement, as an exemplary embodiment in the present invention, a transparent conducting (TC) material that has low refractive index and yet can achieve excellent Ohmic contact with N-doped InP semiconductor material with very low contact resistance is used. We call these Ohmic Transparent Conducting (OmTC) materials. These TC materials are typically metal oxides ($In_2O_3$, ZnO, InSnO, CdO, ZnInSnO, InGaO, etc) or doped metal oxides (e.g. the above listed metal oxides doped with magnesium Mg or zinc Zn etc), for which the most familiar one is ITO (Indium Tin Oxide; InSnO) used widely in LCD display. They are called transparent conducting oxides (TCO). For example, with appropriate processes, it is possible to achieve good Ohmic contact between $In_2O_3$ or CdO and N-doped InP. We will call these Ohmic TCO (OmTCO). OmTCO will enable robust electrical structures to be realized that also has high mode confinement.

Alternatively, we can use a side conduction layer (SCL) to bring the voltage into the top layer for the active photonic devices. The side conduction geometry enables the waveguiding layer to be thin giving high mode-medium overlapping factor and yet maintaining low optical loss as the optical beam energy will not touch the optically lossy metal that is already moved to the side. Often the top cladding in such thin waveguide structure can be made to be either air or some low-refractive-index dielectric material.

Both OmTCO or SCL can be used for the top contact. When the structure is thin, comparing to SCL the use of OmTCO for top contact has an advantage in terms of ease in fabrication and also potentially better device performances as the metal contact area can be larger.

Part of power dissipation is in the series resistance in a device. It turns out that the high contact resistance for the p-doped material with metal, that is the high P-Ohmic contact resistance, is a main problem that gives high power consumption. P-Ohmic contact typically has 10 times higher resistance than N-Ohmic contact (with their respective appropriate Ohmic-contact metals that can give reasonably low contact resistance).

It turns out that the high contact resistance for the p-doped material with metal, that is the high P-Ohmic contact resistance with metal, is also a main problem that limits device's higher frequency performance for certain devices (e.g. in photodectors or modulators).

We note that at the same dopant density, the P-doped cladding layer typically also has about 10 times higher resistance than if it is N-doped. While the cladding resistance is typically smaller than the P-Ohmic contact resistance especially since the active-layer structure is thin, the P-doped cladding can cause radio-frequency (RF) loss when a high-frequency changing voltage pulse (or electrical signal) propagates along the device structure. In terms of free-carrier optical absorption, at the same dopant density, the P-doped cladding layer is also about 10 times higher than N-doped. If one reduces the P-doped cladding resistance by increasing the carrier doping density, one will also increase the optical loss, making it hard to achieve efficient devices.

Thus, in some active device applications, it is important to reduce the P-Ohmic contact and cladding resistance by changing them to N-contact and N-doped cladding instead. A few exemplary structures can do so. These structures are broadly classified as alternative Electro-Active Layer Structure A and B discussed below.

Alternative Electro-Active Layer Structure A: NIN Structure

Besides the usual PIN structure noted above that can be used as the electro-active layer structure in the ALS, there are other alternative electro-active layer in the ALS structures that may have certain advantages. First is the use of an NIN electro-active layer in the ALS structure, meaning that the electrical conduction to the active medium is with an N-doped semiconductor followed by an intrinsic ("I") semiconductor, and then followed by another N-doped semiconductor. The active medium is typically in the I layer but can also be in any of the two N layers, including the transition region between the I and any of the two N layers, or in plurality of these layers. The active medium can be the layer itself, or a quantum-well structure, or other active-medium structure embedded in the electro-active layer.

In the situation whereby the active photonic devices in the present invention requires largely only electric field to be applied to the active medium to affect the refractive index or optical absorption (or optical gain) of the active medium, it is appropriate to use such a NIN structure as the active layer.

Comparing to the use of the conventional PIN structure, such NIN structure will reduce the Ohmic contact resistance by 10 times as both sides of the metal contacts will be contacting to N-doped layers only. Note that in NIN, sometime a thin P-doped layer is introduced so that it forms NPIN, where the P-layer helps to block the electric current. the "NIN" here broadly includes NPIN. In certain applications such as direct high-frequency modulation of lasers or high-frequency photodectors, it is also desirable to reduce the series capacitance loading of the device. In the intrinsic layer, when appropriate, quantum wells (QWs) can be introduced to enhance the gain/absorption medium interaction with the optical beam. The capacitance is mainly determined by the lateral width of the "junction capacitance region", called modulator-capacitor lateral width (labeled as $w_{CAP}$ or $w_{EC}$) below. Lateral is in a direction perpendicular to the direction of optical beam propagation and parallel to the substrate surface.

The higher mode-overlapping factor achieved in these structures enables fewer quantum wells to be used and yet still can achieve the same or higher optical gain/absorption. The use of fewer quantum wells will reduce the transparency pumping current. Moreover, the use of fewer quantum wells will enable quantum wells with higher material strain to be used. High strained quantum wells have even lower transparency pumping current and higher material gain (for the same electric current injected), which will significantly lower the power consumption of the device with the same optical gain/absorption performances (transparency pumping current is to achieve zero gain or material transparency before net optical gain can be achieved, and hence is a resting or quiescent electric current or power that gives the baseline power consumption).

Both these alternative NIN and NPIN (and the conventional PIN) structures are good for devices that operate under reverse bias such as optical modulators, optical beam switches, and photodetectors, and are alternative exemplary embodiments for the active photonic devices in the present invention. Other alternative variations include reverse biased NP'N'N, N'P'NN, N'P''N'N, NP'P'N, P'I'N, P'N'N, P'P'N, 'P''N'N, or P'P''N' structures; or PNIP, PN'P'P, P'N'PP, P'N''P'P, PN'N'P or PIP, P'I'P, 'P''I'P, N'I'N, 'N''I'N structures; where quantum wells are placed in the 'P', 'N', and 'I' layers (those layers in inverted commas 'X'). Still other alternative variations include reverse biased NP'I'N, N'P'IN, N'P''I'N, NP'I'N, P'I'N, 'P''I'N, or P'I''N' structures; or PNIP, PN'I'P, P'N'IP, P'N''I'P, or PN'I'P structures; where quantum wells are placed in the 'P', 'N', and 'I' layers (those layers in inverted commas 'X').

For NPIN case for example, a positive voltage applied to the N layer of the NP side will cause reverse bias at the NP junction and hence cut off any current flow (PIN side becomes forward bias). A positive voltage applied to the N layer of the PIN side will cause reverse bias at the PIN junction and hence also cut off any current flow. This reverse bias to the PIN junction case is normally preferred as it will mimic the revered bias to the conventional PIN structure case more closely with voltage drop mainly across the PIN part of the structure (instead of the NP part of the structure).

Alternative Electro-Active Layer Structure B
Forward Biased NN(+)P(+)PIN Structure In the forward biased case, the low-optical-loss and low-electrical-resistance advantage of NIN structure may be achieved, by utilizing a NN(+)P(+)PIN structure described below.

Another exemplary embodiment of the active-layer structure in the active photonic device structure of the present invention makes use of a novel NN(+)P(+)PIN structure. Again strongly confined waveguide is used to reduce the voltage by for example 5 times.

The active medium is typically in the I layer but can also be in any of the N or P layer, including the transition region between the I and any of the N or P layer, in the other doped N(+) or P(+) or N or P layer, or in plurality of these layers. The active medium can be the layer itself, or a quantum-well structure, or other active-medium structure embedded in the electro-active layer.

Forward bias is normally applied to the PIN junction (with positive voltage on the P side of the PIN junction). In that case, the N(+)P(+) junction is formally under reverse biased, which normally would not have much current flow. However, as is known to those skilled in the art, when the N(+) and the P(+) layers are highly doped (typically at a doping density of higher than about $1\times10^{18}/cm^3$ and preferably higher than $1\times10^{19}/cm^3$ for both the N and P material, the carrier can actually tunnel through under the reverse bias, resulting in current flow through the N(+)P(+) junction, into the PIN junction area that is forward biased. In that case, the N(+)P(+) junction is normally referred to as a carrier tunneling junction (or simply as tunnel junction). Such tunnel junction can be very thin with the N(+) and P(+) layer only tens of nanometers in thickness each. The net result is the changing of the P Ohmic contact at layer P to N Ohmic contact at layer N of the NN(+) side. As noted above, N Ohmic contact has a much lower (10 times lower) contact resistance than P Ohmic contact. The use of such pair of N(+)P(+) tunnel junction layers thus enables one to have N Ohmic contacts on both sides of the device. This structure also works if only electric field is wanted at the active medium (i.e. with PIN junction under reverse biased).

This NN(+)P(+)PIN structure will be another exemplary embodiment of the active-layer structure for the devices of the present invention. Other alternative variations include NN(+)P(+)IN, N(+)P(+)PIN, N(+)P(+)IN structures and the likes or with some doping in the active-medium layer typically in the intrinsic layer resulting in NN(+)P(+)P'N'N, NN(+)P(+)'P''N'N, NN(+)P(+)'N'N, N(+)P(+)P'N'N, N(+)P(+)'P''N'N, N(+)P(+)'N'N, NN(+)P(+)P'P'N, NN(+)P(+)'P'N, N(+)P(+)P'P'N, or N(+)P(+)'P'N structures; or PIN, PP(+)N(+)NIP, PP(+)N(+)N'P'P, PP(+)N(+)'N''P'P, PP(+)N(+)'P'P, P(+)N(+)N'P'P, P(+)N(+)'N''P'P, P(+)N(+)'P'P, PP(+)N(+)N'N'P, PP(+)N(+)'N'P, P(+)N(+)N'N'P, or P(+)N(+)'N'P structures; where quantum wells are placed in the 'P', 'N', and 'I' layers (those layers in inverted commas 'X'). They are good for devices that operate under forward bias for the PIN (or P(+)IN or PIN(+) or P(+)IN(+)) junction such as optical amplifiers, lasers, light-emitting diodes etc. They are also good for devices that operate under reverse bias for the PIN (or P(+)IN or PIN(+) or P(+)IN(+)) junction such as optical modulators, optical beam switches, and photodetectors, and are alternative exemplary embodiments for the active photonic devices in the present invention.

When the context is clear below, we will drop the inverted commas in 'N' or 'P' designations in the electro-active layer structures above. The above examples are for the purpose of illustrations and not limitations. For example, the various doped structures may also be joint one on top of another forming a cascaded structure. Those skilled in the art will know other obvious variations that are variations of the above examples of the various doped structures with or without the use of quantum wells.

Slow-Wave Electrode Structure for
Velocity+Impedance Matching

In certain applications such as traveling-wave photodetector or traveling-wave modulator, a travelling-wave RF transmission line electrode structure should be fabricated along the device waveguide. Such traveling-wave RF transmission line electrode structure is often needed in order to achieve high-frequency response of 10-100 Gb/s or higher for the photodetector or modulator devices. Below describe such a travelling wave electrode and their optimization to match the velocity of propagation of the optical beam and the RF wave. In such travelling wave electrode, it is often advantages to engineer the electrode impedance to be around the standard impedance of 50Ω or some other preferred value depending on the application.

Figure 5A:
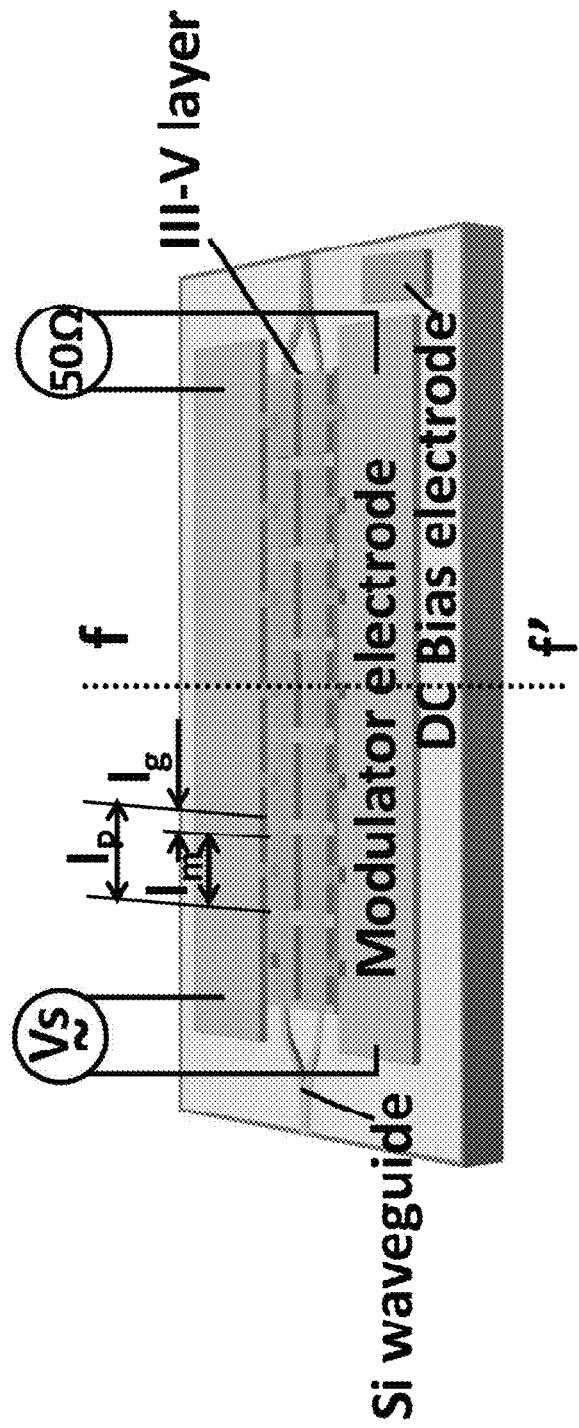
FIG. 5a is a diagram showing a pair of capacitively-loaded traveling wave electrodes.

As the RF dielectric constant in III-V semiconductors is close to their dielectric constant at optical frequency, and the RF wave in the case of semiconductor waveguide tends to have electric field fringing to the surrounding materials with lower dielectric constant, the RF wave tends to propagate at a faster velocity than the optical wave. This can be managed by using an adjustable slow-wave capacitively-loaded traveling wave (CL-TWE) RF transmission-line structure as shown in FIG. 5a. The price to pay is a longer length, trading off mainly optical loss (not much of RF loss) but it allows impedance matching.

It turns out that the slow-wave structure also enables freedom to engineer concurrent impedance matching to 50Ω as there is freedom to choose its filling factor "F" that will change its effective inductance-length product L and capacitance per unit length C. It usually ended up with slightly larger voltage-length product than if the impedance is allowed to be lower than 50Ω, resulting in longer length for the same modulation voltage. Most of the structures above have plenty of rooms to absorb the longer length. Hence, velocity matching and 50Ω can be engineered. However, velocity matching is less important when the modulator or photodetector is shorter than 0.2 mm as the RF wavelength at 100 GHz is about 1 mm.

Exemplary Device for the Active Photonic Devices of the Present Invention

The exemplary device below illustrates a WOCAT travelling-wave photodetector according to a preferred embodiment of the present invention, including the travelling-wave electrodes.

The general scheme for the photodetector is illustrated in FIG. 4. In one particular exemplary embodiment and realization of such photodetector, the said photodetector can be fabricated on a "silicon photonics" platform for operation at the fiber-optic communication wavelength of around 1550 nm. The photodetector is fabricated on a silicon-on-insulator (SOI) wafer for which a thin layer (about 300 nm thick) of silicon is pre-bonded onto a thermal silicon oxide layer with a thickness of 1-2 micrometers grown on top of a bottom silicon substrate. The 300 nm thick top-layer silicon on SOI wafer serves as an on-chip optical waveguide, which can be fabricated into the channel waveguide shown in FIG. 4b, for which the optical beam is propagated in the channel waveguide as shown in FIG. 4b. In this particular embodiment, the channel waveguide core is made of high-refractive-index silicon (with a refractive index $n_{core} \sim 3.6$). The waveguide core is surrounded by silicon dioxide or air with much lower refractive index of $n_{clad} \sim 1$ to 1.5, that act as waveguide cladding. The use of silicon as waveguide enables electronic integrated circuits to be fabricated on the same chip. Such waveguides are well known to those skilled in the art and are often referred to as "silicon photonics" platform. If active photonic devices such as photodetectors are then fabricated, the entire platform is some time referred to as Electronic-Photonic Integrated Circuits (EPICs).

For the photodetector shown in FIG. 5a, a pair of travelling-wave RF transmission line electrodes is used to propagate the RF electrical signal along the photodetector. These electrodes are designed so that the RF wave propagates at a velocity close to the optical wave velocity in the photodetector's optical waveguide. This is referred to as velocity matched transmission line. As is known to those skilled in the art, velocity matching is desirable when the photodetector length is long comparing to the RF wavelength so that maximum photodetection efficiency can be achieved for the optical beam.

For this exemplary embodiment, the RF electrodes are a pair of capacitively-loaded traveling wave electrodes (CL-TWE). Each arm of the CL-TWE is electrically in contact with electrode traveling along an optical waveguide based photodetector. The photodetector is reverse biased by a DC applied voltage.

As shown in FIG. 5a, RF wave from the photodetection is travelled along the CL-TWE to the output end of the CL-TWE. The segmented periodic pairs of T-shaped electrodes bring the voltage from the main slotted electrodes to the device. Each pair is separated by a periodic length $l_p = l_m + l_g$ and each of the T-shape segment has a length $l_m$. The fill factor F is defined as $F = l_m/l_p$ (see FIG. 5a), where "A/B" denotes division of A "over" B. Typically $l_p = 50$-$100$ μm. The gap is $l_g = l_p - l_m$.

Figure 5B:
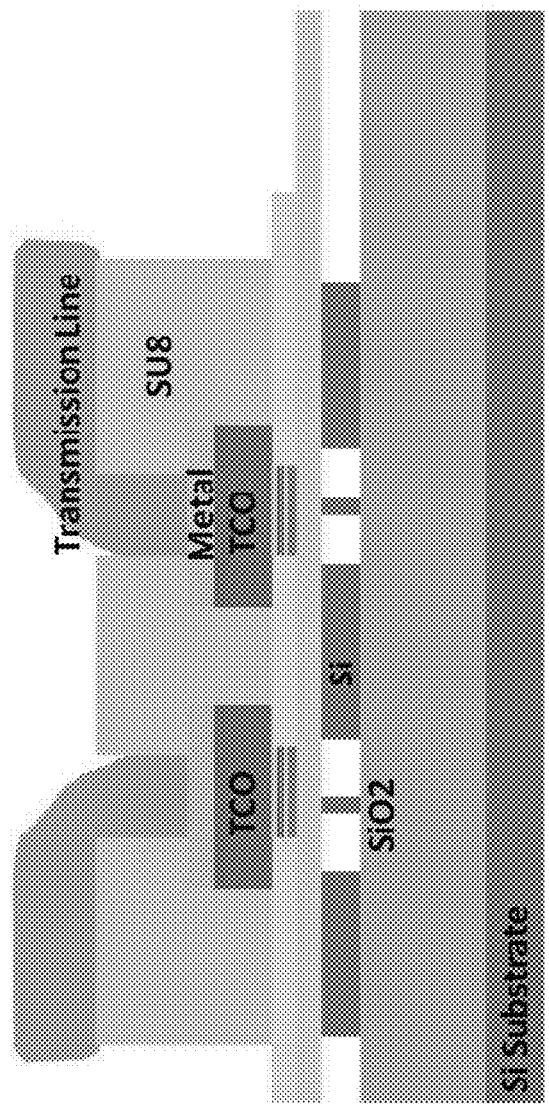
FIG. 5b is a diagram showing the cross-section d-d' in FIG. 5a, illustrating that the bottom parts of the two phase modulators are connected.

In this particular exemplary embodiment, the bottom parts of the two photodetectors are connected. This is shown in FIG. 5b showing the cross-section f-f in FIG. 5a.

Figure 6A:
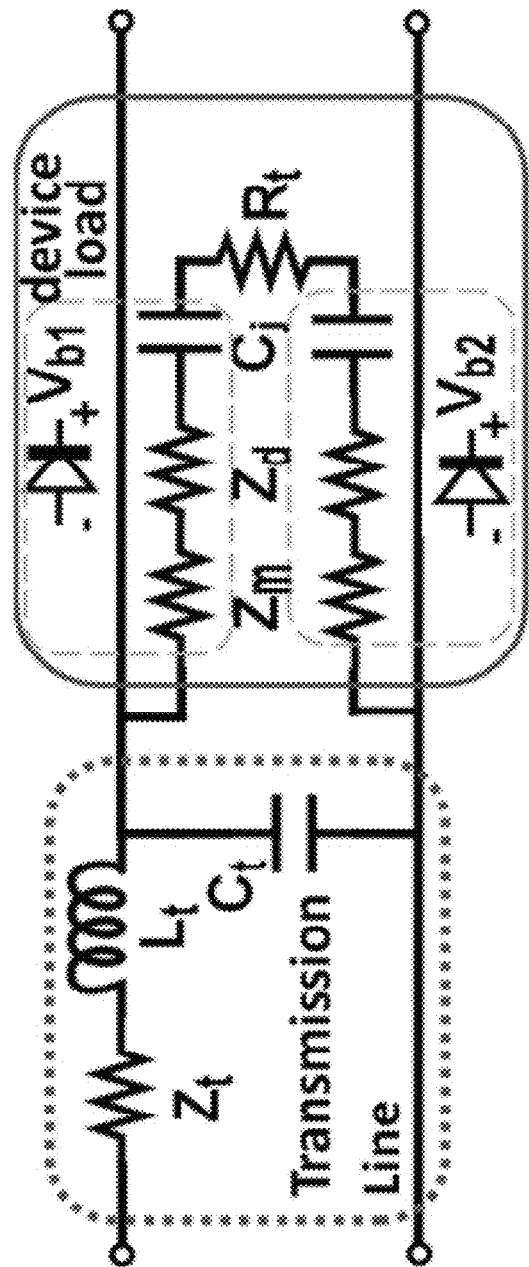
FIG. 6a is a diagram showing equivalent lumped-element circuit of a pair of capacitively-loaded traveling wave electrodes (CL-TWE) powering the two phase modulators along the two arm of the Mach Zehnder Interferometer.
Figure 6B:
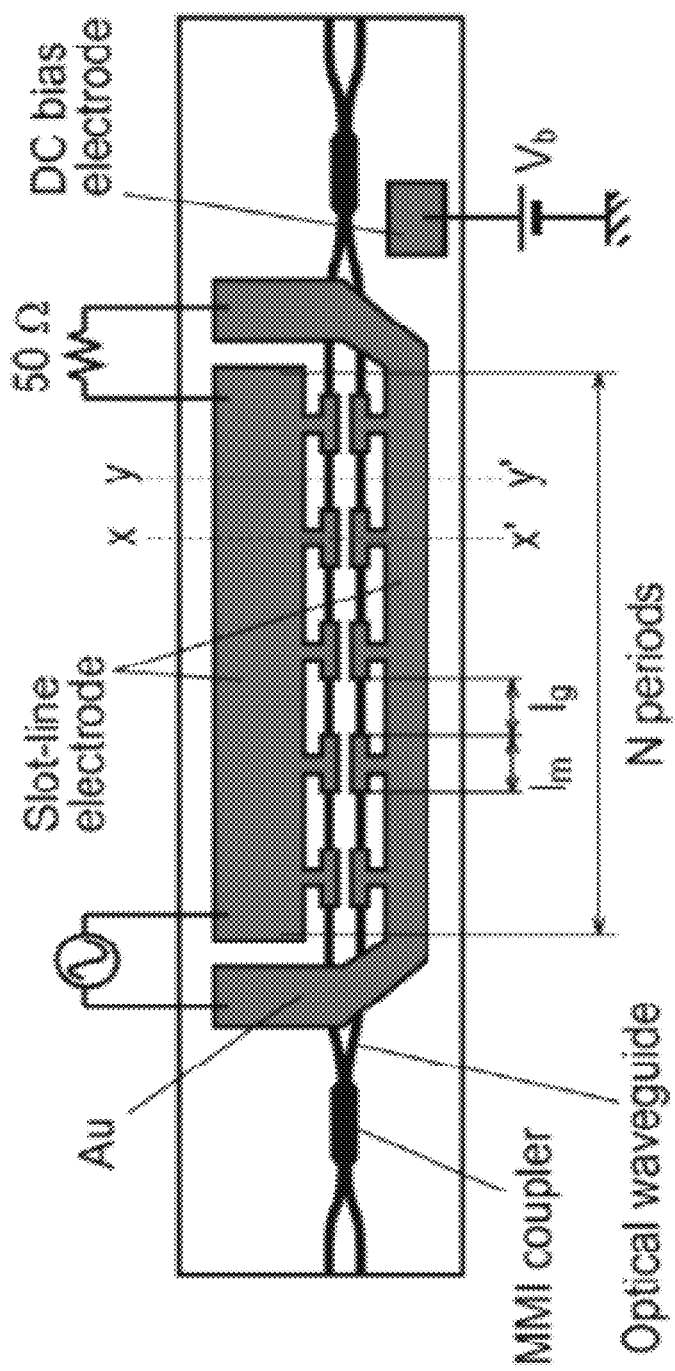
FIG. 6b is a diagram showing the top view of the CL-TWE lines for the traveling wave electrodes.

The equivalent lumped-element circuit of such a CL-TWE powering the two photodetectors is shown in FIG. 6a, in which the dotted line labeled as "Transmission Line" represents the basic unloaded transmission line model for the CL-TWE. The solid line part labeled as "Device Load" takes into account RF propagation loss of all the photodetector structural elements including: (1) Metal Ohmic Contact Resistance and Capacitance $Z_m$; (2) Resistance and Capacitance $Z_d$ of the Doped Waveguide Layers including those in the TCO materials (if TCO is used); (3) Photodetector active-region Capacitance $C_j$; (4) Both Transverse and Longitudinal Current losses in the Semiconductor Structure are included. The model gives us the frequency bandwidth limited by the RF losses (for long photodetector) or by the RC time constant (for short photodetector), and the transmission line impedance. It also gives us the CL-TWE filling factor F needed to achieve velocity matching. FIG. 6b shows the top view of the CL-TWE lines for the traveling wave electrodes.

As is known to those skilled in the art, there are many other electrode structures that can be used. The above illustrates one embodiment of a traveling wave structure that can slow down the propagation velocity of the RF wave so as to achieve better velocity matching with the optical beam in the "traveling-wave" photodetector (it is some time referred to as slow-wave RF traveling-wave structure). Such velocity matching will help to achieve higher frequency response as is known to those skilled in the art. The above exemplary embodiment on the traveling-wave electrodes is shown for the purpose of illustrations and not limitation.

In terms of the optical beam, it enters the silicon waveguide from an optical fiber. There are many ways to couple optical beam from an optical fiber to silicon waveguide as is known to those skilled in the art such as via an integrated mode size transformer on silicon called Super-High-Numerical Aperture Graded Refractive Index (SuperGRIN) lens, which will efficiently couple the beam power from the optical fiber to the 300 nm thick silicon waveguide on a SOI substrate (SOI waveguide). Alternative fiber to silicon waveguide couplers such as tapering down waveguide or surface grating can also be used as is well known to those skilled in the art.

Figure 7B:
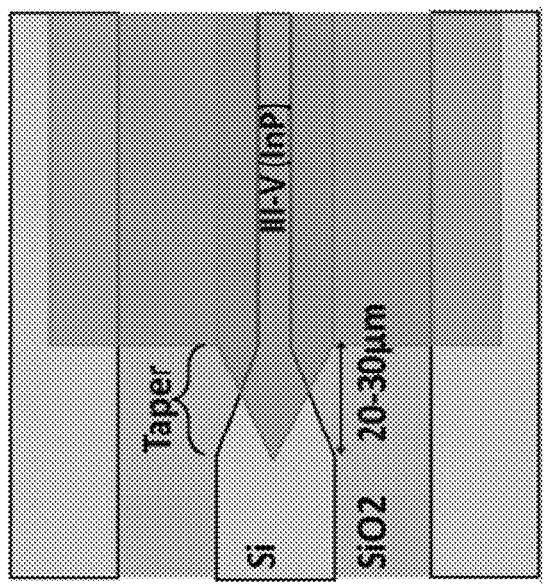
FIG. 7a and FIG. 7b are diagrams illustrating how the beam from the SOI waveguide is coupled into the thin-film active-device structure using two tapers
Figure 7A:
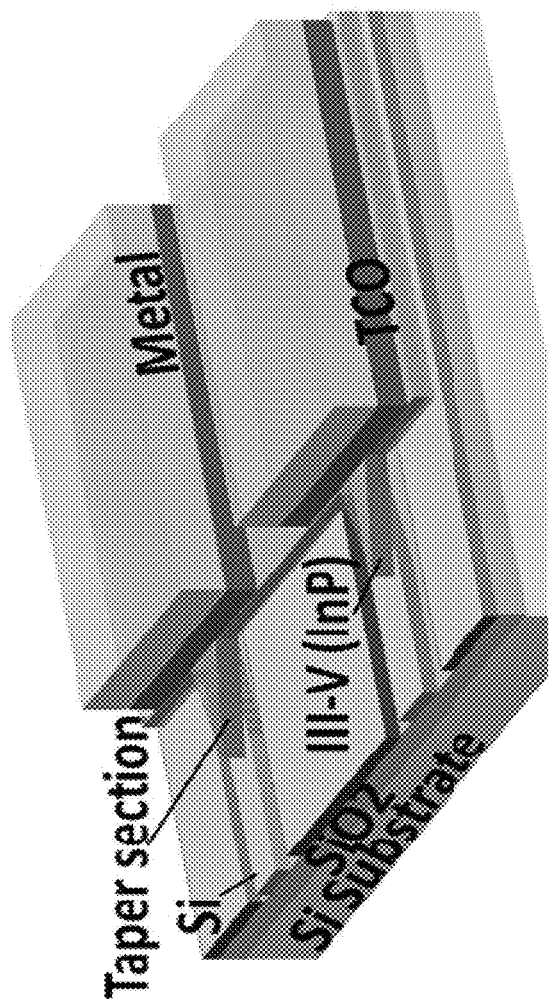

The beam from the SOI waveguide is then coupled into the thin-film photodetector structure as shown by FIG. 7a/b using two tapers (one on the active material layer (e.g. InP/III-V), one on the primarily passive waveguide layer (e.g. Si)—see the top view). Due to the thin-thickness of the InP/III-V photodetector's active layer structure (only 300-400 nm thick) for operation at 1550 nm wavelength range, this taper section can be very short (like 5-30 μm depending on the thickness) and over 95% of the energy can be transferred into the thin film photodetector device. The output back into the optical fiber goes through a reverse process via two output tapers (one on the active material layer (e.g. InP/III-V), one on the primarily passive waveguide layer (e.g. Si)—see the top view) to bring the optical beam to the primarily passive waveguide layer (e.g. Si) and then to an output fiber-coupling lens.

The electro-active layer for the photodetector is a PIN diode structure under reverse biased. There are two versions of the general structure, one uses side-conduction layer (SCL), another Ohmic Transparent Conductor (OmTC).

SCL Case.

Figures 8A, 8B:
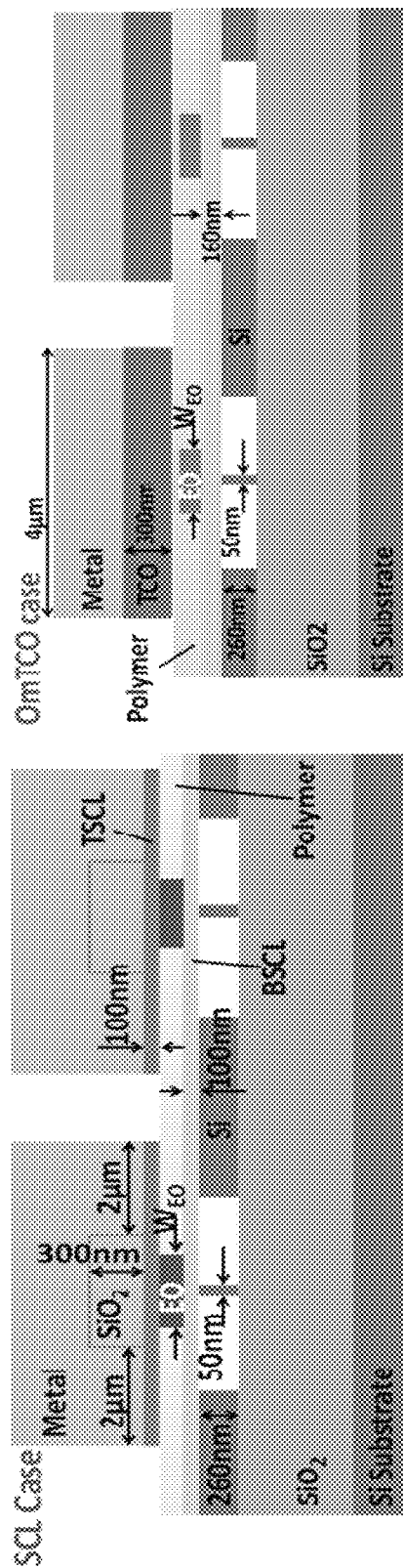
FIG. 8a is a diagram showing the cross-section for the side-conduction-layer (SCL) case.
FIG. 8b is a diagram showing the cross-section for the Ohmic Transparent Conductor (OmTC) case.

The cross-section for the SCL case is shown in FIG. 8a. At the bottom, the photodetector has a highly doped lower layer that is about 100 nm thick. This layer is used to conduct the voltage side way and is called "bottom side conduction layer" (BSCL). Above this BSCL is an electro-active layer that can be different for different electro-active layer structure. Here, we assume a PIN structure. It is then followed by a 100 nm thick top layer. This top layer is largely N-doped and is used to conduct voltage side way and is called the "top side conduction layer or TSCL". On top of this at the middle is deposited with 300 nm-thick low-refractive-index $SiO_2$. Both sides of TSCL are deposited with metal. The center $SiO_2$ layer prevents optical energy in the waveguide from touching the optically lossy metal.

The center electro-active layer has to be narrow in width to make the device capacitance small as its width $w_{EC}$ will define the device-capacitor width $w_{CAP}=w_{EC}$. For high-frequency photodetector, thus width shall be narrow to reduce the device's junction series capacitance. One way is to use a material that can be chemically selectively etched sideway for this active EO layer without etching the BSCL or the TSCL. We will show what material to use below. Typical high-frequency (>100 Gb/s) photodetector structure requires $w_{EC}$ to be around 2 μm=2000 nm or as narrow as 0.7 μm=700 nm. While seems small, it is still larger than the typical thickness of this thin-film photodetector structure with a thickness of 300-400 nm. Thus, the width $w_{EC}$ still has a low aspect ratios (<1:3) with the other nearby structural parameters. It can be done by careful control of the etching, Both sides of the metal contact will be around 2 μm=2000 nm in order to have a large enough Ohmic contact area with metal so as to have small enough metal contact resistance.

OmTC Case.

In a particular exemplary embodiment for application to 1550 nm wavelength range, the cross-section for the OmTC case is shown in FIG. 8b. In the case of a OmTC based structure, there will be no TSCL. Thus, in this particular exemplary embodiment, the top layer thickness can be reduced by about 60 nm, leaving 40 nm for Ohmic contact with TC (Transparent Conductor) material in general or TCO (Transparent Conducting Oxide) material in particular. This 60 nm thickness can be added to the bottom BSCL making it 160 nm thick resulting in lower resistance and more robust structure. The top layer contacting the TC is N-doped for achieving good Ohmic contact. In this particular exemplary embodiment, the TC is $In_2O_3$. As the TC generally has low refractive index (e.g. n~1.7), the optical field energy will decay rapidly in the TC and will not touch the metal much. As TC can be deposited after the dry etching to form the width $w_{EC}$ needed for the electro-active (EC) layer, no side etching of the center electro-active layer (ECL) is needed. We just need to etch vertically for the require thickness and then planarize with polymer, then deposit with TC. Hence, this OmTC case will enable a structure that is more robust, with lower resistance, and easier to fabricate than the SCL case.

Detailed Structures for the Exemplary Photodetector

Figure 9B:
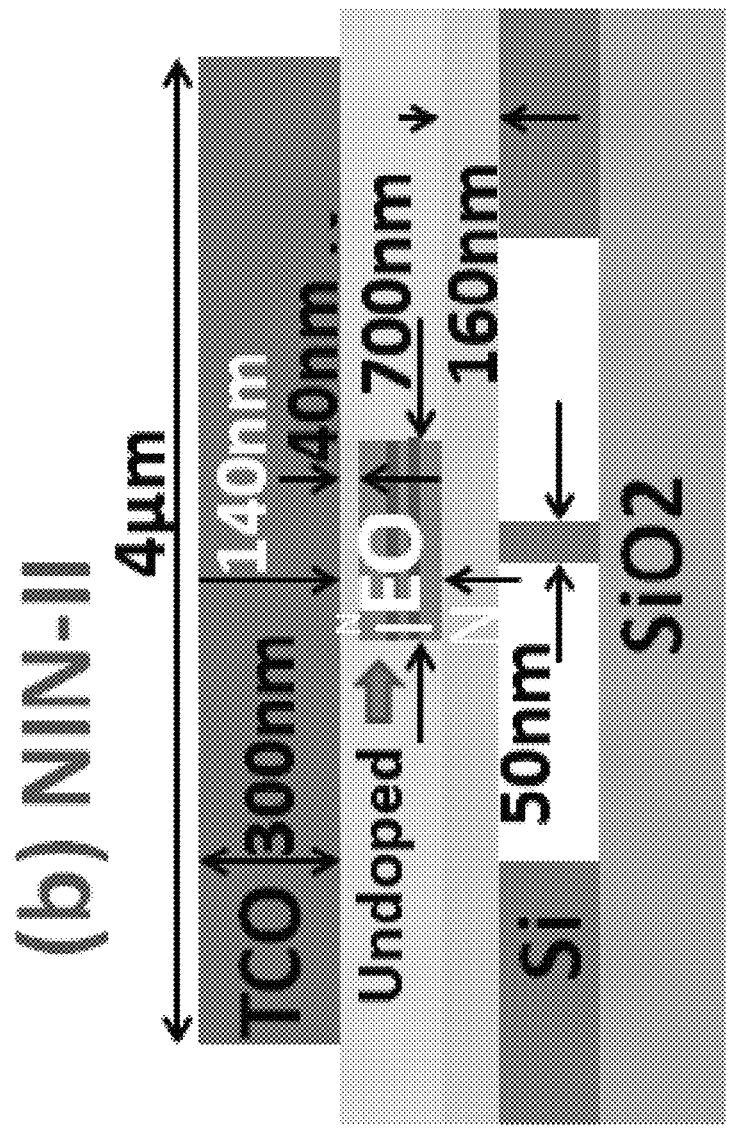
Figure 9C:
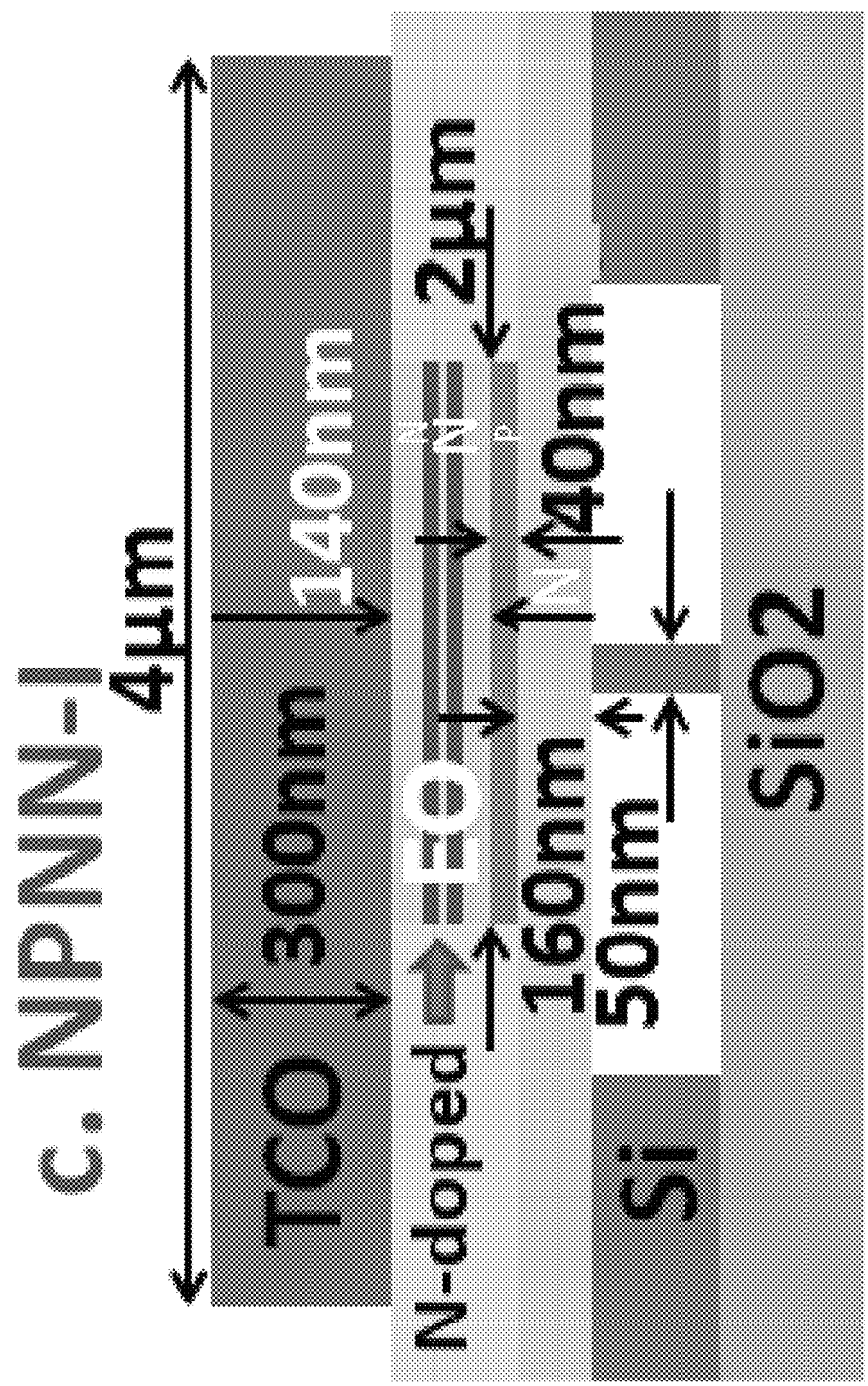
Figure 9D:
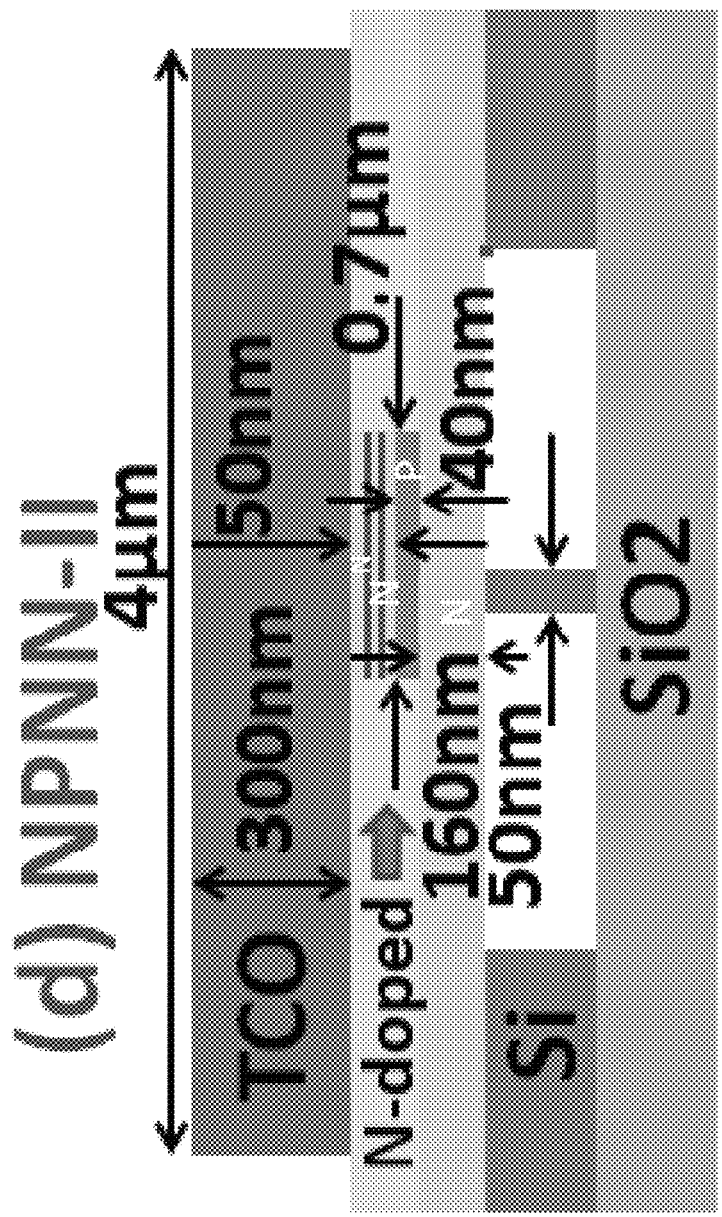
Figure 10:
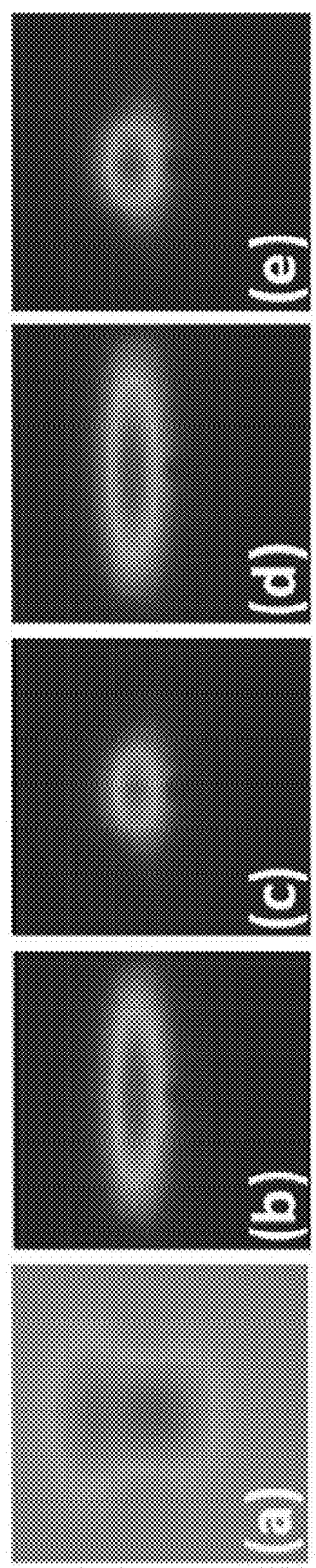
FIG. 10 is a diagram showing the details structures for an exemplary NPNN active device.

The detail structures for the exemplary photodetector are shown in FIG. 9. The structure has a highly-doped bottom InP N-layer about 120 nm thick (this becomes the BSCL) followed by a 195 nm thick intrinsic layer made of AlGaInAs QW structure (with $\lambda_{QW}$~1350 nm), and then by another highly-doped top InP N-layer about 125 nm thick for side contact with metal. This gives a total thickness of 440 nm. For this structure, the electro-active layer region width $w_{EC}$ or the device-capacitor width $w_{CAP}$ defined by it ($w_{CAP}=w_{EC}$) is chosen to be 2,000 nm (2 μm). This width also gives the lateral optical mode confinement as shown by FIG. 10b. In FIG. 10a, we show the mode of a conventional waveguide photodetector in comparison. The mode in FIG. 10b is 4 times smaller in the vertical direction, giving around 4 times larger mode-medium overlapping factor Table 1 show the material layer structure for the photodetector with side metal contact for its top contact, spelling out the thicknesses and bandgap energies of the compound semiconductor material in each layer with the various doping density and strain (with InP as the substrate).

TABLE 1

| Layer Number | Layer Thickness | NIN CASE Metal | Doping |
|---|---|---|---|
| 1 | 120 nm | InP (Bottom Layer-just above the substrate) | n = 1 × 10^19 |
| 2 | 5 nm | AlGaInAs 1.3 um | I |
| 3 | 5 nm barrier | AlGaInAs/1.1 um/−0.8% tensile strained | I |
| 4 | 2 × 7 nm barrier inside | AlGaInAs/1.1 um/−0.8% tensile strained | I |
| 5 | 3 × 6.5 nm Well (PL = 1350 nm) | AlGaInAs/1.55 um/0.9% compressive strained | I |
| 6 | 5 nm barrier | AlGaInAs/1.1 um/−0.8% tensile strained | I |
| 7 | 60 nm | AlGaInAs 1.3 um | I |
| 8 | 125 nm | InP (Top Layer) | n = 1 × 10^19 |
| Total | 440 nm | | |

More Detailed Descriptions of the Various Embodiments of the Present Invention

Figure 11A:
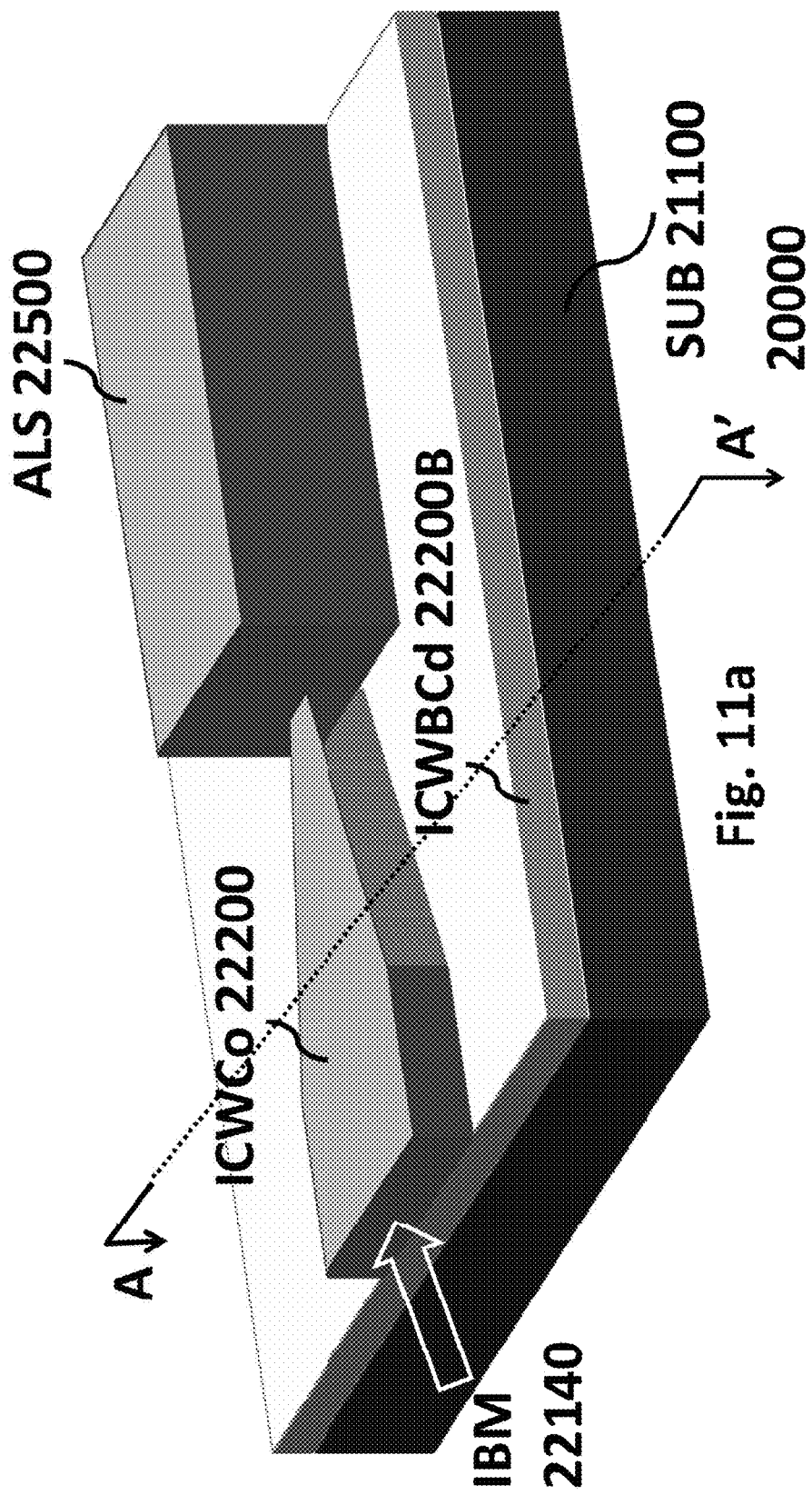
FIGS. 11a and 11b are diagrams illustrating a general geometry of the active device of the present invention.
Figure 11B:
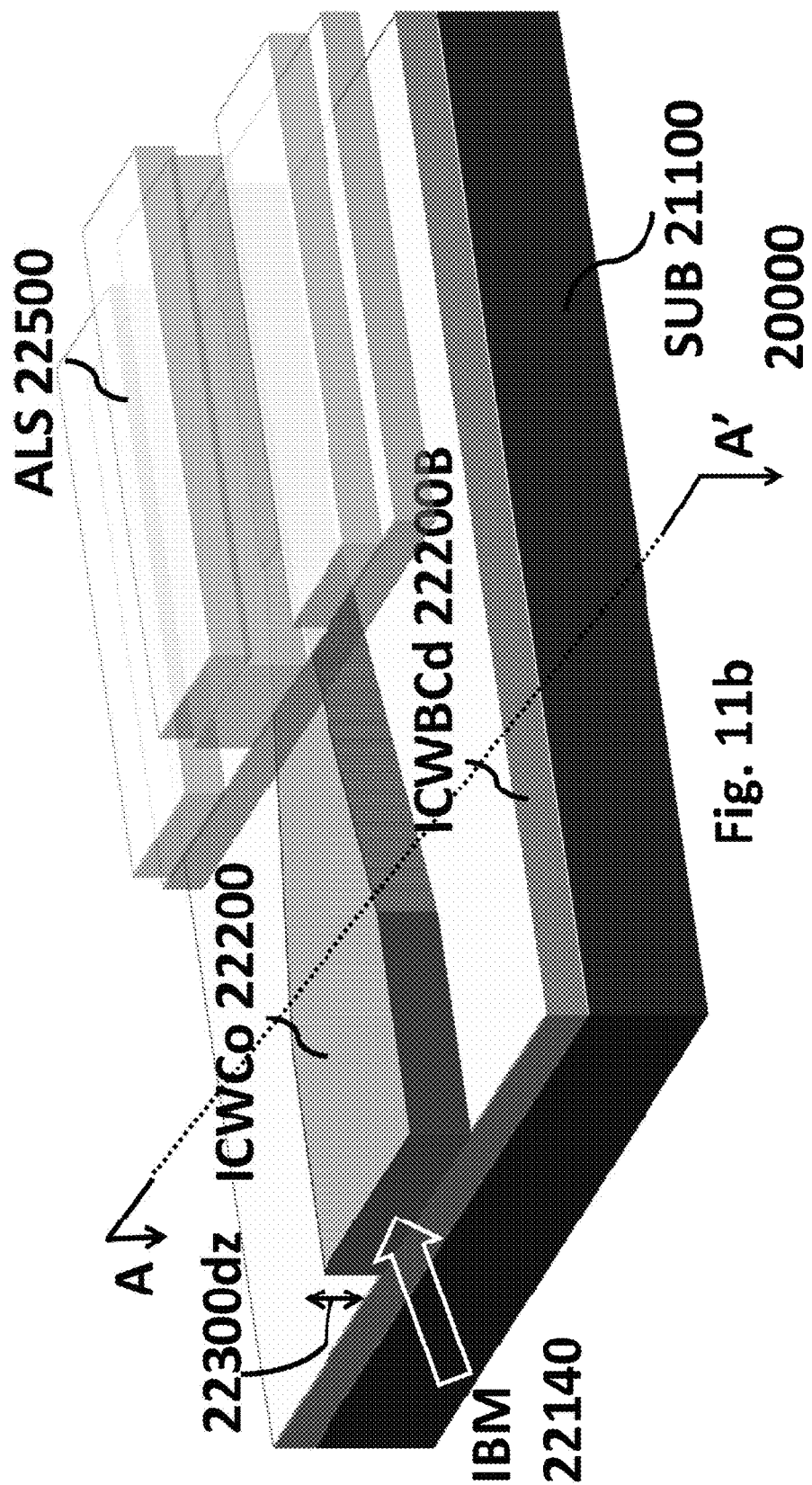

A schematics showing the general geometry of the Active Photonic Devices of the present invention is shown in FIG. 11. FIGS. 11a and 11b show a Active Photonic Device 20000 with a active section or referred to below as "Active-Layer Structure ALS 22500" section, coupled to an input connecting waveguide core ICWCo 22200. FIG. 11b is a semi-transparent illustration of FIG. 11a. The input connecting waveguide core ICWCo 22200 is fabricated on an input connecting-waveguide bottom cladding material ICWBCd 22200B disposed on a substrate SUB 21100.

Figure 12:
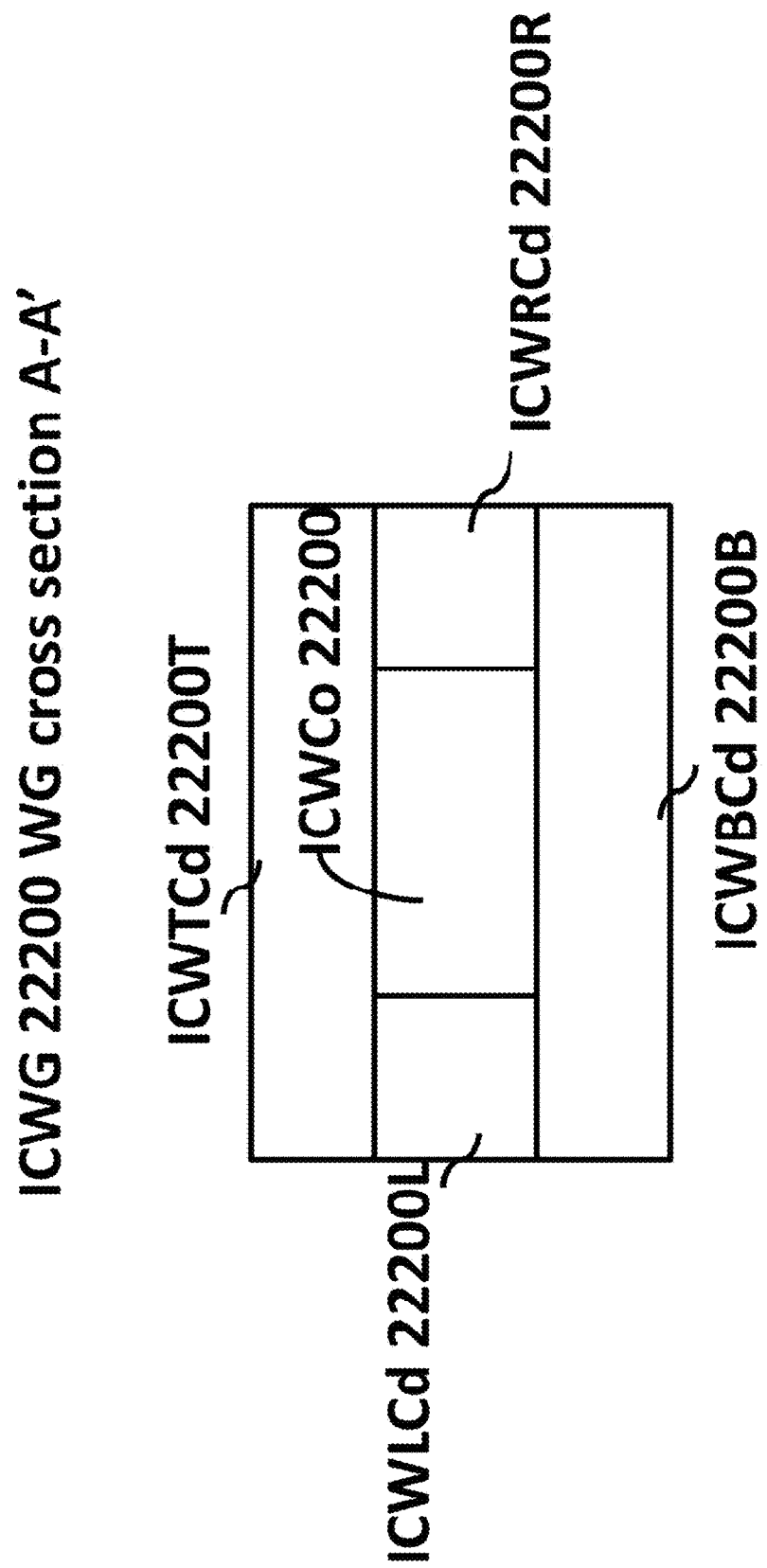
FIG. 12 shows a diagram illustrating that material surrounding the input connecting waveguide core.

In one exemplary embodiment shown in FIG. 12, illustrating an exemplary embodiment of the cross section at location A-A' of FIG. 11, to the top of the input connecting waveguide core is further deposed with input connecting waveguide top cladding material ICWTCd 22200T. Bottom refers to direction closer to the substrate and top refers to direction away from the substrate. In FIG. 12, to the left of the input connecting waveguide core is also deposed with input connecting waveguide left cladding material ICWLCd 22200L and to the right of the waveguide core is disposed with input connecting waveguide right cladding material ICWRCd 22200R. Right or left is defined by taking the direction of beam propagation as the front direction and right or left means relative to this front direction. The division of the cladding into four different material regions is for the purpose of discussion and not limitation as these can be all the same materials or there can be more than 4 regions forming plurality of different regions as long as these regions act as waveguide cladding materials with effective refractive indices smaller than the effective refractive index of the waveguide core ICWCo 22200 so that the light beam power is confined mainly in the region of the waveguide core ICWCo 22200, as is well known to those skilled in the art. The cladding material is a general designation that can include "air" or "vacuum" or any transparent dielectric material as the material.

Input Connecting Waveguide Region

The input connecting waveguide core ICWCo 22200 is made up of a material or mixture of materials with an averaged material refractive index $n_{ICWCo}$ 22200n, has a thickness $d_{ICWCo}$ 22200d, and width $W_{ICWCo}$ 22200w. Let the refractive index of the bottom input connecting-waveguide bottom cladding material be $n_{ICWBCd}$ 22200Bn. Let the refractive index of the top cladding material ICWTCd 22200T be $n_{ICWTCd}$ 22200Tn, the refractive index of the left cladding material ICWLCd 22200L be $n_{ICWLCd}$ 22200Ln, and the refractive index of the right cladding material ICWRCd 22200R be $n_{ICWRCd}$ 22200Rn. The waveguide core 22200 and the claddings 22200T, 22200B, 22200R, 22200L, together forms input connecting waveguide ICWG 22200WG.

The vertical confinement of the optical beam is due to the refractive-index difference between the top and bottom waveguide claddings and the waveguide core and the claddings generally have lower refractive indices than that of the waveguide core so that $n_{ICWTCd} < n_{ICWCo}$ and $n_{ICWBCd} < n_{ICWCo}$. The horizontal confinement of the optical beam is due to the refractive-index difference between the left and right waveguide claddings and the waveguide core and the claddings generally have lower refractive indices than that of the waveguide core so that $n_{ICWRCd} < n_{ICWCo}$ and $n_{ICWLCd} < n_{ICWCo}$. The vertical direction is the direction perpendicular to the substrate plane and the horizontal direction is the direction parallel to the substrate plane.

The above illustration of an exemplary embodiment of input connecting waveguide ICWG 22200WG, showing the waveguide cladding can be divided into different material regions (in the above case with four main material regions), is for the purpose of illustration and not limitation. As is known to those skilled in the art, the waveguide cladding can be made up of one single material or plurality of material regions, as long as the refractive indices of most of the cladding material regions is lower than the refractive index $n_{ICWCo}$ of the waveguide core. This is also generally applicable to the other waveguide cladding situations below for other optical waveguides described in the present invention.

Definition of Refractive Index Contrast and Cladding Refractive Index Averaging An important quantity in terms of waveguide mode confinement is the refractive index contrast between the averaged refractive index of the waveguide core and its immediate surrounding cladding materials called the refractive-index difference $n_{Rd}$ defined by $n_{Rd}^2 = (n_{Co}^2 - n_{Cd}^2)$, where $n_{Co}$ is the refractive index of the waveguide core (e.g. $n_{Co} = n_{ICWCo}$) and $n_{Cd}$ is the refractive index of the waveguide cladding (e.g. $n_{Cd} = n_{ICWBCd}$ or $n_{ICWTCd}$ or $n_{ICWRCd}$ or $n_{ICWLCd}$) or an averaged of them thereof given by $n_{aICWCd}$ 22200aCdn.

The refractive-index averaging is more accurately done as averaged of its square values which are their dielectric constant $\varepsilon = n^2$. This is because dielectric constants which describe the dipole strengths add linearly with each other as is known to those skilled in the art. Thus $n_{aICWCd}^2$ for example can be computed by weighting the refractive index square in each of the different cladding regions by the fraction of beam energy in each of the cladding regions. Hence:

$$n_{aICWCd}^2 = (n_{ICWBCd}^2 \times A_{ICWBCd} + n_{ICWTCd}^2 \times A_{ICWTCd} + n_{ICWRCd}^2 A_{ICWRCd} + n_{ICWLCd}^2 A_{ICWLCd})/(A_{ICWBCd} + A_{ICWTCd} + A_{ICWRCd} + A_{ICWLCd}), \quad (3)$$

where in Eq. (3), $A_{ICWBCd}$ is some effective cross-sectional weighting for the optical power in the bottom cladding material (e.g. given by the percentage of the total beam power), $A_{ICWTCd}$ is some effective cross-sectional weighting for the optical power in the top cladding material, $A_{ICWBCd}$ is some effective cross-sectional weighting for the optical power in the right cladding material, $A_{ICWLCd}$ is some effective cross-sectional weighting for the optical power in the left cladding material. $A_{ICWBCd}$, $A_{ICWTCd}$, $A_{ICWRCd}$, and $A_{ICWLCd}$ are called the effective beam power distribution areas in the respective regions of the waveguide cladding materials. Each of these cross-sectional weighting has a value proportional to the fractional optical power (beam power integrated over the beam cross-sectional area of that region) in that region of the material for the guided optical beam or is given by the integration over the beam energy density (energy per unit volume) over the volume of that region of the material assuming the volume is taken over a short propagation length. These are some definitions of the effective cross-sectional weighting labeled with prescript "A". Many other equivalent but approximate definitions of the effective cross-sectional weighting "A" can be used. Note $n_{aICWCd}^2 \sim (n_{ICWBCd}^2 + n_{ICWTCd}^2 + n_{ICWRCd}^2 + n_{ICWLCd}^2)/4$, if these weightings are about equal.

Likewise the waveguide core can also generally be made up of one or plurality of materials, and $n_{ICWCo} = n_{aICWCo}$ can also be an averaged refractive index of the "m" number of materials with slightly different refractive indices $n_{ICWCo1}$, $n_{ICWCo2}$, $n_{ICWCo3}$ ... $n_{ICWCom}$, that made up the waveguide core materials where $$n_{aICWCo}^2 = (n_{ICWCo1}^2 \times A_{ICWCo1} + n_{ICWCo2}^2 \times A_{ICWCo2} + n_{ICWCo3}^2 A_{ICWCo3} + \ldots + n_{ICWCom}^2 A_{ICWCom})/(A_{ICWCo1} + A_{ICWCo2} + A_{ICWCo3} + \ldots + A_{ICWCom}), \quad (14)$$

In Eq. (14), each of the $A_{ICWCo1}, \ldots, A_{ICWCom}$ is some effective cross-sectional weighting $A_{ICWCoj}$ for the optical power in core material with refractive index $n_{ICWCoj}$, where j is one of 1, . . . , m. $A_{ICWCo1}+A_{ICWCo2}+A_{ICWCo3}+ \ldots +A_{ICWCom}$ are called the effective beam power distribution areas in the respective regions of the waveguide core materials.

Input Optical Beam

As shown in FIG. 11, an input optical beam IBM 22140 is launched into input connecting waveguide core ICWCo 22200. As the cladding regions of input connecting waveguide ICWG 22200WG or in fact of any waveguide are typically ill-defined (the beam power can go into various depths and directions into the cladding) as is known to those skilled in the art, an input optical beam IBM 22140 launched into waveguide ICWG 22200WG is taken to mean it is launched with its power centered essentially at the waveguide core ICWCo 22200, so the reference to the beam being in waveguide 22200WG or waveguide core 22200 will generally be used interchangeably below. As is known to those skilled in the art, the input optical beam IBM 22140 will propagate in waveguide 22200 with a "propagating refractive index" $n_{IBM}$ 22140n. This propagating refractive index $n_{IBM}$ 22140n generally has a value smaller than the material refractive index $n_{ICWCo}$ 22200n of the waveguide core ICWCo 22200 so that $n_{IBM} < n_{ICWCo}$ as is known to those skilled in the art. Also, the propagating refractive index $n_{IBM}$ 22140n generally has a value larger than the material refractive index $n_{ICWQCd}$ 22200Qn of the waveguide cladding ICWQCd 22200Q where Q=T, B, L, or R, so that for most of the Q, $n_{IBM} > n_{ICWQCd}$ to enable waveguiding, as is known to those skilled in the art. The optical beam has an optical power given by $P_{IBM}$ 22140P, electric field polarization given by $E_{IBM}$ 22140E, and beam effective area given by $A_{IBM}$ 22140A.

In this invention, the propagating optical beam is generally assumed to have a spread of optical wavelength centered at an operating wavelength $\lambda_{IBM}$ 22140L. For illustration and not limitation, the optical beam may be in the form of a train of optical pulses to transmit digital information. The optical beam may also be made up of light wave of one or plurality of (N) different frequency channels ($\lambda_{IBM1}$, $\lambda_{IBM2}$, $\lambda_{IBM3}$, . . . , $\lambda_{IBMN}$) where N is an integer. When the optical beam is made up of plurality of frequency channels, the optical transmission system or device is generally known as a wavelength division multiplexing (WDM) optical system or device. Generally, the optical beam is made up of beam of light with a spectral width around the center operating wavelength $\lambda_{IBM}$.

Input Beam Coupler Structure (IBCS) Region

Figure 13A:
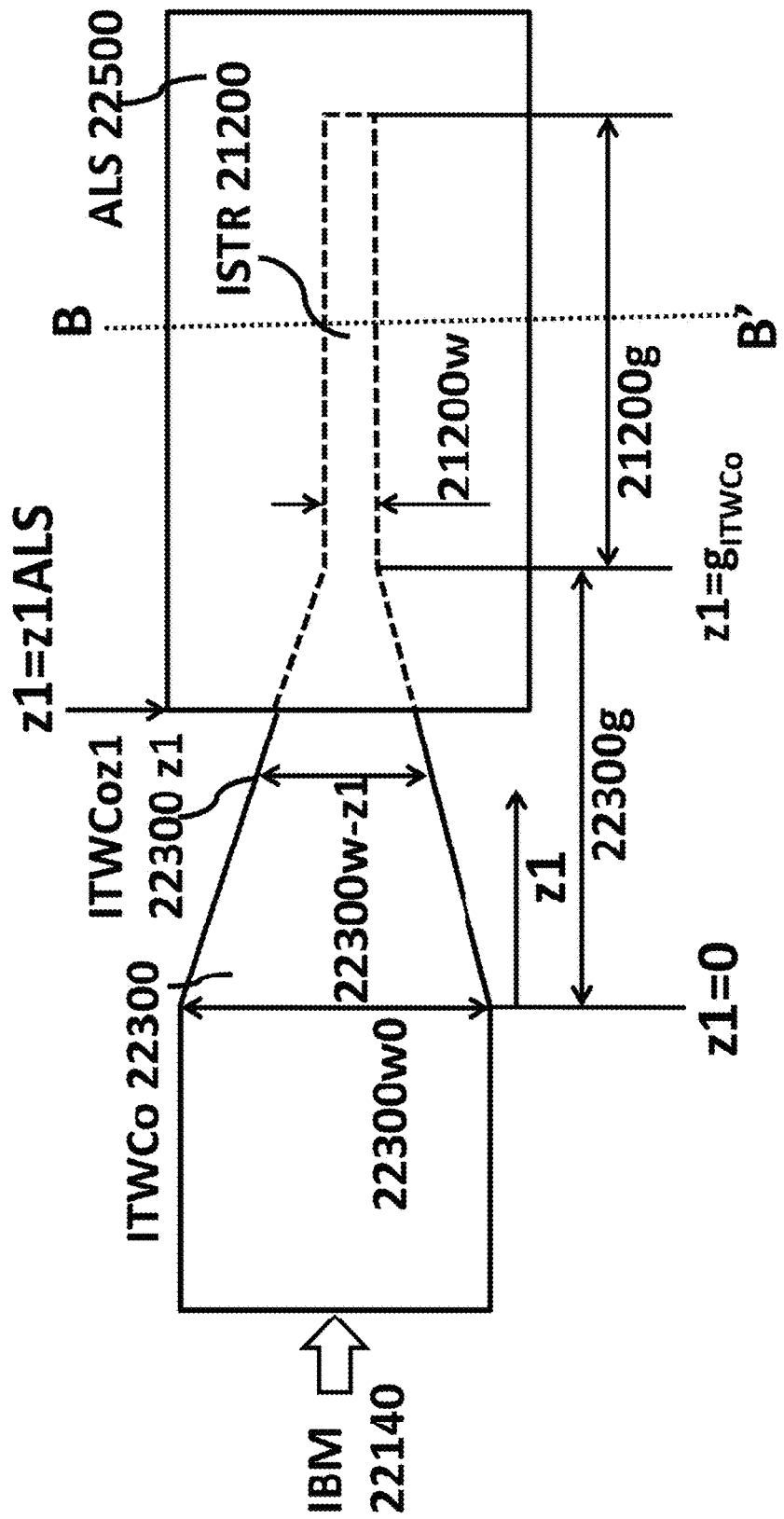
FIGS. 13a and 13b show diagrams illustrating the input beam coupler structure (IBCS).

FIG. 13a show the input beam coupler structure (IBCS) comprises at least a tapering waveguide section (preferably tapering from wide to narrow but can also maintain the same width or taper from narrow to wide as will be elaborated below) connected to the input waveguide. Optionally, the active layer structure ALS on top of the input tapering waveguide section can also be tapering in the form of an up taper (preferably tapering from narrow to wide in the direction toward the active layer structure ALS, but can also maintain the same width or taper from wide to narrow). See for example FIG. 13b.

Specifically, the input optical beam IBM 22140 enters from input connecting waveguide core ICWCo 22200 into an input connecting-waveguide taper section with an input tapering waveguide core ITWCo 22300 parameterized by a location z1 (FIG. 13a), ITWCo-z1 22300z1, in which the width of a tapering waveguide core $w_{ITWCo-z1}$ 22300w-z1 at distance z1, measured from the beginning point of the taper, is changed from its input value at z1=0 $w_{ITWCo-z1=0}$ 22300w-z1=0 of $w_{ITWCo-z1=0}=w_{ICWCo}$ 22200 to another width (that can be the same width) at z1>0 $w_{ITWCo-z1>0}$ 22300w-z1>0. The thickness of the tapering waveguide core is $d_{ITWCo-z1}$ 22300d-z1 and its refractive index is $n_{ITWCo-z1}$ 22300n-z1. Typically, though not always, $d_{ITWCo-z1}$ 22300d-z1 and $n_{ITWCo-z1}$ 22300n-z1 are constant value in z1 so we can drop the z1 designation with $d_{ITWCo-z1}=d_{ITWCo}$ 22300d and $n_{ITWCo-z1}=n_{ITWCo}$ 22300n. In a preferred embodiment, $d_{ITWCo-z1}$ is about the same value as $d_{ICWCo}$. The tapering may be such that $w_{ITWCo-z1}$ is a linear function of z1 or quadratic function of z1 (i.e. depending on $z1^2$), but can also be of any curvilinear function of z1. Let $g_{ITWCo}$ 22300g denotes the total length of this tapering waveguide.

The end of the taper at $z1=g_{ITWCo}$ 22300g at which the width of the waveguide core is $w_{ITWCo-g}$ 22300w-g is connected to an input supporting structure ISTR 21200. While illustrated as a line that is continuation of the connecting waveguide material with a narrow width and air or other low refractive index materials surrounding its side, the supporting structure can be random dots or any shape of small amount of any materials that have an "effective refractive index" or small "averaged refractive index" (e.g. as defined by Eq. (3)) within the layer extended in the horizontal direction, given by an effective layer averaged refractive index $n_{laISTR}$ 21200nla. In the case it acts as the bottom waveguide cladding, $n_{laISTR}$ has a value lower than the refractive index of the waveguide core $n_{WCo}$ 22600Con in the electro-active waveguiding core structure EWCoS 22600 defined below. The input supporting structure ISTR 21200 may continue to guide wave or just acts as a supporting structure, depending on application scenarios.

In an exemplary embodiment, the input supporting structure ISTR 21200 is a narrow line. In that particular case, we can describe it as having a width $w_{ISTR}$ 21200w, thickness $d_{ISTR}$ 21200d, and length $g_{ISTR}$ 21200g. The length $g_{STR}$ 21200g may be zero. In that case, input supporting structure ISTR 21200 does not exist (the thin ALS film can still be supported in some way such as by its corners or sides, but not directly below). In a preferred embodiment, $d_{ISTR}$ is about the same value as $d_{ICWCo}$.

Along the taper in region outside the ALS region, the vertical confinement of the optical beam is due to the refractive-index difference between the waveguide core and top and bottom tapering waveguide claddings at the location z1 defined above: ITWTCd-z1 22300T-z1 (refractive index $n_{ITWTCd-z1}$ 22300Tn-z1) and ITWBCd-z1 22300B-z1 (refractive index $n_{ITWBCd-z1}$ 22300Bn-z1) and the waveguide core and the claddings have lower refractive indices than that of the waveguide core so that the refractive index $n_{ITWTCd-z1} < n_{ITWCo-z1}$ and $n_{ITWBCd-z1} < n_{ITWCo-z1}$. The horizontal confinement of the optical beam is due to the refractive-index difference between the left and right waveguide claddings at z1: ITWLCd-z1 22300L-z1 (refractive index $n_{ITWLCd-z1}$ 22300Ln-z1) and ITWRCd-z1 22300R-z1 (refractive index $n_{ITWRCd-z1}$ 22300Rn-z1), and the waveguide claddings have lower refractive indices than that of the waveguide core so that $n_{ICWRCd-z1} < n_{ICWCo-z1}$ and $n_{ICWLCd-z1} < n_{ICWCo-z1}$. The vertical direction is the direction perpendicular to the substrate plane and the horizontal direction is the direction parallel to the substrate plane. Again, there can be one or plurality of cladding material regions, and the four cladding regions are mentioned for the purpose of illustration and not limitation.

In an exemplary embodiment, $n_{ITWTCd-z1} = n_{ITWBCd-z1} = n_{ITWLCd-z1} = n_{ITWRCd-z1} = n_{ICWTCd}$, and $n_{ICWTCd} = n_{ICWBCd} = n_{ICWLCd} = n_{ICWRCd}$ so all the cladding indices in the tapering regions and the input connecting waveguide regions are all approximately equal. For example, these cladding regions can be filled with silicon dioxide materials with refractive index of n~1.45. The refractive index of the waveguide core $n_{ITWCo-z1}$ 22300n-z1 can be silicon so that $n_{ITWCo} = n_{ICWCo} \sim 3.6$, where $n_{ICWCo}$ 22200n is the refractive index of the waveguide core for the input connecting waveguide.

On top of the input tapering waveguide core ITWCo 22300 starting at z1=z1ALS 22300z1ALS, is laid with an active layer structure ALS 22500. Typically z1ALS is before $g_{ITWCo}$ 22300g so that $0 < z1ALS < g_{ITWCo}$. The active layer structure starting at z1ALS can also have an up-taper with width tapering from narrow to wide in the direction toward the ALS structure. The various embodiments of this active layer structure ALS 22500 will be described in more detail below.

Figure 13B:
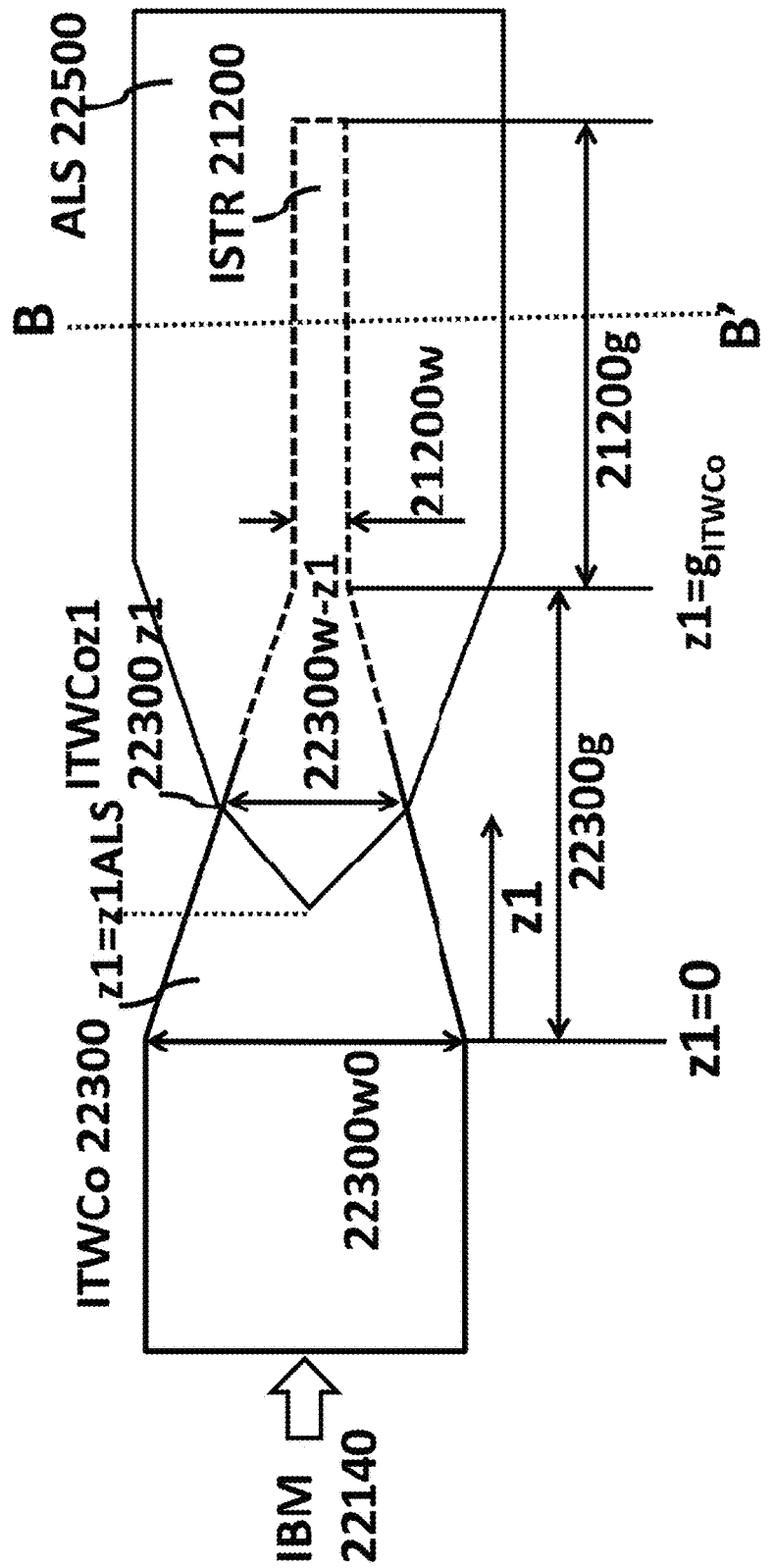
Figure 14B:
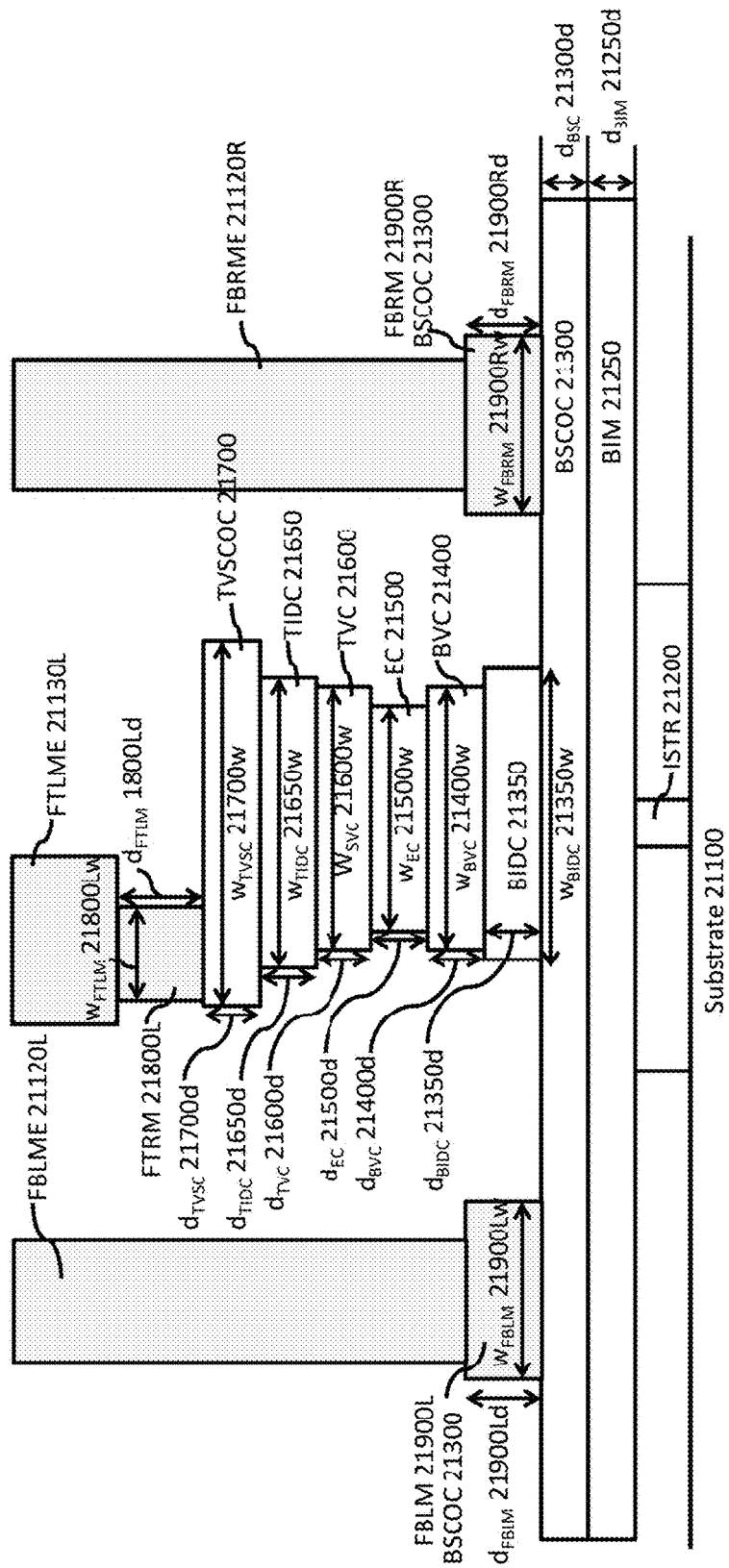
Figure 14C:
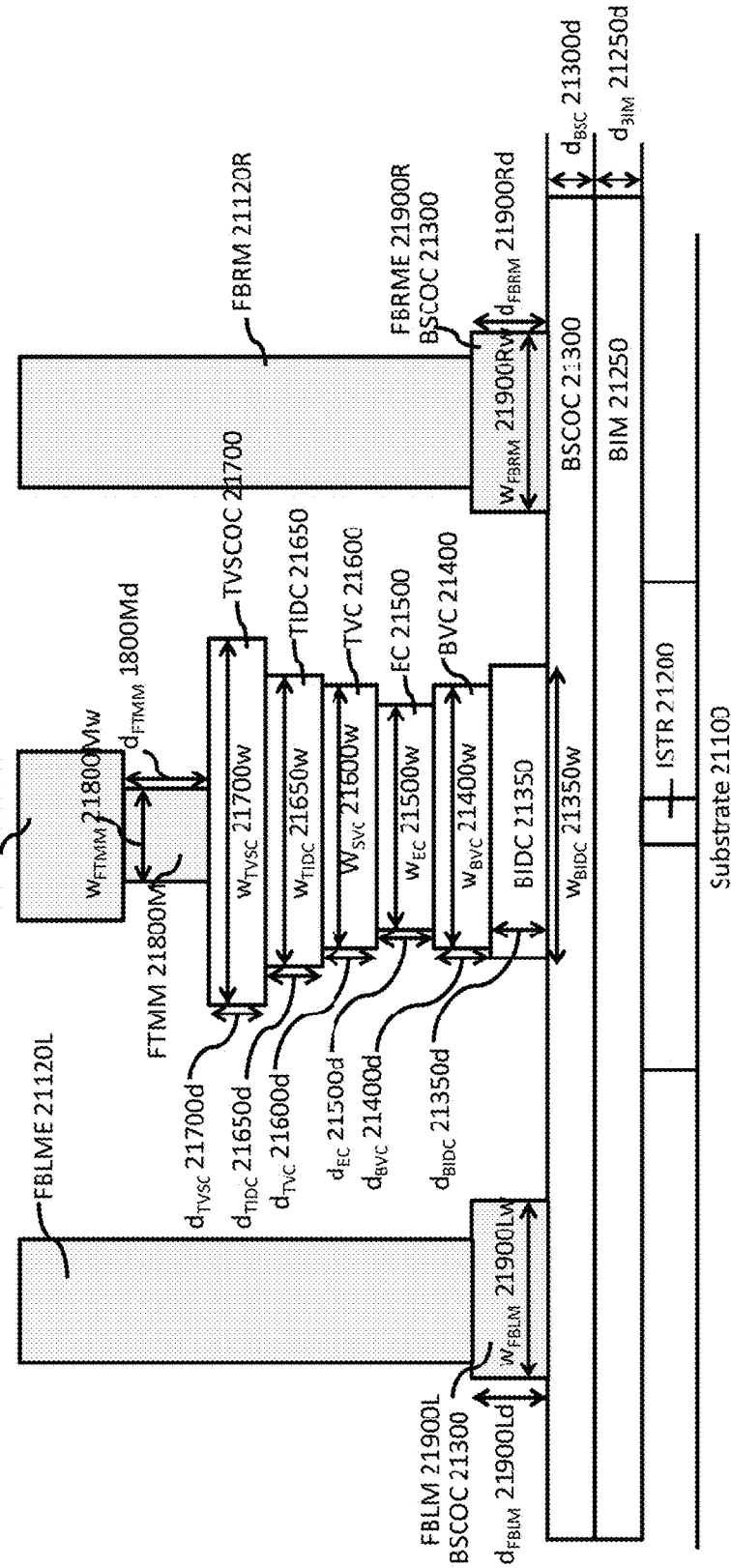

Active Layer Structure-Beam Transport into the Structure Bottom Side Conduction and Ohmic Contact Layer FIGS. 14a, 14b, and 14c show exemplary embodiments of the Active Layer Structure ALS 22500, which are exemplary cross-sections at location B-B' of FIG. 13a or FIG. 13b. In ALS 22500, at least a bottom side conduction and Ohmic contact layer BSCOC 21300 is disposed somewhere above part of input supporting structure ISTR 21200. The layer BSCOC 21300 with thickness $d_{BSC}$ 21300d, refractive index $n_{BSC}$ 21300n, a total width $w_{BSC}$ 21300w serves to conduct electrical current and voltage from a contact region to an electro-active layer (ECL).

Bottom Interspaced Material Layer

There can be other bottom interspaced material layer BIM 21250 between layer BSCOC 21300 and ISTR 21200, with thickness $d_{BIM}$ 21250d, a total width $w_{BIM}$ 21250w, and refractive index $n_{BIM}$ 21250n. This layer may be electrically conducting or electrical insulating. The value of $d_{BIM}$ may take on zero thickness, in that case the bottom interspaced material layer BIM 21250 does not exist. The existence of a bottom interspaced material layer BIM 21250 is thus optional.

Bottom Metal Contact Pads

On top and to the left side of the bottom side conduction and Ohmic contact layer BSCOC 21300 is deposed of at least a first bottom left metal contact pad FBLM 21900L with thickness $d_{FBLM}$ 21900Ld, width $w_{FBLM}$ 21900Lw, and length $g_{FBLM}$ 21900Lg.

On top and to the right side of the bottom side conduction and Ohmic contact layer BSCOC 21300 is deposed of at least a first bottom right metal contact pad FBRM 21900R with thickness $d_{FBRM}$ 21900Rd, width $w_{FBRM}$ 21900Rw, and length $g_{FBLM}$ 21900Rw. In an exemplary embodiment, only either the first bottom left or the first bottom right metal contact pad is present. In another exemplary embodiment, plurality of such bottom metal contact pads is present. The exact location of these metal contact pads can be in many other locations beside the left or right location shown as long as the metal contact pads are in electrical contact with the bottom side conduction and Ohmic contact layer BSCOC 21300.

Bottom Metal Electrodes

On top of the first bottom left metal contact pad FBLM 21900L is a first bottom left metal electrode FBLME 21120L. On top of the first bottom right metal contact pad FBRM 21900R is a first bottom right metal electrode FBRME 21120R. In an exemplary embodiment, only either the first bottom left or the first bottom right metal electrode is present. In another exemplary embodiment, plurality of such bottom metal electrodes is present. The exact location of these bottom metal electrodes can be in many other locations beside the left or right location shown as long as the bottom metal electrodes are in electrical contact with the respective bottom metal contact pads.

Bottom Interspaced Dielectric Current Conduction Layer

On top of the center region of the layer BSCOC 21300 (i.e. region above or near supporting structure 21200) is deposed of a bottom interspaced dielectric current conduction layer BIDC 21350 with thickness $d_{BIDC}$ 21350d, layer width $w_{BIDC}$ 21350w, and an averaged refractive index $n_{BIDC}$ 21350n. The layer width $w_{BIDC}$ is the dimension of that layer in a horizontal direction perpendicular to the direction of the optical beam propagation. This layer is optional in that when thickness $d_{BIDC}$ 21350d is zero, this layer does not exist.

Bottom Vertical Current Conduction Layer

On top of the bottom interspaced dielectric current conduction layer BIDC 21350 is deposed of a bottom vertical current conduction layer BVC 21400 with thickness $d_{BVC}$ 21400d, layer width $w_{BVC}$ 21400w, and an averaged refractive index $n_{BVC}$ 21400n. The layer width $w_{BVC}$ is the dimension of that layer in a horizontal direction perpendicular to the direction of the optical beam propagation.

Electro-Active Layer

On top of the bottom vertical current conduction layer BVC 21400 is deposed of an electro-active layer EC 21500 with thickness $d_{EC}$ 21500d, width $w_{EC}$ 21500w, an averaged refractive index of the entire layer given by $n_{EC}$ 21500n, and an averaged absorption coefficient of the entire layer given by $\alpha_{EC}$ 21500a. The refractive index averaging is given in a similar way as illustrated by Eq. (3). The refractive index $n_{EC}$ or the optical absorption coefficient $\alpha_{EC}$ ($\alpha_{EC} > 0$ means optical absorption and $\alpha_{EC} < 0$ means optical gain) describing the fraction of energy absorbed (or amplified for the case where ($\alpha_{EC} < 0$) per unit beam propagation length of the electro-active layer can be altered by an applied electric field, an electric current, or either injection or depletion of carriers in the electro-active layer. The guided optical beam in the electro-active layer BEC 21140 in this electro-active waveguiding core structure EWCoS 22600 has a propagating refractive index $n_{BEC}$ 21140n. While in a preferred embodiment described below, the EC layer is made of semiconductor, it can also be any other active material according to various embodiments of the current invention. For example, it can be ferroelectric electro-optic material (e.g. $LiNbO_3$ or $BaTiO_3$) or organic electro-optic or organic dye or electro-absorption material, whose refractive index or optical intensity gain and absorption coefficient $\alpha_{EC}$ ($\alpha_{EC}<0$ means optical gain and $\alpha_{EC}>0$ means optical absorption) can be altered under an applied electric field or electric current or optical excitation beam as is well known to those skilled in the art.

In the case of an electro-optic modulator, a small averaged increment or decrement in the averaged refractive index of the electro-active layer EC 21500 is denoted as $dn_{EC}$ 21500$dn$ so that its new average refractive index becomes $n_{EC}$(new)=$n_{EC}$+$dn_{EC}$ will cause a change in the propagating refractive index $n_{BEC}$ 21140$n$ by $dn_{BEC}$ 21140$dn$ from $n_{BEC}$ to $n_{BEC}$(new)=$n_{BEC}$+$dn_{BEC}$ due to the overlapping of the optical beam energy with the material regions in which $dn$ is non-zero.

In the case of an optical amplifier or an electro-absorption modulator, a small averaged increment or decrement in the averaged optical intensity absorption/gain coefficient of the electro-active layer EC 21500 is denoted as $d\alpha_{EC}$ 21500$da$ so that its new average optical intensity loss/gain coefficient becomes $\alpha_{EC}$(new)=$\alpha_{EC}$+$d_{\alpha EC}$ will cause a change in the absorption/gain coefficient $\alpha_{BEC}$ 21140$a$ of the optical beam by $d\alpha_{BEC}$ 21140$da$ from $\alpha_{BEC}$ to $\alpha_{BEC}$(new)=$\alpha_{BEC}$+$d\alpha_{BEC}$ due to the overlapping of the optical beam energy with the material regions in which $d\alpha$ is non-zero.

Top Vertical Current Conduction Layer

On top of the electro-active layer EC 21500 is deposed of a top vertical current conduction layer TVC 21600 with thickness $d_{TVC}$ 21600$d$, width $W_{TVC}$ 21600$w$, and an averaged refractive index $n_{TVC}$ 21600$n$ Top Interspaced Dielectric Current Conduction Layer On top of the top vertical current conduction layer TVC 21600 is deposed of a top interspaced dielectric conduction layer TIDC 21650 with thickness $d_{TIDC}$ 21650$d$, width $w_{TIDC}$ 21650$w$, and an averaged refractive index $n_{TIDC}$ 21650$n$. This layer is optional in that when thickness $d_{TIDC}$ 21650$d$ is zero, this layer does not exist.

Top Vertical/Side Conduction and Ohmic Contact Layer

On top of the top interspaced dielectric conduction layer TIDC 21650 is deposed of a top vertical/side conduction and Ohmic contact layer TVSCOC 21700 with thickness $d_{TVSC}$ 21700$d$, width $w_{TVSC}$ 21700$w$, and an averaged refractive index $n_{TVSC}$ 21700$n$.

Top Metal Contact Pads

In one embodiment (FIG. 14*a*), on top of the top vertical/side conduction and Ohmic contact layer TVSCOC 21700 is deposed of a first top right metal contact pad FTRM 21800R with thickness $d_{FTRM}$ 21800Rd, width $w_{FTRM}$ 21800Rw, and length $g_{FTRM}$ 21800Rg. FTRM 21800R is typically to the right end on the top of TVSCOC 21700. In another embodiment (FIG. 14*b*), On top of the top vertical/side conduction and Ohmic contact layer TVSCOC 21700 is deposed of a first top left metal contact pad FTLM 21800L with thickness $d_{FTLM}$ 21800Ld, width $w_{FTLM}$ 21800Lw, and length $g_{FTLM}$ 21800Lg. FTLM 21800L is typically to the left end on the top of TVSCOC 21700. In as yet another embodiment (FIG. 14C), on top of the top vertical/side conduction and Ohmic contact layer TVSCOC 21700 is deposed of a first top middle metal contact pad FTMM 21800M with thickness $d_{FTMM}$ 21800Md, width $w_{FTMM}$ 21800Mw, and length $g_{FTMM}$ 21800Mg. FTMM 21800M is typically at the middle part on the top of TVSCOC 21700. Middle part is the portion closest to the beam BEC 21140. This case shown by FIG. 14C is particularly applicable when the top vertical/side conduction and Ohmic contact layer TVSCOC 21700 is an Ohmic Transparent Conductor (OTC) or Low-Refractive-Index Ohmic Transparent Conductor (LRI-OTC).

In an exemplary embodiment, only either the first top left, first top middle, or the first top right metal contact pad is present. In another exemplary embodiment, plurality of such top metal contact pads are present. The exact location of these top metal contact pads can be in many other locations beside the left or right location shown as long as the top metal contact pads are in electrical contact with the top vertical/side conduction and Ohmic contact layer TVSCOC 21700.

Top Metal Electrodes

On top of the first top left metal contact pad FTLM 21800L is a first top left metal electrode FTLME 21130L. On top of the first top middle metal contact pad FTMM 21800M is a first top middle metal electrode FTMME 21130M. On top of the first top right metal contact pad FTRM 21800R is a first top right metal electrode FTRME 21130R. In an exemplary embodiment, only either the first top left, first top middle, or the first top right metal electrode are present. In another exemplary embodiment, plurality of such top metal electrodes is present. The exact locations of these top metal electrodes can be in many other locations beside the left or right location shown as long as the top metal electrodes are in electrical contact with the respective top metal contact pads.

Electro-Active Waveguiding Core Structure and Central Waveguide Core Layer

Figure 15:
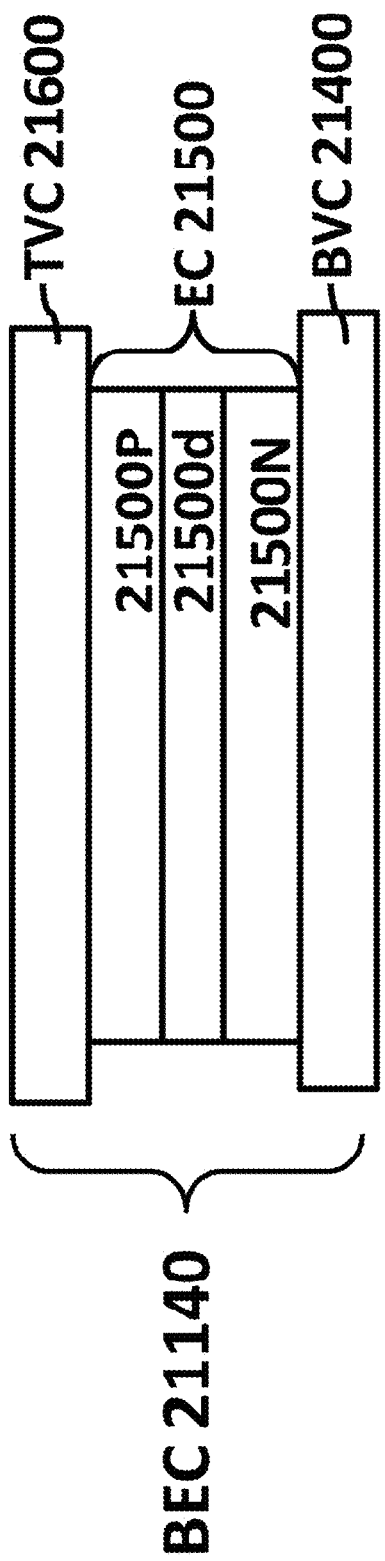
FIG. 15 shows a diagram illustrating a particular exemplary embodiment of an electro-active waveguiding core structure EWCoS 22600.

A layer or several layers that are in spatial proximity to the electro-active layer EC 21500 form an electro-active waveguiding core structure EWCoS 22600 at least a portion of it contains a central waveguide core layer WCo 22600Co. For the purpose of illustration and not limitation, a particular exemplary embodiment of an electro-active waveguiding core structure EWCoS 22600 is formed by the bottom vertical current conduction layer BVC 21400, the top vertical current conduction layer TVC 21600, and the electro-active layer EC 21500 as shown by FIG. 15. However, this electro-active waveguiding core structure can also be formed by any other layer or collection of layers as long as it is in spatial proximity to the electro-active layer so that the optical beam guided by it will have a reasonable amount of optical energy in the electro-active layer. The central waveguide core layer WCo 22600Co has an averaged refractive index $n_{WCo}$ 22600Con higher than the refractive index of most of the materials surrounding it. As is known to those skilled in the art, a waveguide core only needs its refractive index to be generally higher than the refractive indices of most of its surrounding materials in order to confine and guide optical beam (e.g. one example of such waveguides is commonly known as "rib waveguide" or "ridge waveguide"). For illustration and not limitation, in an exemplary embodiment, the central waveguide core layer WCo 22600Co is the electro-active layer EC 21500. As is known to those skilled in the art, the central waveguide core layer WCo 22600Co can also be in part of layer 21400 or layer 21600.

The central waveguide core layer WCo 22600Co has an averaged refractive index $n_{WCo}$ 22600Con higher than the refractive indices of most its surrounding and confines optical beam energy of beam BEC 21140, called the beam electro-active or beam EC, in the vertical and horizontal directions so that the peak of the beam intensity is within or near the central waveguide core layer 22600Co, and the optical beam is said to be a guided optical beam. The guided optical beam BEC 21140 in this electro-active waveguiding core structure EWCoS 22600 has a propagating refractive index $n_{BEC}$ 21140$n$ that is smaller than the material refractive index of the central waveguide core layer $n_{WCo}$ 22600Con so that $n_{BEC} < n_{WCo}$. This criterion can be taken as the definition of the material region that made up the waveguide core (i.e. it is the region in which the material refractive index is higher than the beam propagating refractive index $n_{BEC}$).

Electro-Active Waveguide Core and Cladding Regions for Beam EC

As is known to those skilled in the art, the entire electro-active waveguide core region for beam EC is the material region occupied by the beam EC, BEC 21140, in which the refractive index of the material is generally higher than $n_{BEC}$ 21140$n$. As is also known to those skilled in the art, the electro-active waveguide cladding regions for beam EC are the material regions occupied by the beam in which the refractive index of the material is generally lower than $n_{BEC}$. For the purpose of discussion, one may take the electro-active waveguiding core structure EWCoS 22600 mentioned above as defined by this electro-optic waveguide core region.

Thus, the electro-active layer 22500 may be or may not be part of the waveguide core region for beam guided in the EC-layer BEC 21140 as long as the electro-active layer 22500 is in spatial proximity to the waveguide core region for EC-layer beam BEC 21140 so that a reasonable amount of the beam's optical energy is in the electro-active layer. Even if the electro-active layer 22500 is part of the waveguide core region, it is not necessarily the entire waveguide core region for EC-layer beam BEC 21140.

Beam Transport to Electro-Active Waveguide Core Structure

Most of the input optical beam energy of input beam IBM 22140 is transported from input tapering waveguide core ITWCo 22300 to the electro-active waveguide core structure EWCoS 22600, through the input tapering waveguide region between z1=z1ALS 22300z1ALS and z1=$g_{ITWCo}$ 22300$g$, where the tapering waveguide core width $w_{ITWCo-z1}$ 22300$w$-z1 varies to a value of $w_{ITWCo-g}$ at z1=$g_{ITWCo}$ 22300$g$ from its value at z1=z1ALS 22300z1ALS (it can be the same value as, smaller than, or larger than its value at z1=z1ALS 22300z1ALS). In a preferred embodiment, for the purpose of illustration and not limitation, this is enabled by reducing the tapering waveguide core width from a value approximately equal to or larger than half the optical wavelength in the waveguide core given by $\lambda_{bm}/(2*n_{ITWCo})$, to well below half the optical wavelength in the waveguide core given by $\lambda_{bm}/(2*n_{ITWCo})$ so that $W_{ITWCo-g} \ll \lambda_{bm}/(2*n_{ITWCo})$, where * is numerical multiplication. More exactly, it is reduced from a width that is a width that enables the optical energy to be well confined in the waveguide core ITWCo 22300 just before it enters the ALS 22500 to a width (after it enter the ALS 22500) such that the optical energy is no longer well confined in the waveguide core ITWCo 22300 after it enters the ALS 22500 (the width for no longer well-confined is defined by the beam confinement after the taper waveguide core enters ALS 22500). Well confined means over 50% of the beam energy is in the waveguide core ITWCo 22300. Depending on the application situation, this can mean a smaller width (e.g. if the refractive index of the EC layer is approximately equal to or lower than the refractive index of the input tapering waveguide). It can also maintain the same width or even go to a larger width (e.g. if the refractive index of the EC layer is higher than the refractive index of the input tapering waveguide).

After the energy is transported to electro-active waveguide core structure EWCoS 22600 that contains the electro-active layer EC 21500, the optical beam is denoted as optical beam in the electro-active region or EC layer beam, BEC 21140.

Output Connecting Waveguide

Output connecting waveguide core OCWCo 28200. The output connecting waveguide core OCWCo 28200 is fabricated on an output connecting-waveguide bottom cladding material OCWBCd 28200B disposed on a substrate SUB 21100 (FIG. 16).

Figure 16:
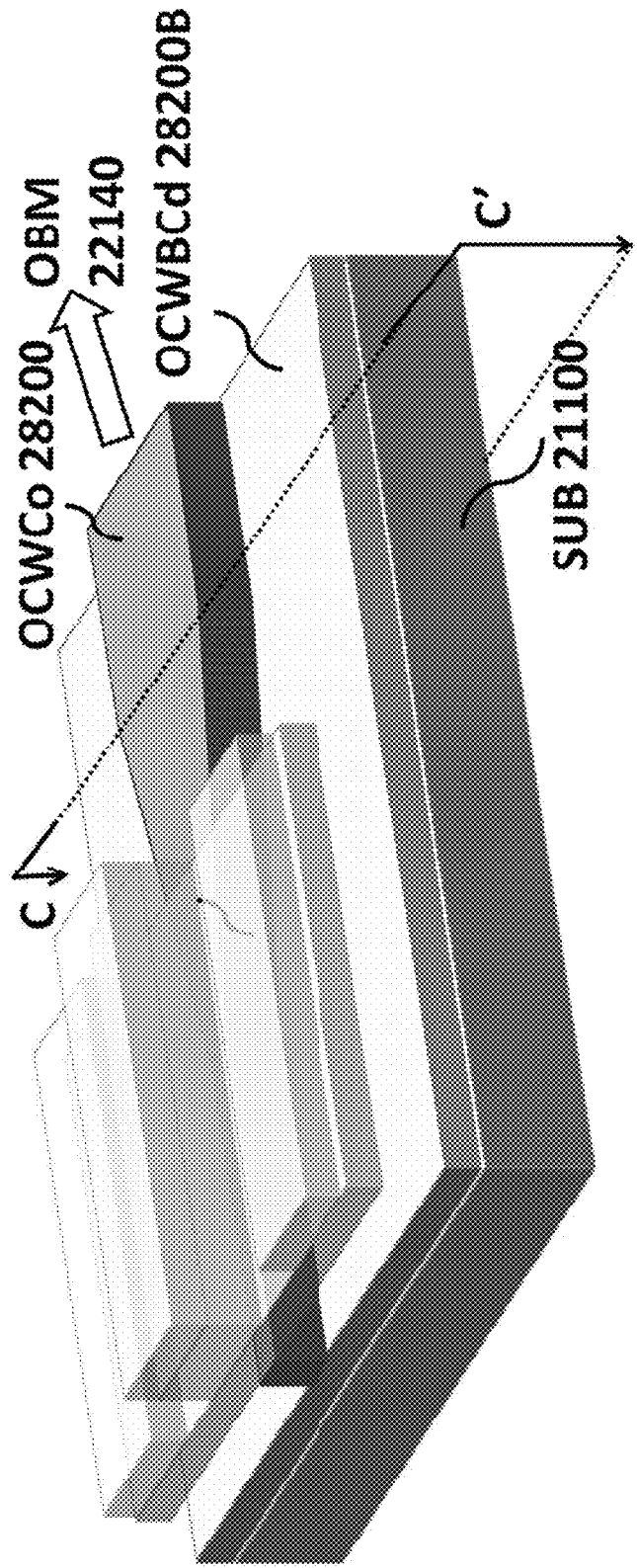
FIG. 16 shows a diagram illustrating the output connecting waveguide structure.
Figure 17:
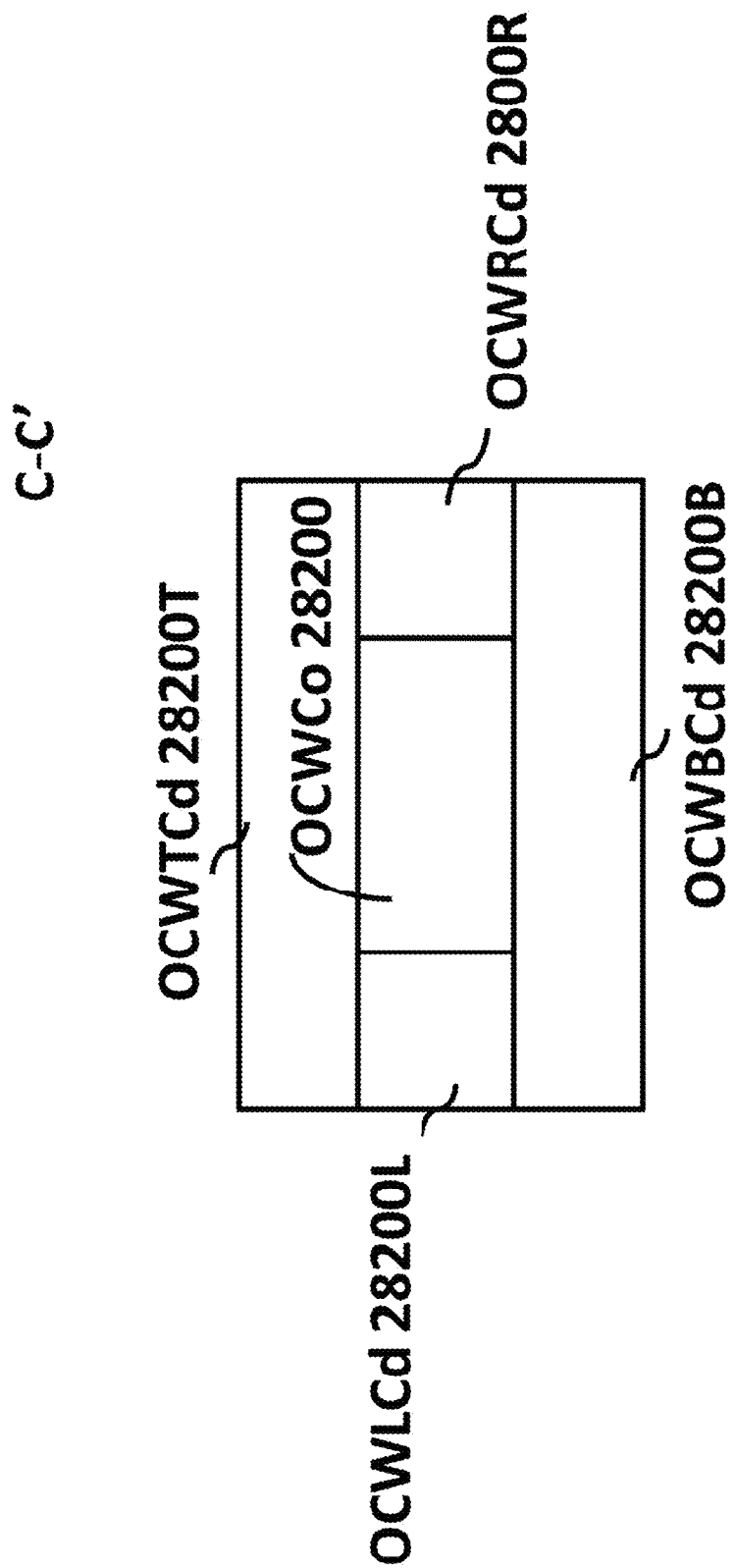
FIG. 17 shows a diagram illustrating the division of the output connecting waveguide cladding into four different regions.

In one exemplary embodiment shown in FIG. 17, illustrating an exemplary embodiment of the cross section at location C-C' of FIG. 16, to the top of the output connecting waveguide core is further deposed with output connecting waveguide top cladding material OCWTCd 28200T (FIG. 17). Bottom refers to direction closer to the substrate and top refers to direction away from the substrate. To the left of the input connecting waveguide core is deposed with output connecting waveguide left cladding material OCWLCd 28200L and to the right of the waveguide core is disposed with output connecting waveguide right cladding material OCWRCd 28200R. Right or left is taking the direction of beam propagation as the front direction and right or left means relative to this front direction. The division of the cladding into four different material regions as illustrated by FIG. 17 is for the purpose of discussion and not limitation as these can be all the same materials or there can be more than 4 material regions forming plurality of different material regions as long as these regions act as waveguide cladding materials with effective refractive index generally smaller than the effective refractive index of the waveguide core OCWCo 28200 so that the light beam power is confined near the region of the waveguide core OCWCo 28200, as is well known to those skilled in the art. The cladding material is a general designation that can include "air" or "vacuum" or transparent dielectric material as the material.

Output Connecting Waveguide Region

The output connecting waveguide core OCWCo 28200 is made up of a material or mixture of materials with an averaged material refractive index $n_{OCWCo}$ 28200$n$, has a thickness $d_{OCWCo}$ 28200$d$, and width $W_{OCWCo}$ 28200$w$. Let the refractive index of the bottom input connecting-waveguide bottom cladding material be $n_{OCWBCd}$ 28200Bn. Let the refractive index of the top cladding material OCWTCd 28200T be $n_{OCWTCd}$ 28200Tn, the refractive index of the left cladding material OCWLCd 28200L be $n_{OCWLCd}$ 28200Ln, and the refractive index of the right cladding material OCWRCd 28200R be $n_{OCWRCd}$ 28200Rn. The waveguide core 28200 and the claddings 28200T, 28200B, 28200R, 28200L, together forms output connecting waveguide OCWG 28200WG.

The vertical confinement of the optical beam, called output optical beam OBM 28140, in the output connecting waveguide is due to the refractive-index difference between the top and bottom waveguide claddings and the waveguide core and the claddings generally have lower refractive indices than that of the waveguide core so that $n_{OCWTCd} < n_{OCWCo}$ and $n_{OCWBCd} < n_{OCWCo}$. The horizontal confinement of the optical beam is due to the refractive-index difference between the left and right waveguide claddings and the waveguide claddings generally have lower refractive indices than that of the waveguide core so that $n_{OCWRCd} < n_{OCWCo}$ and $n_{OCWLCd} < n_{OCWCo}$. The vertical direction is the direction perpendicular to the substrate plane and the horizontal direction is the direction parallel to the substrate plane. The output beam has a propagating refractive index given by $n_{OBM}$ 28140n.

An important quantity in terms of waveguide mode confinement is the refractive index contrast between the averaged refractive index of the waveguide core and its immediate surrounding cladding materials called the refractive-index difference $n_{Rd}$ defined by $n_{Rd}^2 = (n_{Co}^2 - n_{Cd}^2)$, where $n_{Co}$ is the refractive index of the waveguide core (e.g. $n_{Co} = n_{OCWCo}$) and $n_{Cd}$ is the refractive index of the waveguide cladding (e.g. $n_{Cd} = n_{OCWBCd}$ or $n_{OCWTCd}$ or $n_{OCWRCd}$ or $n_{OCWLCd}$) or an averaged of them thereof given by $n_{aOCWCd}$ 28200aCdn. The refractive-index averaging is more accurately done as averaged of its square values which are their dielectric constant $\varepsilon = n^2$, as illustrated by Eq. (3).

Likewise the waveguide core can also be made up of one or plurality of materials, and $n_{OCWCo} = n_{aOCWCo}$ can also be an averaged refractive index of the "m" materials with slightly different refractive indices $n_{OCWCo1}$, $n_{OCWCo2}$, $n_{OCWCo3}$ ... $n_{OCWCo\,m}$, that made up of the waveguide core materials.

Output Beam Coupler Structure (OBCS) Region

Figure 18A:
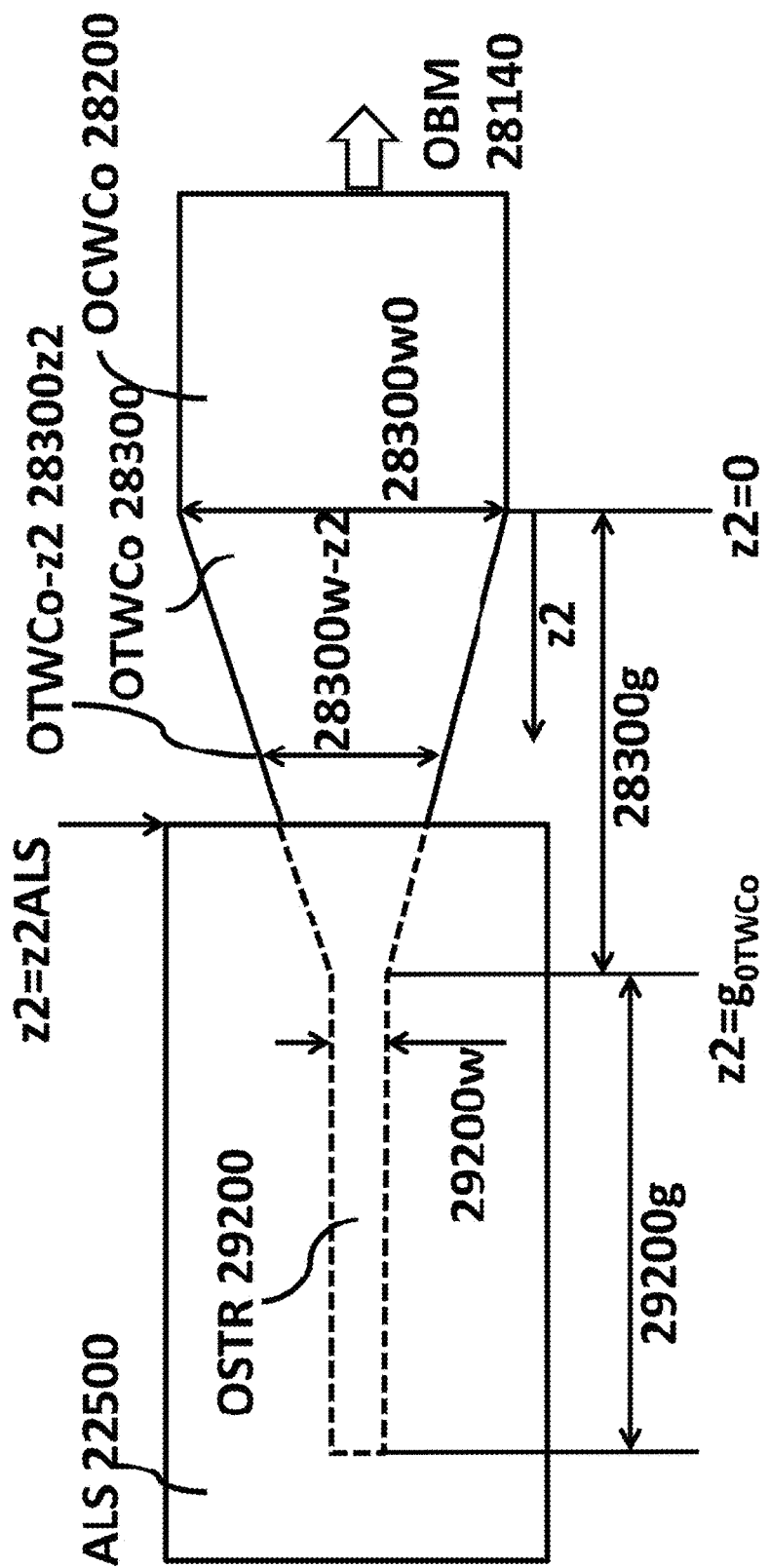
FIGS. 18a and 18b show diagrams illustrating the output beam coupler structure (OBCS)
Figure 18B:
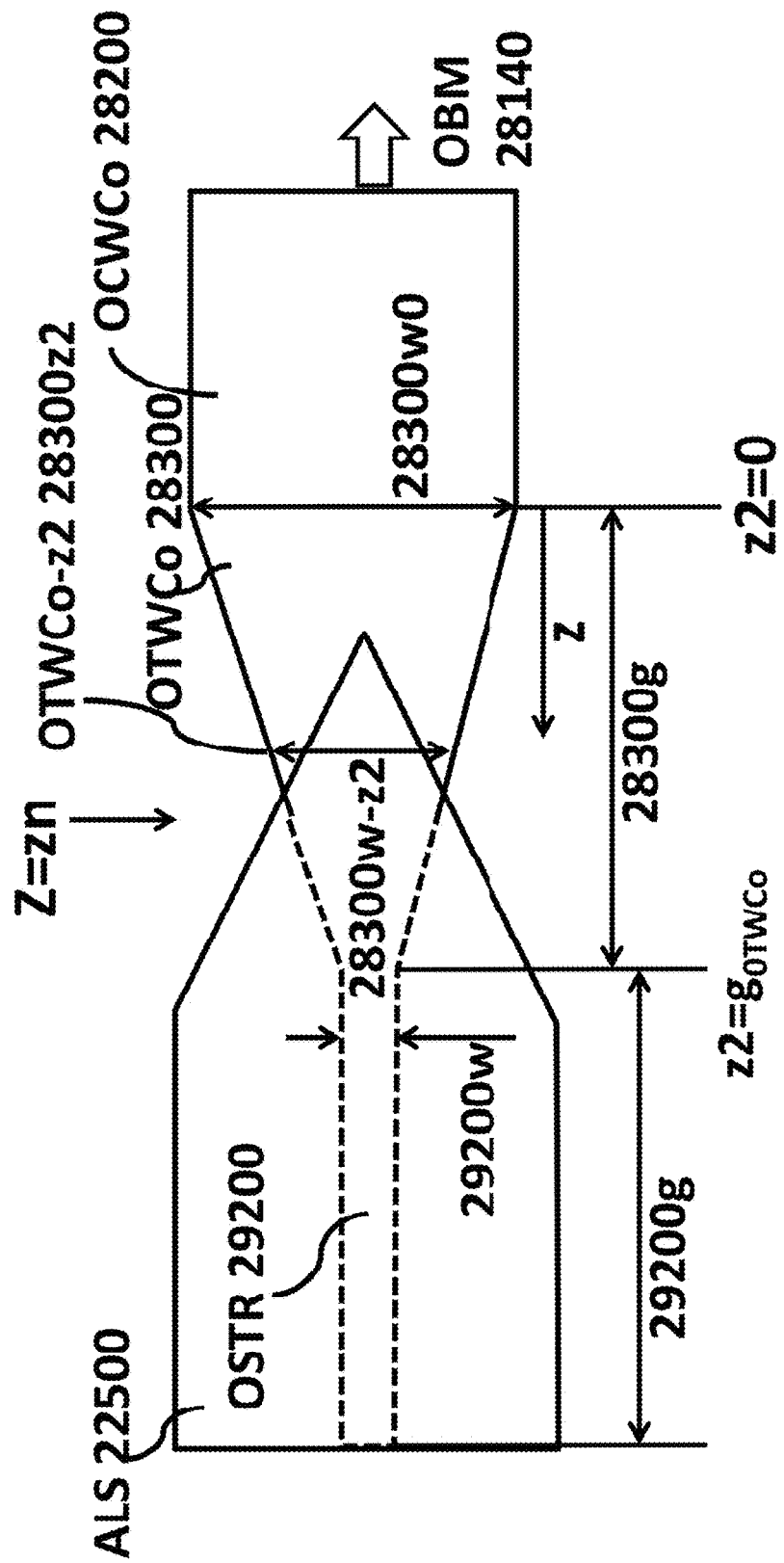

FIG. 18 shows the output beam coupler structure (OBCS) comprises at least a tapering waveguide section (preferably tapering from wide to narrow but can also maintain the same width or taper from narrow to wide as will be elaborated below) connected to the input waveguide. Optionally, the active layer structure ALS on top of the output tapering waveguide section can also be tapering in the form of an up taper (preferably tapering from narrow to wide in the direction toward the active layer structure ALS, but can also maintain the same width or taper from wide to narrow). See for example FIG. 18b.

Specifically, the energy of the electro-active beam BEC 21140 in the electro-active waveguiding core structure EWCoS 22600 is coupled efficiently to the output optical beam IBM 28140 energy in the output connecting waveguide core OCWCo 28200 via propagating through an output connecting-waveguide taper region. The output connecting-waveguide taper region has a output tapering waveguide core OTWCo 28300. The output tapering waveguide core at a location z2 is denoted by OTWCo-z2 28300z2 (FIG. 18a), at which the width of the tapering waveguide core is denoted by $w_{OTWCo-z2}$ 28300w-z2. The distance or location parameter z2 is given by the distance measured from the beginning point of the taper that is at a point along the output connecting waveguide core OCWCo 28200, typically outside (or away from) the ALS region. It is changed from its input value at z2=0 $w_{OTWCo-z2}$=0 28300w-z2=0 of $w_{OTWCo-z2=0} = w_{OCWCo}$ 28200 to another width (that can be the same width) at z2>0 $w_{OTWCo-z2>0}$ 28300w-z2>0. The thickness of the tapering waveguide core is $d_{OTWCo-z1}$ 28300d-z2 and its refractive index is $n_{OTWCo-z1}$ 28300n-z2. Typically, though not always, $d_{OTWCo-z2}$ 28300d-z2 and $n_{OTWCo-z2}$ 28300n-z2 are constant value in z2 so we can drop the z2 designation with $d_{OTWCo-z2} = d_{OTWCo}$ 28300d and $n_{OTWCo-z2} = n_{OTWCo}$ 28300n. In a preferred embodiment, $d_{OTWCo-z2}$ is about the same value as $d_{OCWCo}$. The tapering may be such that $w_{OTWCo-z2}$ is a linear function of z2 or quadratic function of z2 (i.e. depending on z2$^2$), but can also be of any curvilinear function of z2. Let $g_{OTWCo}$ denote the total length of this tapering waveguide.

The end of the taper at z2=$g_{OTWCo}$ 28300g, typically inside (or toward) the ALS region at which the width of the waveguide core is $w_{OTWCo-g}$ 28300w-g, is connected to output supporting structure OSTR 29200 that may be a continuation from and in some way physically connected to the input supporting structure ISTR 21200 or may be independent of it. While illustrated as a line that is continuation of the connecting waveguide material with a narrow width and air or other low refractive index materials surrounding its side, the output supporting structure can be random dots or any shape of small amount of any materials that have a low "effective refractive index" or small "averaged refractive index" (e.g. as defined by Eq. (3)) as is known to those skilled in the art, comparing to the refractive index of the waveguide core $n_{wCo}$ 22600Con in the electro-active waveguiding core structure EWCoS 22600, resulting in an effective averaged refractive index $n_{aOSTR}$ 29200na for this entire layer of supporting structure. The output supporting structure OSTR 29200 may continue to guide wave or just acts as a supporting structure, depending on application scenarios.

In an exemplary embodiment, the output supporting structure OSTR 29200 is a narrow line. In that particular case, we can describe it as having a width $w_{OSTR}$ 29200w, thickness $d_{OSTR}$ 29200d, and length $g_{OSTR}$ 29200g. The length $g_{OSTR}$ 29200g may be zero. In that case, output supporting structure OSTR 29200 does not exist (the thin ALS film can still be supported by its corners or sides, but not directly below). In a preferred embodiment, $d_{OSTR}$ is about the same value as $d_{OCWCo}$. At some point the output supporting structure OSTR 29200 merges with the input supporting structure ISTR 21200 and thus ISTR 21200 and OSTR 29200 may be used interchangeably.

In region outside the ALS region, the vertical confinement of the optical beam along the taper is due to the refractive-index difference between the tapering waveguide core and the top and bottom tapering waveguide claddings at the location z defined above: OTWTCd-z2 28300T-z2 (refractive index $n_{OTWTCd-z1}$ 28300Tn-z2) and OTWBCd-z1 28300B-z2 (refractive index $n_{OTWBCd-z1}$ 28300Bn-z2) and the waveguide core and the claddings generally have lower refractive indices than that of the waveguide core so that the refractive index $n_{OTWTCd-z2} < n_{OTWCo-z2}$ and $n_{OTWBCd-z2} < n_{OTWCo-z2}$. The horizontal confinement of the optical beam is due to the refractive-index difference between the left and right waveguide claddings at z2: OTWLCd-z2 28300L-z2 (refractive index $n_{OTWLCd-z2}$ 28300Ln-z2) and OTWRCd-z2 28300R-z2 (refractive index $n_{OTWRCd-z2}$ 28300Rn-z2), and the waveguide claddings generally have lower refractive indices than that of the waveguide core so that $n_{OCWRCd-z2} < n_{OCWCo-z2}$ and $n_{OCWLCd-z2} < n_{OCWCo-z2}$. The vertical direction is the direction perpendicular to the substrate plane and the horizontal direction is the direction parallel to the substrate plane. Again, there can be one or a plurality of cladding material regions and the four cladding material regions are mentioned for the purpose of illustration and not limitation.

In an exemplary embodiment, $n_{OTWTCd-z2}=n_{OTWBCd-z2}=n_{OTWLCd-z2}=n_{OTWRCd-z2}=n_{OCWTCd}$, and $n_{OCWTCd}=n_{OCWBCd}=n_{OCWLCd}=n_{OCWRCd}$ so all the cladding indices in the tapering regions and the input connecting waveguide regions are all approximately equal. For example, these cladding regions can be filled with silicon dioxide materials with refractive index of n~1.45. The refractive index of the waveguide core $n_{OTWCo-z2}$ 28300n-z2 can be silicon so that $n_{ITWCo}=n_{OCWCo}\sim 3.6$, where $n_{OCWCo}$ 28200n is the refractive index of the waveguide core for the input connecting waveguide.

On top of the tapering waveguide core OTWCo 28300 starting at z2=z2ALS 28300z2ALS, is laid with an active layer structure ALS 22500. Typically z2ALS is before $g_{OTWCo}$ so that $0<z2ALS<g_{OTWCo}$. An "active layer" is a material layer that can give optical gain or optical absorption or change in the refractive index. The various embodiments of this active layer structure ALS 22500 have already been described above.

Active Layer Structure-Beam Transport from the Structure to Output

Most of the output optical beam energy of beam OBM 28140 is transported to output tapering waveguide core OTWCo 28300 from the electro-active waveguiding core structure EWCoS 22600, through the output tapering waveguide region that typically lies inside the ALS region, between $z2=g_{OTWCo}$ 28300g and z2=z2ALS 28300z2ALS, where the tapering waveguide core width $w_{OTWCo-z1}$ 28300w-z2 varies from a value of $w_{OTWCo-g}$ at $z2=g_{OTWCo}$ 28300g to a value of $w_{OTWCo-z2ALS}$ at z2=z2ALS 28300z2ALS (it can be the same value as, smaller than, or larger than its value at z2=z2ALS 28300z2ALS). In a preferred embodiment, for the purpose of illustration and not limitation, this is enabled by changing the tapering waveguide core width at z2=z2ALS 28300z2ALS from a value approximately equal to or larger than half the optical wavelength in the waveguide core given by $\lambda_{bm}/(2*n_{OTWCo})$, to well below half the optical wavelength in the waveguide core at $z2=g_{OTWCo}$ 28300g given by $\lambda_{bm}/(2*n_{OTWCo})$ so that $w_{OTWCo-g}<<\lambda_{bm}/(2*n_{OTWCo})$, where * is number multiplication. More exactly, it is increased from a narrow width (in a region inside the ALS 22500) for which the optical energy is not well confined in the waveguide core OTWCo 28300 (the width for not well-confined is defined by the beam confinement in the waveguide core OTWCo 28300) to wider width that enables the optical energy to be well confined in the waveguide core OTWCo 28300 just around when it exits the ALS 22500 region.

Well confined means over 50% of the beam energy is in the waveguide core OTWCo 28300. Depending on the application situation, this can mean a smaller width (e.g. if the refractive index of the EC layer is approximately equal to or larger than the refractive index of the input tapering waveguide). It can also maintain the same width or even go to a larger width (e.g. if the refractive index of the EC layer is higher than the refractive index of the input tapering waveguide).

After the energy is transported from the electro-active waveguiding core structure EWCoS 22600 that contains the electro-active layer EC 21500 down to the output taper at z2=Z2ALS and further propagated to the taper starting location at z2=0 where the taper core width is $w_{OTWCo-z2=0}$ 28300w-z2=0 and $w_{OTWCo-z2=0}=w_{OCWCo}$ 28200, the optical beam is denoted as output optical beam or beam OBM 28140. Note that at z2=0, the output tapering waveguide core OTWCo-z2 28300z2 is joined to output connecting waveguide core OCWCo 28200.

Length of Active Layer Structure

The active layer structure ALS runs a length from the input tapering waveguide core ITWCo 22300 at z1=z1ALS to the output tapering waveguide core OTWCo 28300 at z2=z2ALS. Along the ALS structure, the distance from z1=z1ALS is parameterized as coordinate z. Location z thus measures a specific location along the length of the active layer structure ALS 22500. The total length of ALS 22500 from z1=z1ALS to z2=z2ALS is called the structure length of the active photonic device $SL_{mod}$ 22550. Coordinate z ends at z2=z2ALS at which $z=SL_{mod}$.

Along z, the various widths and thicknesses of each of the layers in the ALS may vary and do not necessarily have to stay constant. As is known to those skilled in the art, such variation in widths and thicknesses will not affect the general performance of the active photonic devices. In addition, there may be more or fewer layers in the ALS other than specified as long as the functionalities of those layers specified are equivalently performed by the additional or fewer layers. As is known to those skilled in the art, such variations will not affect the general performance of the active photonic devices. Hence, the various ALS structural variations as described above are for the purpose of illustration and not limitation.

Active Layer Structure-Electro Active Layer

The active material ACM 21500M in EC layer 21500 can be any active material as is known to those skilled in the art in which an applied electric field will change its refractive index or optical absorption or optical gain in at least a portion of the material. The entire structure described above can be used with any active material in layer 21500. While we illustrate a particular semiconductor active material below, it is only one of the many possibilities, and is to illustrate a particular preferred embodiment of the active photonic devices in the present invention. They are not meant to limit the scope of the invention.

Semiconductor EC Material Layer

Figure 19:
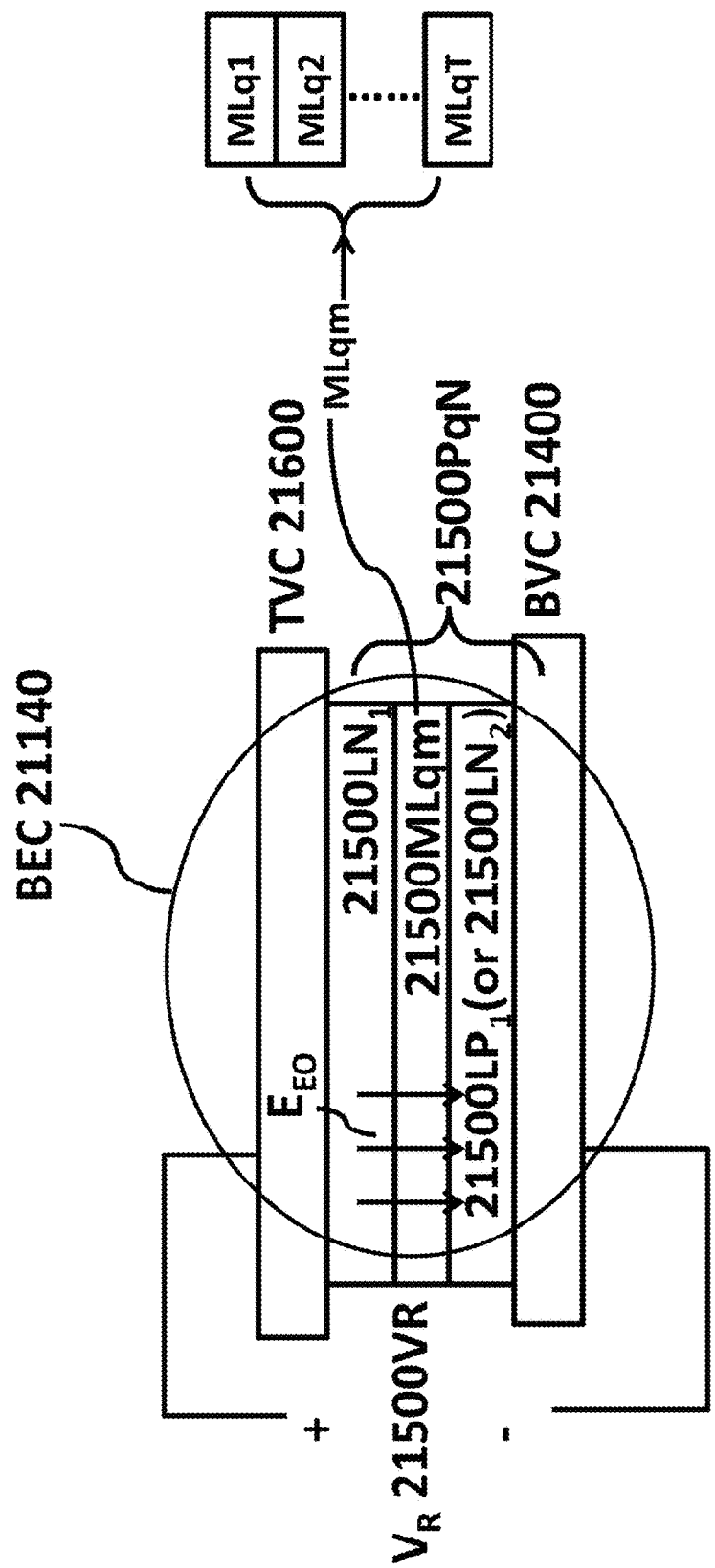
FIG. 19 shows a diagram illustrating the electro-active layer (ECL).

As noted, the electro-active layer EC need not be made of semiconductor materials. As an exemplary embodiment, in the case for which the electro-active layer is made of semiconductor based material as shown in FIG. 19, the structure in the electro-active layer could comprise a PN junction 21500PN in which a first P-layer 21500LP$_1$ with P-type carrier dopant or called P-dopant (i.e. the resulting carriers from the dopant atoms are holes) and dopant density given by $P_1$, 21500P$_1$ is vertically physically connected (vertical means in a direction perpendicular to the substrate plane; horizontal means in a direction parallel to the substrate plane) to a first N-layer 21500LN$_1$ with N-type carrier dopant or called N-dopant (i.e. the resulting carriers from the dopant atoms are electrons) and dopant density given by $N_1$ 21500N$_1$. Depending on the application situations, the electro-active layer may be the entire PN structure itself or may be part of the PN structure or may be just electrically connected to the PN structure.

Alternatively, the electro-active layer structure could also comprise a PqN junction 21500PqN in which a first P-layer 21500LP$_1$ with P-dopant and dopant density given by P$_1$ 21500P$_1$ is connected to a middle q-layer with either N dopant, P dopant, or being intrinsic "I" (i.e. commonly means with very low dopant or no dopant or being an Intrinsic semiconductor material) labeled as 21500MLqm (e.g. it will be labeled as 21500MLI$_m$ if it is intrinsic (i.e. undoped or being an intrinsic semiconductor material), 21500MLN$_m$ if it is N doped, and 21500MLP$_m$ if it is P-doped; m is an integer to sub-label the layer number and dopant density given by Mq$_m$, 21500Mq$_m$ (e.g. it will be labeled as 21500MI$_1$ if it is intrinsic I$_1$, 21500MN$_1$ if it is N$_1$ doped, and 21500MP$_1$ if it is P$_1$-doped), and the middle q-layer is further connected to a first N-layer 21500LN$_1$ with N$_1$-dopant and dopant density given by N1 21500N$_1$. This middle q-layer may be made up of plurality of one or more doped layers 21500MLq1, 21500MLq2, . . . 21500MLqT, where T is an integer specifying the number of layers. Depending on the application situations, the electro-active layer may be the entire PqN structure itself or may be part of the PN structure or may be just electrically connected to the PqN structure.

Further alternatively, the electro-active layer structure could comprise a NqN junction 21500NqN in which a first N-layer 21500LN$_1$ with N-dopant and dopant density given by N$_1$ 21500N$_1$ is connected to a middle q-layer with either N dopant, P dopant, or being intrinsic "I" (i.e. commonly means with very low dopant or no dopant or being an intrinsic semiconductor material) labeled as 21500MLqm (e.g. it will be labeled as 21500MLI$_m$ if it is intrinsic (i.e. undoped or being an Intrinsic semiconductor material), 21500MLN$_m$ if it is N doped, and 21500MLP$_m$ if it is P-doped; m is an integer to sub-label the layer number) and dopant density given by Mq$_m$, 21500Mq$_m$ (e.g. it will be labeled as 21500MI$_1$ if it is intrinsic I$_1$, 21500MN$_1$ if it is N$_1$ doped, and 21500MP$_1$ if it is P$_1$-doped), and the middle q-layer is further connected to a second N-layer 21500LN$_2$ with N$_2$-dopant and dopant density given by N$_2$ 21500N$_2$. This middle q-layer may be made up of plurality of one or more doped layers 21500MLq1, 21500MLq2, . . . 21500MLqT, where T is an integer specifying the number of layers. Depending on the application situations, the electro-active layer may be the entire NqN structure itself or may be part of the NqN structure or may be just electrically connected to the NqN structure.

Further alternatively, the electro-active layer structure could comprise a XqY junction 21500NqN in which a first X-layer 21500LX$_1$ is connected to a middle q-layer with either N dopant, P dopant, or being intrinsic "I" (i.e. commonly means with very low dopant or no dopant or being an intrinsic semiconductor material) labeled as 21500MLqm (e.g. it will be labeled as 21500MLI$_m$ if it is intrinsic (i.e. undoped or being an Intrinsic semiconductor material), 21500MLN$_m$ if it is N doped, and 21500MLP$_m$ if it is P-doped; m is an integer to sub-label the layer number) and dopant density given by Mq$_m$, 21500Mq$_m$ (e.g. it will be labeled as 21500MI$_1$ if it is intrinsic I$_1$, 21500MN$_1$ if it is N$_1$ doped, and 21500MP$_1$ if it is P$_1$-doped), and the middle q-layer is further connected to a second Y-layer 21500LY$_1$. This middle q-layer may be made up of plurality of one or more doped layers 21500MLq1, 21500MLq2, . . . 21500MLqT, where T is an integer specifying the number of layers. Depending on the application situations, the electro-active layer may be the entire XqY structure itself or may be part of the XqY structure or may be just electrically connected to the XqY structure. In the above, X$_1$ and Y$_1$, each may either be N-doped, P-doped, or being an intrinsic "I" semiconductor, and X$_1$ and Y$_1$ can be doped differently with different dopant type.

The P and N dopants may have spatially varying profiles in terms of their doping density (number of dopant carriers per unit volume) and the profiles may vary from one application to another. While there are various mode of operation for the active material, a commonly used mode is to apply reverse bias voltage V$_R$ 21500VR across the above-mentioned PN or PqN layers (with negative voltage on the P side and positive voltage on the N side), so that an electric field E$_{EC}$ is generated to go across part of the EC layer 21500.

Depending on the application, for the abovementioned PN or PqN or NqN or XqY structure, the N$_1$ doped layer may be above or below the P$_1$-doped layer (above means further away from the substrate and below means closer to the substrate). The EC layer 21500 may have quantum wells in the structure, typically in the q layer or close to the PN junction. At least one of the first P-layer, first N-layer, or the middle q-layer contains at least one quantum well. One or more quantum wells can also be in both the first P-layer and first N-layer or in all the three layers: first P-layer, first N-layer, and middle q-layer or just in the middle q-layer. The quantum wells can be strained, unstrained, or double-well or multiple-well quantum wells as is known to those skilled in the art. It can also have no quantum well.

As an exemplary illustration, without quantum wells and without carrier doping in the q layer, in the case of EO modulation, the main electro-optic phase shift will be due mainly to linear electro-optic (LEO) effect. If q has carrier doping (N or P) then it will add plasma (PL) and bandfilling (BF) effect. If q layer has quantum wells, then quantum-confined stark effect (QCSE) will be added to enhance the EO phase shift. If the PqN is forward bias, then a lot of carriers will be injected into the q layer, causing refractive index change due to carrier injections or depletions. This may give significant phase shifts in the electro active (EC) material layer just due to PL and BF effects. However such modulator will be slow as removing the carrier is a slow process, typically at nano second speed or slower (e.g. <1 GHz). In order to go to high modulation frequency (e.g. >1 GHz), typically revise biased is applied. In that case the electric field in the q layer will cause carrier depletion which will also give rise to PL or BF effects, and the electric field will cause LEO effect (with or without quantum wells) and QCSE also (with use of quantum wells). The PL, BF, QCSE can also cause the absorption coefficient α$_{EC}$ to change (α$_{EC}$>0 gives optical absorption) resulting in electro-absorption modulation, depending on the operating wavelength. As is known to those skilled in the art, for electro-absorption modulation, the operating optical wavelength is typically at relatively close to the band edge (edge of the material or quantum-well bandgap). For electro-optic modulation, the operating optical wavelength is typically at relatively far from the band edge (edge of the material or quantum-well bandgap). With carrier injection, it may also give population inversion resulting in optical gain (α$_{EC}$<0 gives optical gain) and hence giving rise to optical gain induced optical intensity or phase modulation or optical energy amplification or light emission or lazing action or photodetection or all-optical switching or all optical signal processing.

The averaged incremental change in the refractive index dn$_{EC}$ 21500dn or change in the optical intensity loss/gain coefficient dα$_{EC}$ 21500da of at least part of the material in the semiconductor electro-active layer 21500 can be caused by an applied electric field E$_{EC}$ 21500E, an electric current $C_{EC}$ 21500C, or either injection or depletion of carriers in the electro-active layer 21500 (note $dn_{EC}$ 21500$dn$ is not the same as $n_{EC}$ 21500$n$, which is the averaged refractive index of the entire EC layer 21500 when there is no field).

These effects due to change in $\alpha_{EC}$ will result in electro-absorption or gain based modulators, instead of electro-optic modulators, and will also result in optical amplifier, laser, light-emitting device, plasmonic optical waveguide based device, photodetector, optical intensity or phase modulator, optical switch (controlled electrically), wavelength converter, and all-optical device (including devices that are controlled optically such as all-optical wavelength converter, optically-pumped device, all-optical switch, all-optical logic gate, and all-optical signal processing device), and are a particular embodiment of the present invention.

Voltage and Current Conduction to the Electro-Active Layer

As shown in FIG. 19, the semiconductor electro-active layer EC 21500 is electrically connected to the top vertical current conduction layer TVC21600 on the top side and is electrically connected to the bottom vertical current conduction layer BVC 21400 on the bottom side. Bottom side is the side nearer to the substrate 21100. Two materials are electrically connected if an electric current can be passed between the two materials with a total electrical resistance times area lower than about 10 Ω-cm² so that for 10,000 μm² area, the total contact resistance is less than about 100,000 Ω=100 kΩ (10,000 μm² area is the area for a relatively large 5 mm-long, 2 μm-wide active device).

The Use of PN Junction or Tunnel PN Junction to Reduce P-dopant Optical Loss As an illustration but not limitation, for the EC 21500 layer, if its N layer is below the P layer, then the bottom vertical current conduction layer BVC 21400 can be (not always) an N-doped semiconductor material and the top vertical current conduction layer TVC 21600 can be (not always) a P-doped semiconductor material to enable easy current conduction without significant voltage dropped. The problem is that P-doped material has much higher (typically 10 times) electrical resistance and optical absorption than that of N-doped material at the same dopant density.

As will be noted below, this can be addressed as with use of a "forward-bias PN junction", it is possible to make electrical connection to region of opposite dopant type without significant voltage dropped and that could have certain advantages. We will refer to this as a "PN-changing PN junction" (labeled as PNCPN junction) to distinguish it from the PN junction inside EC layer 21500. Such PNCPN junction will conduct current or voltage when it is forward biased. Note that if such a PN-changing PN junction has highly doped P and N layers, it can also be conducting electricity even when it is under a reverse bias. In that case we called it a tunnel junction as the current conduction is depending of some type of carrier tunneling across the reverse-biased junction, as is well known to those skilled in the art. Then in that case, it can be used for when the PN junction inside EC layer 21500 PN junction is either reverse or forward biased. Thus, when we call it "PN-changing PN junction", it will be generally referred to when the PN layer involved is either forward bias and conducting current or when it is highly doped and reverse biased but acts as a current-conducting tunneling junction.

Figure 20A:
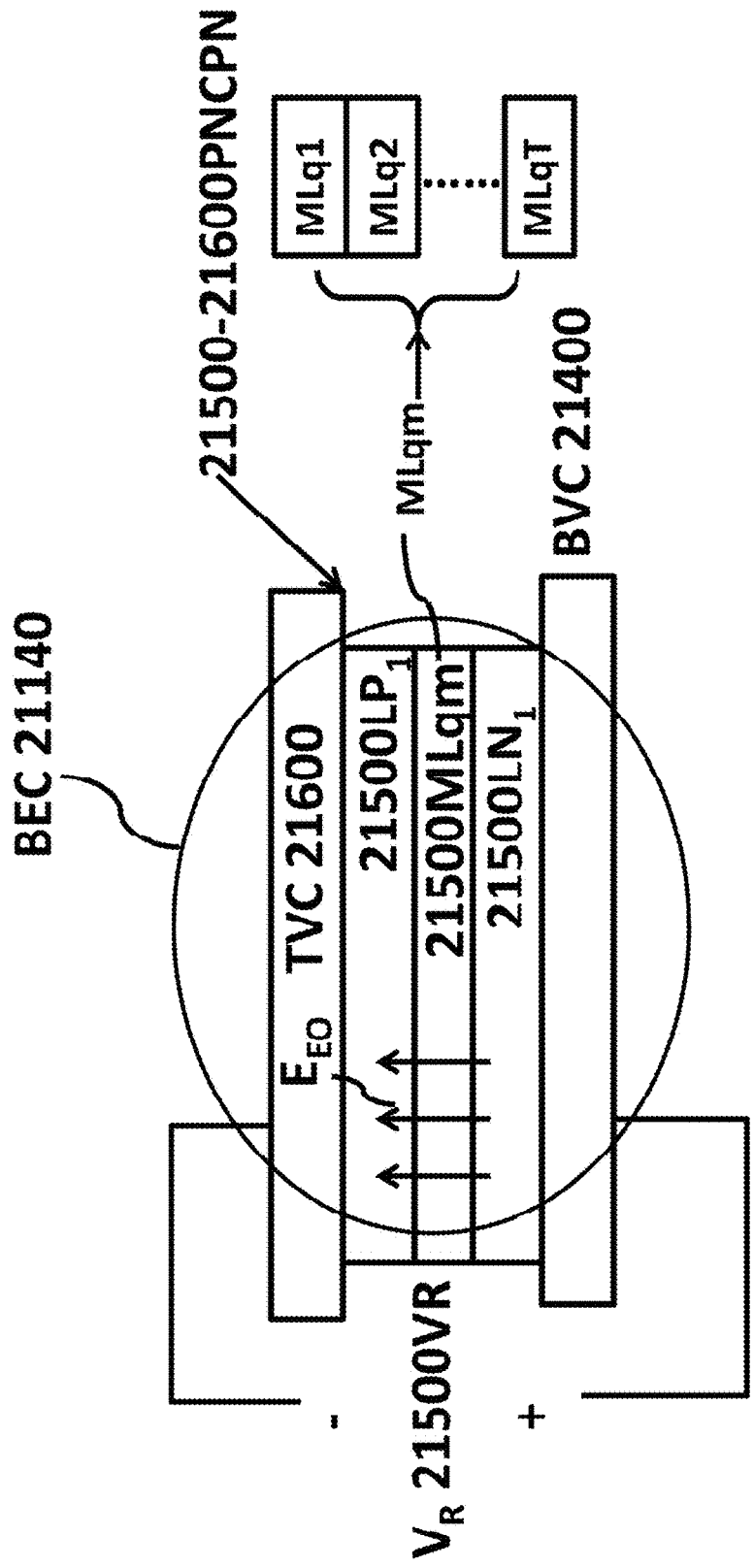
FIG. 20a shows a diagram illustrating the structure around the PqN, NqN, or PN junction.

For example, as shown in FIG. 20a, suppose in the abovementioned PN or PqN or XqY structure, the N doped layer is below the P-doped layer, then in that case the top vertical current conduction layer TVC 21600 can also be an $N_2$-doped (subscript 2 is just to label doping in this layer) semiconductor material in contact with the top layer of EC layer 21500 that is $P_1$ doped (called layer 21500LP₁), resulting in a PNCPN junction between layer 21600 and 21500 labeled as 21600-21500PNCPN.

Figure 20B:
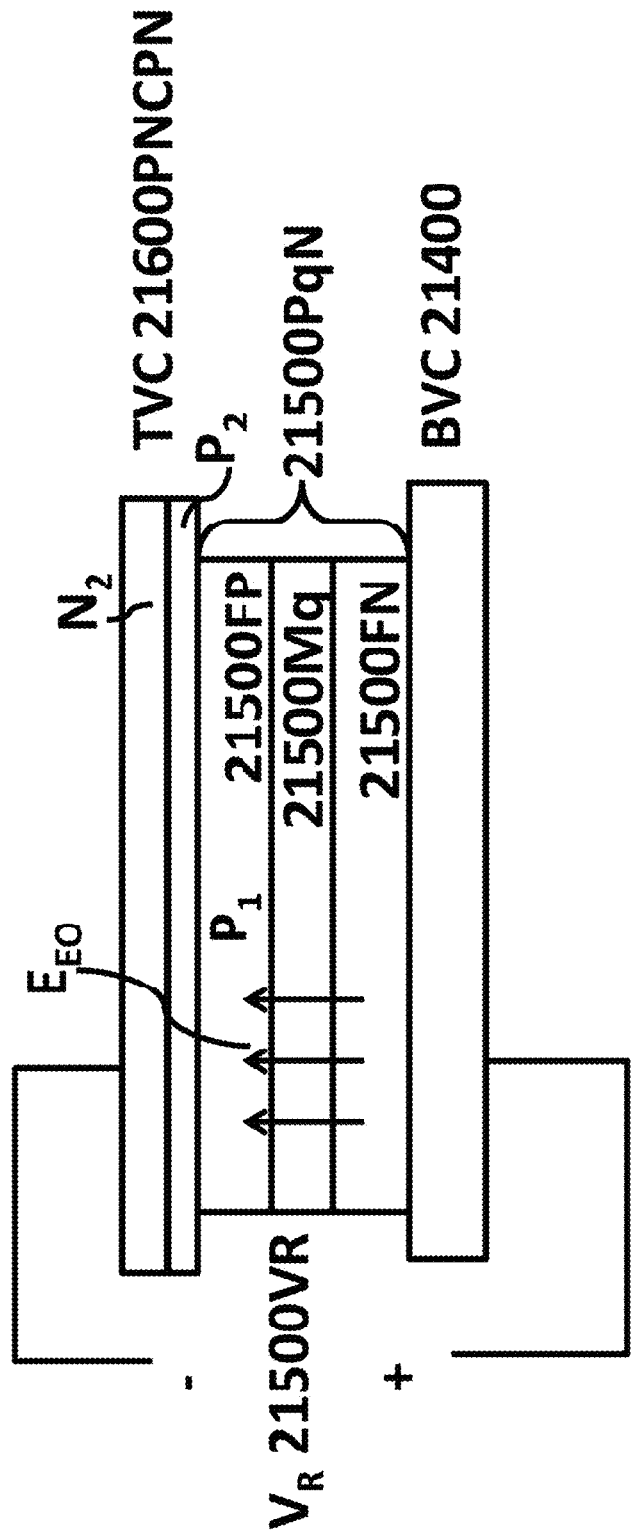
FIG. 20b shows a diagram illustrating the structure around the PqN, NqN, or PN junction with PN changing PN junction.

Alternatively, as shown in FIG. 20b, layer TVC 21600 may start with a P-doped layer (called layer 21600LP₂) with a dopant density of $P_2$, 21600P₂, connecting to the top P-doped layer of layer EC 21500 with dopant density $P_1$, and the P-doped layer 21600LP₂ is also connected to another layer that is N doped (called layer 21600LN₂) with dopant density $N_2$, 21600N₂, resulting in a PNCPN junction in layer 21600 labeled as 21600PNCPN. Then an applied voltage with negative voltage applied to the $N_2$-doped layer TVC 21600 will give a forward bias across the $N_2P_2$ junction and transmit the voltage to the top $P_1$ doped layer of EC layer 21500 that forms part of the $P_1q\,N_1$ structure, resulting in reverse bias across the $P_1q\,N_1$ junction in EC layer 21500. In that case, the $N_2P_2$ layers act as a PN-changing PN junction. Likewise if the $P_1q\,N_1$ junction on EC 21500 layer has $P_1$ at the bottom connecting to an $N_2$-doped layer BVC 21400, then one has a PNCPN junction between 21400 and 21500 labeled as 21500-21400PNCPN junction forming the structure $N_2P_1q\,N_1$ (see FIG. 20a); or one can have a PNCPN junction inside 21400 labeled as 21400PNCPN junction forming the structure. $N_1\,P_2P_1q\,N_1$ (see FIG. 20b).

The reason to effectively change the P-doped to N-doped layer via such P-N changing PN junction is because an N-doped layer typically can be doped to have a much lower electrical resistance than P-doped semiconductor material for two reasons: (1) the dopant density for N dopant typically can be higher than that of P dopant; (2) even at the same dopant density, the electrical conductivity of N doped material can typically be higher than that of P doped material by about 10 times. Note that, as is also well known to those skilled in the art, N-doped semiconductor material also typically has a much lower optical absorption than P-doped semiconductor material even if the N-type material is doped to the same electrical resistance as a P-type material (typically can be about 10 times lower in optical absorption).

This enables the use of highly N-doped layer with low electrical resistance for layer 21300, 21350, and 21400 from the bottom half up and 21700, 21650, and 21600 from the top half down, thereby substantially lowering the series electrical resistance of the active device structure. Low series electrical resistance will give high modulation frequency for example for lasers or modulators.

The example above is for the purpose of illustration and not limitation. For example, the PqN or PN junction in the electro-active layer EC 21500 may have P-doped side at the top, instead of the bottom, and a PN-changing PN junction is used so that the top layers can become N-doped materials. There are thus various variations in the use of the PN-changing PN junction as shall be obvious to those skilled in the art.

Top Vertical/Side Conduction and Ohmic Contact Layer

The top vertical/side conduction and Ohmic contact layer TVSCOC 21700 with thickness $d_{TVSC}$ 21700$d$ and width $w_{TVSC}$ 21700$w$ is also electrically connected at its bottom to the top vertical current conduction layer TVC 21600 through the top interspaced dielectric conduction layer TIDC 21650, and at its top to the top left/middle/right metal contact pad FT(L/M/R)M 21800(L/M/R) or any top metal contact pad FTXM 21800X (X refers to any of the plurality of top metal contact pads).

Upper and Lower Waveguide Claddings of Active-Layer Structure

In one embodiment, the top vertical/side conduction and Ohmic contact layer TVSCOC 21700, with an averaged refractive index $n_{TVSC}$ 21700$n$, forms part of an top electro-active waveguide cladding 22600TCd for which $n_{TVSC}$ 21700$n$ is smaller than the refractive index $n_{WCo}$ 22600Con of the central waveguide core 22600Co. In one exemplary embodiment, TVSCOC 21700 is a low-refractive-index Ohmic transparent conductor (LRI-OTC) (see illustration in FIG. 14)

The top interspaced dielectric conduction layer TIDC 21650 with an averaged refractive index $n_{TIDC}$ 21650$n$, in another exemplary embodiment also forms part of a top electro-active waveguide cladding 22600TCd for which $n_{TIDC}$ 21650$n$ is smaller than the refractive index $n_{WCo}$ 22600Con of the central waveguide core 22600Co.

In as yet another embodiment, the top electro-active waveguide cladding is formed by an air or dielectric region (e.g. the dielectric region TDMR 21810 in FIG. 22 described later below) above layer TVSCOC 21700.

In one embodiment, part of a bottom electro-active waveguide cladding 22600BCd, in the case where the width $w_{ISTR}$ of the input support structure ISTR 21200 is narrow, may be made up of the input support structure ISTR 21200 below the bottom vertical current conduction layer BVC 21400 plus the cladding materials to its left, and right as follows: The input support structure ISTR 21200 is made up of a material or mixture of materials with a material refractive index $n_{ISTR}$ 21200$n$.

In a preferred embodiment, for the purpose of illustration and not limitation, typically the input connecting-waveguide core ICWCo 22200, the input tapering waveguide core ITWCo 22300, and the input support structure ISTR 21200 all have a similar bottom, left and right cladding materials, though they can also have different cladding materials. For the input supporting structure ISTR 21200, let the refractive index of the left cladding material ISTRLCd 21200L be $n_{ISTRLCd}$ 21200Ln, and the refractive index of the right cladding material ISTRRCd 21200R be $n_{ISTRRCd}$ 21200Rn. The supporting structure 21200, the left claddings 21200L, and right cladding 21200R, together forms a material region with an effective layer averaged refractive index $n_{laISTR}$ 21200$nla$ that is a weighted average of $n_{ISTR}$ 21200$n$, $n_{ISTRLCd}$ 21200Ln, and $n_{ISTRRCd}$ 21200Rn, similar to the computation of averaged refractive index given by equation Eq. (3). The weighting for the averaging is depending on the distribution of the beam energy for guided beam BEC 21140 inside these material regions similar to that given by Eq. (3). The layer averaged material refractive index $n_{laISTR}$ 21200$nla$ experienced by the guided beam BEC 21140 in regions 21200, 21200L, 21200R, is typically smaller than the refractive index $n_{WCo}$ 22600Con of the central waveguide core 22600Co. In that case, they form part of the bottom electro-active waveguide cladding 22600BCd.

However, in the case where the width $W_{ISTR}$ of the input supporting structure ISTR 21200 is relatively wide, part of a bottom electro-active waveguide cladding 22600BCd will be made up mainly of the bottom cladding ISTRBCd 21200B below the input support structure ISTR 21200 with an averaged refractive index $n_{ISTRBCd}$ 21200Bn, which as part of the embodiment would be filled with materials with $n_{ISTRBCd}$ smaller than the refractive index $n_{WCo}$ 22600Con of the central waveguide core 22600Co. In that case, substantial optical energy can be in the input supporting structure STR 21200, and the input supporting structure STR 21200 may become part of the waveguide core for beam BEC 21140.

In another embodiment, part of a bottom electro-active waveguide cladding 22600BCd may also be made up of the bottom interspaced material layer BIM 21250 (if it exists) with refractive index $n_{BIM}$ 21250$n$. In one exemplary embodiment, BIM 21250 is a low-refractive-index Ohmic transparent conductor (LRI-OTC).

In as yet another embodiment, part of a bottom electro-active waveguide cladding 22600BCd may also be made up of the bottom interspaced dielectric current conduction layer BIDC 21350 with refractive index $n_{BIDC}$ 21350$n$.

In as yet another embodiment, part of a bottom electro-active waveguide cladding 22600BCd may also be made up of the bottom side conduction and Ohmic contact layer BSCOC 21300 with refractive index $n_{BSCOC}$ 21300$n$.

In as yet another embodiment, part of a bottom electro-active waveguide cladding 22600BCd may also be made up of the bottom side conduction and Ohmic contact layer ISTRBCd 21200B with refractive index $n_{ISTRBCd}$ 21200Bn.

As to which layer shall be considered as the waveguide cladding is that in the waveguide cladding material region (a material region that surround the waveguide core), the energy density of the guided mode shall decay largely exponentially in a direction away from the waveguide core, as is known to those skilled in the art. This "waveguide cladding region" may be made of a single layer or spot (i.e. small cluster) of material or a collection of multiple layers or spots (i.e. small clusters) of connected materials (including air as a material). A spot is a three-dimensional cluster of material volume. The waveguide cladding refractive index $n_{Cd}$ (e.g. as use in the in the next section) shall be taken as the averaged refractive index of this collection of multiple layers/spots of cladding materials that can have one layer/spot or plurality of layer/spots. The waveguide core shall be taken as the material region close to the center energy portion of the optical beam in which the material refractive index $n_{MAT}$ is larger than or equal to the beam propagating refractive index $n_{BEC}$ and the waveguide core refractive index $n_{Co}$ (e.g. as use in the in the next section) shall be taken as the averaged refractive index of the entire core material region (which again can be composed of layers or spots of materials). For the purpose of illustration and not limitation, it is useful to divide the cladding regions to be the top waveguide cladding situated above the waveguide core, the bottom waveguide cladding situated below the waveguide core, the left waveguide cladding situated to the left of the waveguide core, and the right waveguide cladding situated to the right of the waveguide core.

High Refractive Index Contrast and Mode-Medium Overlap

For the purpose of definition, it is useful to define a refractive index contrast parameter as described below. If a waveguide core refractive index is $n_{Co}$ and the waveguide cladding (as defined by the exponential energy decay above) immediately adjacent to the waveguide core has a refractive index $n_{Cd}$, then we can define a waveguide core-to-cladding refractive index difference square to be $n_{rd}^2 = (n_{Co}^2 - n_{Cd}^2)$ and a refractive index contrast ratio to be: $R_{cts} = n_{rd}^2/(n_{Co}^2 +$ $n_{Cd}^2$). For the purpose of definition and not limitation, we define very-strongly wave guiding regime to be when $R_{cts}>0.5$ or $R_{cts}=0.5$. It is also useful to define the medium-strongly wave guiding regime to be when $0.5>R_{cts}>0.2$ or $R_{cts}=0.2$, weakly guiding regime to be when $0.2>R_{cts}>0.02$ or $R_{cts}=0.02$ and the very-weakly guiding regime to be when $0.02>R_{cts}$.

In a preferred embodiment, the electro-active waveguiding core structure EWCoS 22600 is in the very-strongly guiding or medium-strongly guiding regime at least in the vertical direction (direction perpendicular to the substrate) in which the refractive index contrast of the waveguide core layer with the top and bottom cladding immediately adjacent to the electro-active waveguide core given by: $R_{cts}=(n_{Co}^2-n_{Cd}^2)/(n_{Co}^2+n_{Cd}^2)$ is larger than or equal to about 0.2 or is larger than or equal to about 0.5, where $n_{Cd}$ is the refractive index of the top or bottom cladding. In the case of waveguiding core structure EWCoS 22600, $n_{Co}=n_{WCo}$ where $n_{WCo}$ 22600Con is the averaged refractive index of the central waveguide core layer WCo 22600Co, and $n_{Cd}$ is either $n_{BIM}$, $n_{BIDC}$, $n_{lAISTR}$ or $n_{ISTRBCd}$ depending on which one(s) is(are) the bottom cladding(s).

This strong waveguiding in the vertical direction will enable much higher mode confinement that will push higher fraction of the beam energy into the electro-active layer. As a result, in the case of application to optical modulators, the phase shift in the guided beam BEC 21140 given by a change in $n_{BEC}$ 21140$n$ under an applied voltage will be larger. This will result in substantially lower switching voltage.

In the case of application to optical amplifiers (including plasmonic waveguide based optical amplifier) the optical gain will be higher for the same number of quantum wells excited to gain by an injection current, which will lead to shorter device length; or the number of quantum wells can be fewer for obtaining the same optical gain, which will lead to smaller current requirement.

In the case of application to lasers, the optical gain in the laser will be higher for the same number of quantum wells excited to gain by an injection current, which will lead to laser shorter device length and hence lower laser threshold current and higher laser direct modulation rate; or the number of quantum wells can be fewer for obtaining the same optical gain, which will lead to lower laser threshold current.

In the case of application to photodetectors, the optical absorption will be higher for the same number of quantum wells absorbing the beam to be detected, which will lead to shorter device length and hence higher photodetector response bandwidth.

In the case of application to all-optical devices (including plasmonic waveguide based all-optical devices based on Metal-Dielectric-Meal waveguide for example), the smaller vertical beam mode size due to the higher vertical mode confinement will result in higher beam intensity, which will give shorter all-optical interaction length; or for the same interaction length, the optical power can be lower resulting in all-optical interaction with lower optical power requirement. As is well known to those skill in the art, all-optical interaction can result in all-optical switching (using one optical beam to switch another optical beam) via causing a change in either the refractive index, the optical gain, or optical absorption of the medium by an input optical beam. The change in the said medium property then results in the switching of another optical beam.

In order to increase this mode-medium overlapping factor, it is useful to reduce the total thickness of the electro-active waveguide core. More precisely, it is useful to define the thickness $d_{CORE}$ of the electro-active waveguide core as the distance between a first top boundary and a first bottom boundary. The first top boundary is the boundary between the waveguide core and the top cladding immediately adjacent to the waveguide core, and the first bottom boundary is the boundary between the waveguide core and the bottom cladding immediately adjacent to the waveguide core. If $d_{CORE}$ is smaller than $(\lambda_{bm}/(2*n_{Co}))$, the waveguide core is said to be in ultra-thin regime. If $d_{CORE}$ is smaller than or equal to $(\lambda_{bm}/n_{Co})$ and larger $(\lambda_{bm}/(2*n_{Co}))$, then the waveguide core is said to be in very-thin regime. If $d_{CORE}$ is smaller than or equal to $(1.5*\lambda_{bm}/n_{Co})$ and larger than $(\lambda_{bm}/n_{Co})$, the waveguide core is said to be in medium-thin regime. If $d_{CORE}$ is smaller than $(3*\lambda_{bm}/n_{Co})$ and larger than $(1.5*\lambda_{bm}/n_{Co})$, the waveguide core is said to be in the thin regime. If $d_{CORE}$ is larger than $(3*\lambda_{bm}/n_{Co})$, the waveguide core is said to be in the thick regime.

In a preferred embodiment for the modulator, or optical amplifier, or laser, or photodetector, or all-optical device, or plasmonic device of the present invention, in order to achieve additional enhanced performances such as very low modulation voltage for modulator or low optical power for all-optical device or various advantages described above for optical amplifier or laser or photodetector, the electro-active waveguiding core structure EWCoS 22600 shall be in the very-strongly guiding regime, and $d_{CORE}$ shall either be in the ultra-thin regime or very-thin regime.

In a preferred embodiment for the modulator of the present invention, in order to achieve additional enhanced performances such as low modulation voltage for modulator or low optical power for all-optical device or various advantages described above for optical amplifier or laser or photodetector, the electro-active waveguiding core structure EWCoS 22600 shall be in the medium-strongly guiding or very-strongly guiding regime, and $d_{CORE}$ shall either be in the ultra-thin regime, very-thin regime, or medium-thin regime.

In another preferred embodiment for the modulator, or optical amplifier, or laser, or photodetector, or all-optical device, or plasmonic device of the present invention, the electro-active waveguiding core structure EWCoS 22600 shall be in the weakly guiding regime, and $d_{CORE}$ shall either be in the ultra-thin, very-thin, medium-thin, or thin regime.

For example, if $\lambda_{bm}=1550$ nm, $n_{EC}=3.0$, then if $d_{CORE}$ is smaller than or equal to $(\lambda_{bm}/n_{Co})=517$ nm, it is in the very-thin regime, and if $n_{Cd}=1.5$, it also has $R_{cts}>0.5$ and hence is in the very-strongly wave guiding regime as well, which will satisfy the co-requirements. Both requirements have to be satisfied in order to draw an exemplary benefit of the present invention such as to enhance the low voltage performance of the modulator or achieve low power consumption, low optical loss, smaller device size for optical amplifier, laser, light-emitting device, plasmonic optical waveguide based device, photodetector, optical intensity or phase modulator, optical switch (controlled electrically), wavelength converter, and all-optical device (including devices that are controlled optically, such as all-optical wavelength converter, optically-pumped device, all-optical switch, all-optical logic gate, and all-optical signal processing device).

It is useful to define the electro-active field overlapping factor more precisely. Let the electric field distribution of the guided mode of optical beam BEC 21140 be given by $E_{OPT}(x,y)$ 21140E, where $E_{OPT}$ is the electric field strength, and x and y are the coordinates in the cross-sectional area of the beam. The mode m is typically the fundamental guided mode with a single intensity peak at the beam center region. Let Δn 21140*dn* be the change in the optical propagating refractive index experienced by the beam under an applied electric field $E_{EC}(x,y)$ 21500E (for the case of constant field $E_{EC}(x,y) \sim V_{EC}/D_{EC}$, where $V_{EC}$ 21500VEC is the applied voltage and $D_{EC}$ 21500DEC is the effective physical distance for which the voltage $V_{EC}$ is applied across) that again has a value profile depending on the x-y cross-sectional coordinates. For the case of refractive index modulation, then the phase shift Δϕ 21140Ph experienced by an optical beam propagating through the modulator under an applied voltage V(zo,t) 21500Vzo, where zo is the propagating distance along the modulation, is given by:

$$\Delta \phi = (2\pi/\lambda_0)\Delta n,$$

$$\Delta n = \int_0^L \Gamma V(zo, t) dzo,$$

$$\Gamma = \frac{1}{V_{EO}} \frac{\iint (1/2)n_{eff}^3 r_{EO}(x, y) E_{EO}(x, y) |E_{OPT}(x, y)|^2 dxdy}{\iint |E_{OPT}(x, y)|^2 dxdy},$$

where $V_{EC}$ is the applied RF voltage that gives rise to $E_{EC}(x,y)$, $r_{EO}(x,y)$, 21500*r*EO is an effective electro-optic coefficient describing how much the material's refractive index is changed under an applied field, $n_{eff}$ is the effective refractive index of the propagating optical mode (same as $n_{BEC}$). The quantity Γ 21500ROMOF is thus called the RF-field, optical mode, and active medium overlapping factor (also simply called the mode-medium overlapping factor). It is independent on $V_{EC}$ as $E_{EC}(x,y)$ is proportional to $V_{EC}$. The voltage V(z,t) is the actual applied voltage that may change with propagation distance z and time t.

The voltage to the entire modulator $V_{MOD}$ is approximately given by $V_{EC}$ assuming the voltage drop between the electro-active layers and the top or bottom electrode is small compared to $V_{EC}$.

While the above mode-medium overlapping factor is illustrated for the case of an electro-optic (EO) modulator, there are various other definitions of mode-medium overlapping factor more suitable for other applications such as for the case of electro-absorption (EA) modulator or the case involving optical absorption and gain medium, as is well known skilled in the art. These other definitions of mode-medium overlapping factor shall be used when appropriate and the specific definition of mode-medium overlapping factor is not meant to limit the present invention.

Low-Refractive-Index Ohmic-Transparent-Conductor & Metal Contact Case

The difficulty of obtaining high mode-medium overlapping or tight mode confinement is that the optical mode will inevitably touch the metal contact pad if the top vertical/side conduction and Ohmic contact layer TVSCOC is the usual doped semiconductor. One way to solve this problem in the present embodiment is to utilize Low-Refractive-Index Ohmic Transparent Conductor (LRI-OTC) that is electrically conductive but having a low refractive index (the low-refractive-index criterion is defined in the section on "High-refractive-index-contrast mode confining structure in electro-active region"). In that case, the mode can be strongly confined in the electro-active waveguide core structure EWCS 22600 region and will rapidly decay in the top electro-active waveguide cladding 22600UC. Layer 22600UC is basically the top vertical/side conduction and Ohmic contact layer TVSCOC 21700. This would be possible only if $n_{TVSC}$ is small compared to the refractive index $n_{WCo}$ 22600Con of the central waveguide core layer WCo 22600Co. However, it is important that layer TVSCOC 21700, now made of transparent conductor, shall have Ohmic-like contact with the top vertical conduction layer TVC 21600 that may be semiconductor.

As an embodiment, layer TVSCOC 21700 is a low-refractive-index transparent conductor with Ohmic contact capability with layer TVC 21600. In that case, the material for layer TVSCOC 21700 will be called "Low-Refractive-Index Ohimc Transparent Conductor" (LRI-OTC). Ohmic transparent conductor differs from just transparent conductor as they have to have "low electrical contact resistance" with the next conduction layer in contact with it to pass current down to the electro-active layer without causing high voltage across the contact surface. For the purpose of illustration and not limitation, the next conduction layer is typically N-doped or P-doped semiconductor. Preferably, it shall also have low "low electrical contact resistance" with appropriate metal electrode. Materials for LRI-OTC include but are not limited to transparent conducting oxide (TCO) materials such as $In_2O_3$ (or various Indium Oxides), ZnO (Zinc Oxides), ITO (Indium Tin Oxides), GITO (Gallium Indium Tin Oxides), Gallium Indium Oxide (GIO), ZITO (Zinc Indium Tin Oxides), CdO (Cadmium Oxides), or materials containing any one or more than one of these oxides.

In as yet another embodiment, layer TVSCOC 21700 can also be a low-refractive-index transparent conductor. In that case, the material for layer TVSCOC 21700 will be called "Low-Refractive-Index Transparent Conductor" (LRI-TC). Transparent conductor (TC) differs from Ohmic transparent conductor (OTC) as they do not need to have "low electrical contact resistance" with the next conduction layer in contact with it. For example, one can have modulators in which layer TVSCOC 21700 directly applies the electric field to the active material without further conducting the voltage down to the next layer. In that case, the other layers such as layer TVC 21600 may be undoped or an intrinsic semiconductor that does not conduct electric voltage or current.

In another embodiment, in order to achieve high frequency response, it is also desirable that the Ohmic contact between layer TVC 21600 and TVSCOC 21700 has low Ohmic contact resistance. Ohmic-like contact means the relation between the voltage and the current is largely linear. For the purpose of illustration and not limitation, low Ohmic contact resistance between any two materials A and B generally means the voltage-over-current ratio for a current going between material A and material B is not substantially worse than the total sum of other electrical resistances that will affect the frequency response of the modulator.

In one exemplary embodiment, on top of layer TVSCOC 21700 with LRI-OTC material is metal pad that gives good metal Ohmic contact with the LRI-OTC material used. In an embodiment, the metal pad is the first top middle metal contact pad FTMM 21800M with thickness $d_{FTMM}$ 21800Md, width $w_{FTMM}$ 21800Mw, and length $g_{FTMM}$ 21800Mg.

This case is referred to as "top LRI-OTC-metal contact case".

Side-Conduction and Metal Contact Case

Figure 21:
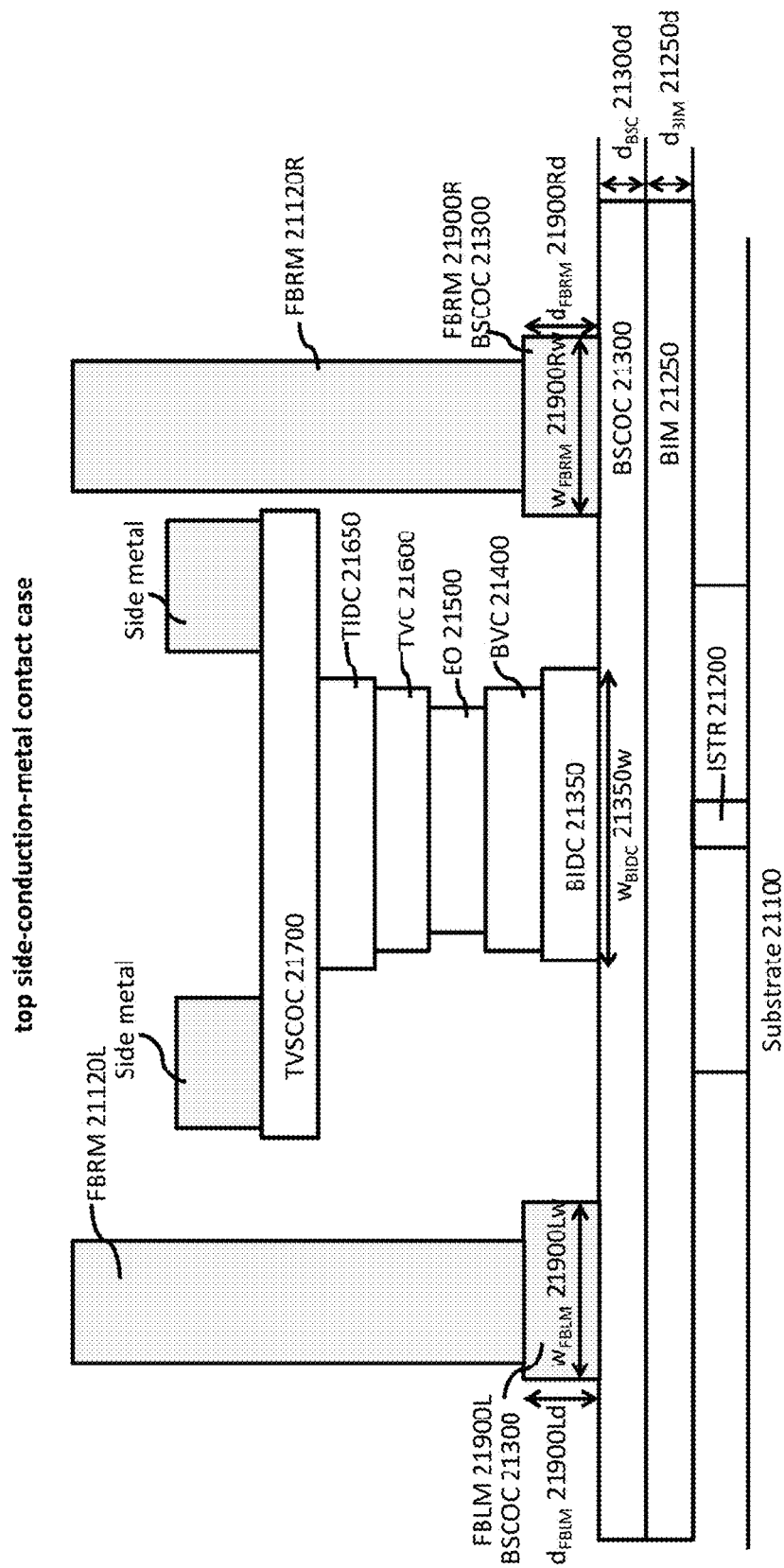
FIG. 21 shows a diagram illustrating an alternative structure involved having the metal Ohimc contact on the side away from the center region of layer TVSCOC 21700.

Other alternative contacts include having layer TVSCOC 21700 to extend side way and have metal Ohimc contact on the side away from the center region of layer TVSCOC 21700 as shown in FIG. 21. In that case, Ohmic contact can be achieved from the metal to layer TVSCOC 21700 and the optical mode will not touch the metal, which can keep the optical mode to be low loss. This is referred to as "top side-conduction-metal contact case".

Figure 22:
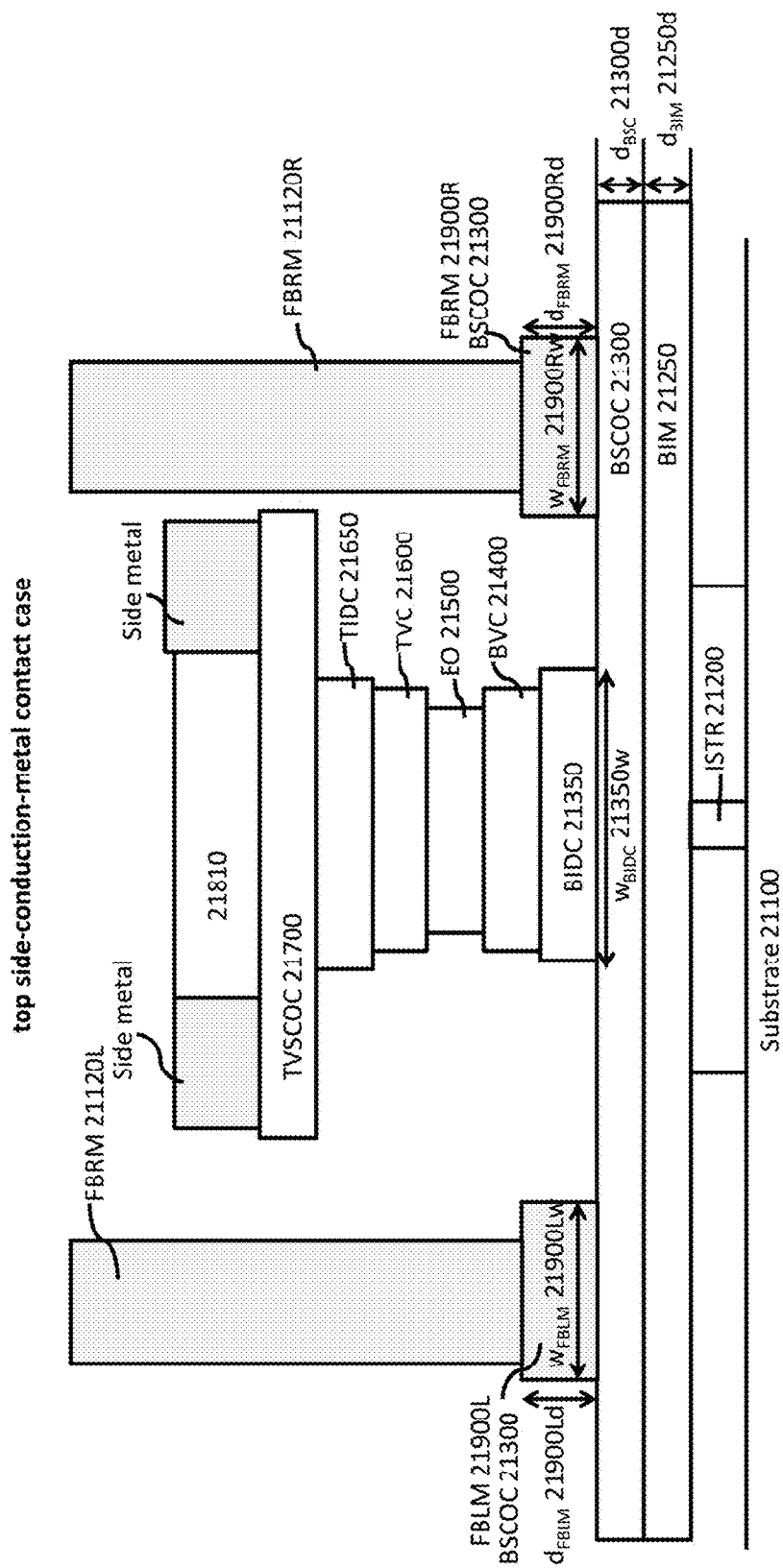
FIG. 22 shows a diagram illustrating an alternative structure involved having the "top lateral conduction geometry with metal contact" but also a lowloss dielectric material as layer 21810.
Figure 23:
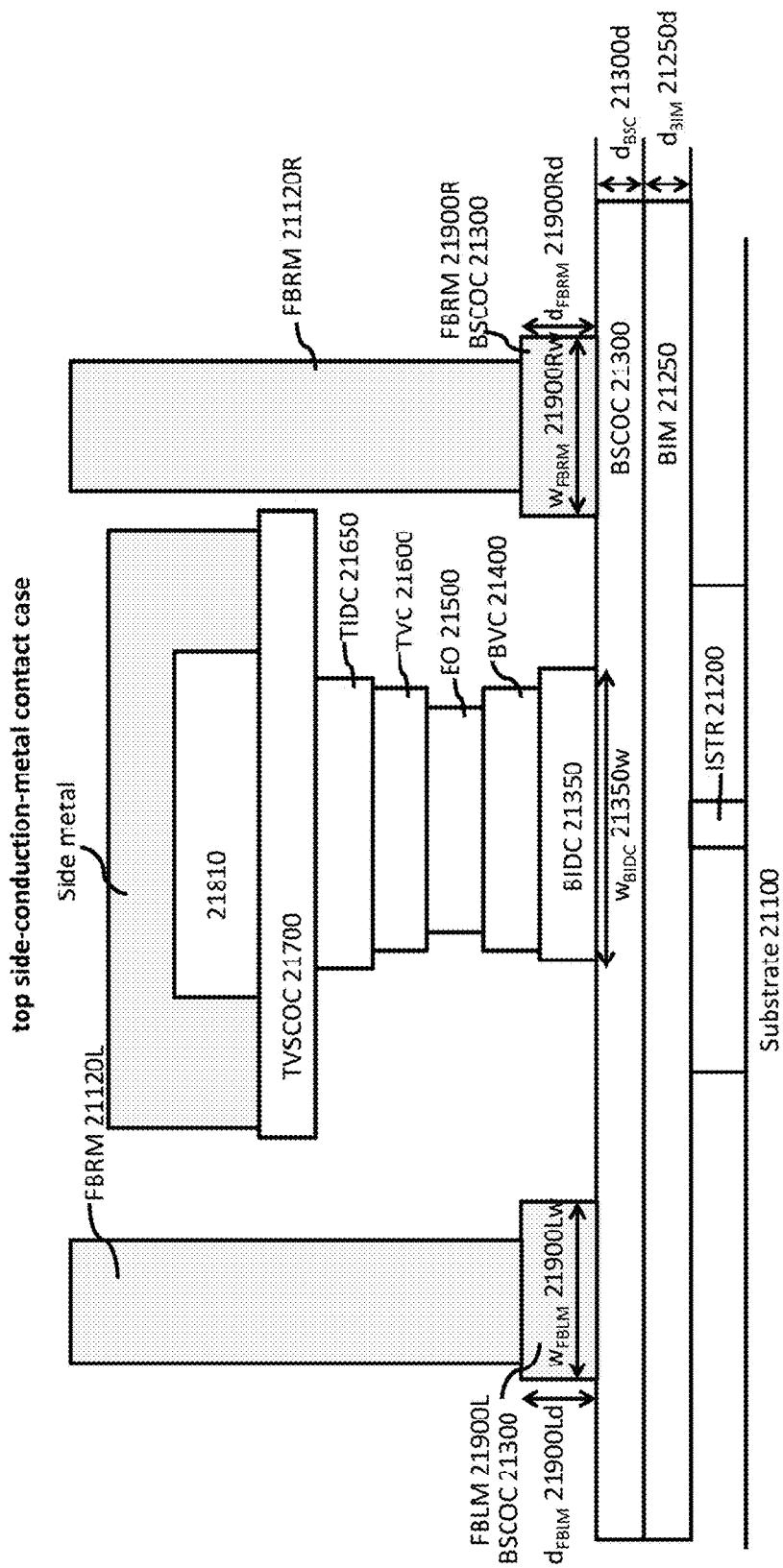
FIG. 23 shows a diagram illustrating an alternative structure for which the metal can even go on top of the lowloss dielectric material 21810 to make this top lateral conduction structure mechanically robust.

Still another alternative structure involved having the "top lateral conduction geometry with metal contact" but also a top lowloss dielectric material region TDMR 21810 as shown in FIG. 22. This dielectric material can be chosen to have low refractive index and hence acting as a top electroactive waveguide cladding. Alternatively, the metal can even go on top of TDMR 21810 to make this top lateral conduction structure mechanically robust as shown in FIG. 23. Thus, there are various ways to realize what we refer to as the "top lateral conduction geometry with metal contact".

Still another alternative structure involved having the "bottom LRI-OTC" in that the bottom interspaced material layer BIM 21250 between bottom side-conduction and Ohmic-contact layer BSCOC 21300, and ISTR 21200, with thickness $d_{BIM}$ 21250$d$ is made of LRI-OTC. This enables a thicker layer for conducting current and voltage from the bottom electrode(s) with electrode(s) either at the bottom of the LRI-TOC layer or on top of the LRI-TOC layer (e.g. using top via hole on one or both sides of the ALS to contact the LRI-TOC layer through layer 21300) or directly on top of the bottom side-conduction and Ohmic contact layer BSCOC 21300.

Lateral Optical Mode Confinement

Note that in another embodiment, the width $w_{TVSC}$ 21700$w$ of layer 21700 can act on the optical mode of guided beam BEC 21140 laterally so as to confine the optical mode. Such lateral mode confinement is called "rib waveguide" structure, which is known to have low optical loss. Thus, in an embodiment, layer 21700 also forms a rib-waveguide structure.

It must be understood that there are various ways to confine the optical mode laterally, including a small lateral width $w_{EC}$ 21500$w$ for a small vertical portion of the electro-active layer 21500, which can also confine the optical mode laterally, called "lateral mode confinement" structure. Thus, in another embodiment, the electro-active layer is a "lateral mode confinement" structure.

Similarly, a small lateral width $w_{SVC}$ 21600$w$ or $w_{FVC}$ 21400$w$ for a small vertical portion of layer 21600 or 21400 can also confine the optical mode laterally. Thus in another embodiment, the bottom vertical conduction layer BVC 21400 is a "lateral mode confinement" structure. In as yet another embodiment, the top vertical conduction layer TVC 21600 is a "lateral mode confinement" structure.

In as yet another embodiment, the bottom interspaced dielectric current conduction layer BIDC 21350 with thickness $d_{BIDC}$ 21350$d$, layer width $w_{BIDC}$ 21350$w$, and an averaged refractive index $n_{BIDC}$ 21350$n$ is a "lateral mode confinement" structure.

In as yet another embodiment, the bottom interspaced dielectric current conduction layer BIM 21250 with thickness $d_{BIM}$ 21250$d$, layer width $w_{BIM}$ 21250$w$, and an averaged refractive index $n_{BIM}$ 21250$n$ is a "lateral mode confinement" structure.

In as yet another embodiment, the input supporting structure ISTR 21200 with thickness $d_{ISTR}$ 21200$d$, layer width $w_{ISTR}$ 21200$w$, and a refractive index $n_{ISTR}$ 21200$n$ is a "lateral mode confinement" structure.

In as yet another embodiment, the output supporting structure OSTR 29200 with thickness $d_{OSTR}$ 29200$d$, layer width $w_{OSTR}$ 29200$w$, and a refractive index $n_{OSTR}$ 29200$n$ is a "lateral mode confinement" structure.

In as yet another embodiment, the top lowloss dielectric material region TDMR 21810 with thickness $d_{TDMR}$ 21810$d$, layer width $w_{TDMR}$ 21810$w$, and an averaged refractive index $n_{TDMR}$ 21810$n$ is a "lateral mode confinement" structure.

In as yet another embodiment, the top interspaced dielectric conduction layer TIDC 21650 with thickness $d_{TIDC}$ 21650$d$, layer width $w_{TUDC}$ 21650$w$, and an averaged refractive index $n_{TIDC}$ 21650$n$ is a "lateral mode confinement" structure.

Reducing Active-Device Junction Capacitance

In a preferred embodiment, the small lateral width $w_{EC}$ 21500W for a small vertical portion of the electro-active layer EC 21500 acts as a "lateral mode confinement" structure, but at the same time also reduces the capacitance between the top and bottom electric-field applying junction in a modulator or photodetector structure. This is because capacitance is proportional to the plate area and the lateral width $w_{EC}$ 21500W will define the effective capacitance plate area across the PN (or PqN) layer in layer 21500, with P side serving as one capacitance plate and N side serving as another capacitance plate, spaced by the carrier depletion width between the P and N doped material regions, as is known to those skilled in the art. Reducing the modulator junction capacitance can increase the frequency response of the modulator or the photodetector. This will be referred to as capacitance reduction via EC-layer width reduction. This can also be applied to either layer 21400 or layer 21600 if a PN junction responsible for part of the total device capacitance is in layer 21400 or 21600. In that case, the width of either layer 21400 or 21600 or both shall be carefully chosen to reduce the total device capacitance.

Figure 24:
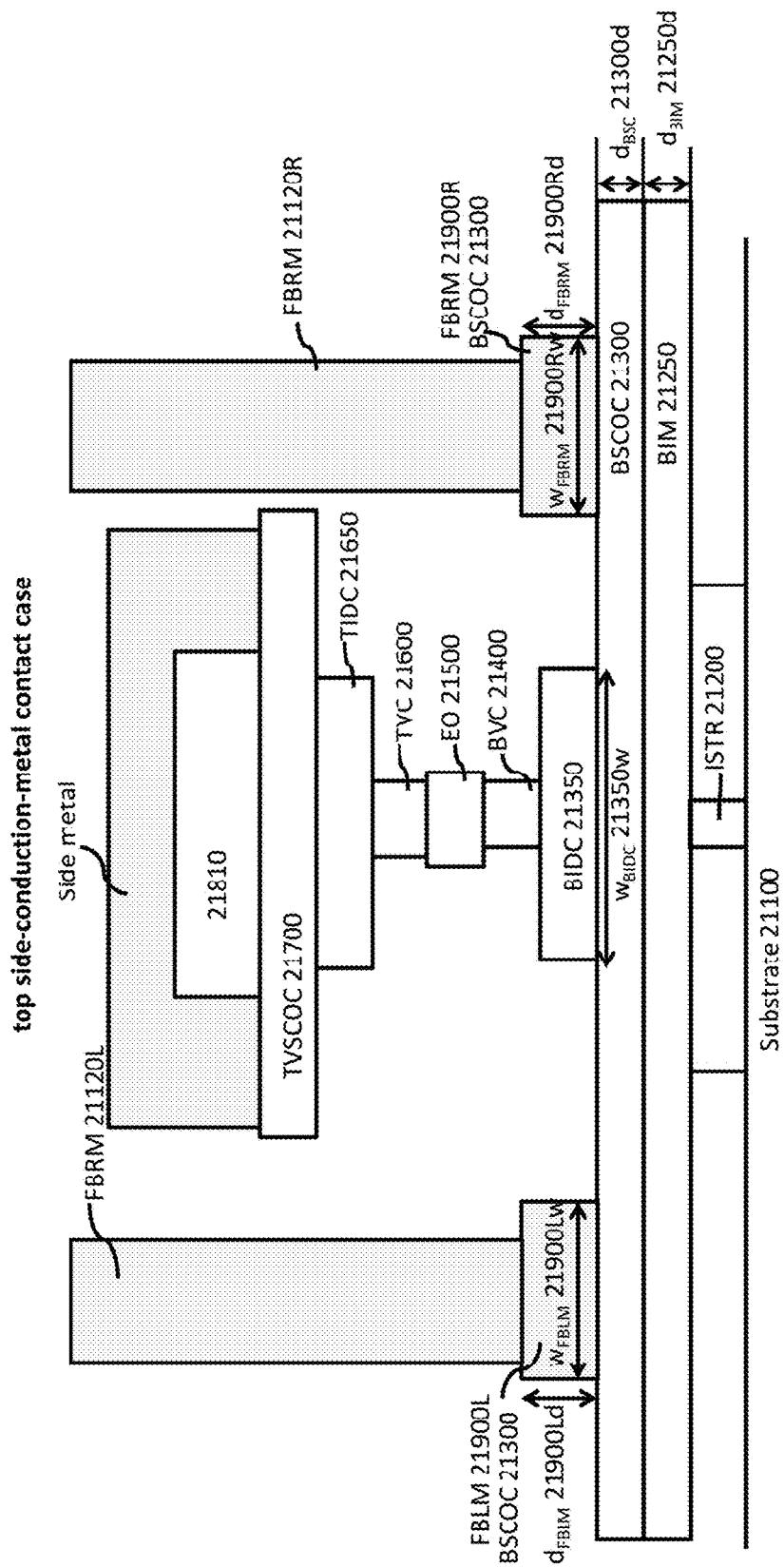
FIG. 24 shows a diagram illustrating an alternative structure with low capacitance but also low optical loss for example by using the top vertical/side conduction and Ohmic contact layer TVSCOC 21700 to confine the mode laterally.

Separate Lateral Mode Confinement and Active Device Junction Capacitance Reduction Note that it is possible to implement this "capacitance reduction via EC-layer width reduction" and still use the narrowed width of other layers to confine the optical mode laterally if the narrowed width of other layers is comparable to or smaller than this EC-layer width. This may have certain advantage by having low capacitance but also by using the top vertical/side conduction and Ohmic contact layer TVSCOC 21700\*\* (or any other layer between this layer and the layer ISTR 21200 including layer ISTR 21200 itself, except the EC-layer) to confine the mode laterally. This case is shown in FIG. 24. (\*\*such as when layer 21700 is an Ohmic Transparent Conductor case; for side metal contact case, it will be difficult to use layer 21700 to confine the optical beam mode. In that case, one can alternatively use the top interspaced dielectric conduction layer TIDC 21650 to confine the optical mode laterally)

The Use of Highly Doped Quantum Wells for Lower Modulation Voltage

This structure enables the modulation voltage to be drastically reduced using high carrier doping. While both N and P doping can be used, for the purpose of illustration and not limitation, the preferred embodiment is the use of N-doping in the active electro-active region as P doping will cause higher optical absorption loss than N doping at the same dopant density. The higher the doping density, the smaller the carrier depletion width at the PN junction and the larger the PN-junction capacitance. For a conventional modulator, the doping density is limited to $N=10^{17}/cm^3$ as otherwise the high junction capacitance will begin to severely limit the frequency bandwidth of the modulator. In the applications below, the doping is made into the EC layer that may or may not have quantum wells present. The presence of quantum wells may enhance the refractive index change due to change in carrier band-filling in the quantum wells under an applied voltage. However, the absence of quantum wells will also work in that refractive index will also be changed due to change in carrier band-filling under an applied voltage. Thus, when quantum wells are mentioned, it is for the purpose of illustration and not limitation. The presence of quantum wells also enables refractive index change due to quantum confined Stark effects as noted above, which can further increase the change in the refractive index under an applied voltage. The quantum wells can be strained, unstrained, double-well, or multi-well quantum wells as is known to those skilled in the art.

In the present invention, in one application area, the EC layer has region with high-level doped carrier density with P-type or N-type doping and a doping density at or higher than $2\times10^{17}/cm^3$ and lower than $5\times10^{17}/cm^3$ primarily but not exclusively for low modulation voltage $V_{MOD}$ 20000V or low modulation RF power $P_{MOD}$ 20000P, and low-loss high-frequency modulator applications. In an exemplary embodiment, for illustration and not limitation, low means $V_{MOD}<2$ Volt or $P_{MOD}<80$ mW. Typically $V_{MOD}$ and $P_{MOD}$ are approximately related by the $R_{LOAD}$ 20000R transmission line resistance or load resistance: $P_{MOD}=V_{MOD}^2/R_{LOAD}$. In an exemplary embodiment, $R_{LOAD}=50$ Ohms. This is referred to as having the quantum wells in highly-doped regime.

In another application area, the EC layer has region with medium-high-level doped carrier density with P-type or N-type doping and a doping density at or higher than $5\times10^{17}/cm^3$ and lower than $1.5\times10^{18}/cm^3$ primarily but not exclusively for medium-low modulation voltage $V_{MOD}$ or medium-low modulation RF power $P_{MOD}$, and low-loss high-frequency modulator applications. In an exemplary embodiment, for illustration and not limitation, medium-low means $V_{MOD}<1$ Volt or $P_{MOD}<20$ mW. This is referred to as having the quantum wells in medium-highly-doped regime.

In as yet another application area, the EC layer has region with very-high-level doped carrier density with P-type or N-type doping and a doping density at or higher than $1.5\times10^{18}/cm^3$ and lower than $5\times10^{18}/cm^3$ primarily but not exclusively for very-low modulation voltage $V_{MOD}$ or very-low modulation RF power $P_{MOD}$, and low-loss high-frequency modulator applications. In an exemplary embodiment, for illustration and not limitation, very-low means $V_{MOD}<0.6$ Volt or $P_{RF}<7$ mW. This is referred to as having the quantum wells in very-highly-doped regime.

In as yet another application area, the EC layer has region with ultra-high-level doped carrier density with P-type or N-type doping and a doping density at or higher than $5\times10^{18}/cm^3$ primarily but not exclusively for ultra-low modulation voltage $V_{MOD}$ or ultra-low modulation RF power $P_{MOD}$, and low-loss high-frequency modulator applications. In an exemplary embodiment, for illustration and not limitation, ultra-low means $V_{MOD}<0.2$ Volt or $P_{MOD}<0.8$ mW. This is referred to as having the quantum wells in ultra-highly-doped regime.

The quantum wells can be strained, unstrained, double-well quantum wells, or multi-well as is known to those skilled in the art.

All-Optical Devices

While the above describe many situations in which an electric field/voltage or electric current is brought to the active medium in the electro-active layer, a whole class of applications known to those skilled in the art as all optical devices can function with the main device structures in the present invention without the need to apply electric field/voltage or electric current to the active medium. Such all-optical devices are operated all-optically by using an optical beam to affect or control the active medium such as changing its gain/absorption or refractive index via carrier excitation or de-excitation or direct interaction of the active medium with the optical field. In the case involving carrier excitation or de-excitation, the carrier excitation or de-excitation is done by an optical beam (i.e. done all-optically) through optical pumping, optical absorption, or optical stimulated decay, instead of via an applied electric voltage or current.

Such all-optical devices include devices such as all-optical wavelength converter, optically-pumped device, all-optical switch, all-optical logic gate, and all-optical signal processing device.

As another exemplary embodiment of the present invention, for such all-optical device applications, the various electrically conducting layers described above can remain except they no longer have to be electrically conducting. For example, they can be all undoped or made up of intrinsic semiconductor. Thus, a semiconductor based electro-active layer (ECL) will remain to be made of the same semiconductor material layers, each layer with the same physical dimensions except without the N or P doping for the layer.

There is, however, another class of all-optical devices in which while the device functions as an all-optical device, the device active medium still can be applied with an electric field or injection current. For example, an electric field may help to sweep away excited carriers that have slow (typically nanosecond) decay rate, making the all-optical interaction faster. In such all-optical device applications, the various electrically conducting layers described above still can be used as designed to conduct the required electric voltage/field or current to the active medium (ACM).

Plasmonic Devices

Plasmonic devices refers to photonic devices in which the optical beam is guided by metallic waveguide under the effect of surface wave of metal coated on dielectric material, such surface wave can be regarded as due to the electron plasma oscillation in the metal excited by electromagnetic filed in the optical beam. A main difference with conventional photonic devices is thus the use of such metal plasmonic waveguide. Such plasmonic waveguides often can drastically slow down the speed of beam propagation, resulting in much smaller device size. The main structural difference is that instead of the use of dielectric (or semiconductor) waveguide, the dielectric waveguide shown above is coated with metal on the outside, resulting in plasmonic waveguide, as is well known to those skilled in the art. Such plasmonic devices often use a combination of dielectric and plasmonic waveguide For example, the optical beam in the vertical direction can be guided and confined by the dielectric refractive index difference between a waveguide core layer and waveguide cladding layer, while optical beam in the vertical direction can be guided and confined by plasmonic waveguide by coating metal on the left and/or right vertical side walls/wall of the dielectric (or semiconductor)

waveguide. Thus, plasmonic devices can also utilize the various exemplary preferred structures of the present invention to result in low power consumption, low optical loss, and small device size.

While the preferred embodiments and advantages of the invention have been illustrated and described, it will be clear that the invention is not limited to these embodiments and advantages only. Numerous modifications, changes, variations, substitutions and equivalents will be apparent to those skilled in the art without departing from the spirit and scope of the invention as described.

To further illustrate the present invention, for the purpose of illustration and not limitation, we describe a few exemplary devices below.

A First Exemplary Device of Photodetector with Side Conduction Geometry

A preferred embodiment of an exemplary device is Photodetector Device 20000 with the following specifications referred to as a first exemplary device of Photodetector with side-conduction geometry:

Substrate SUB 21100 is silicon wafer substrate with a thickness of about 0.3 mm. Input connecting waveguide core ICWCo 22200 is made of silicon for which its averaged material refractive index $n_{ICWCo}$ 22200$n$ is around $n_{ICWCo}=3.6$, thickness $d_{ICWCo}$ 22200$d$ is $d_{ICWCo}=250$ nm, and width $w_{ICWCo}$ 22200$w$ is $W_{ICWCo}=400$ nm.

Input connecting-waveguide bottom cladding material ICWBCd 22200B is silicon dioxide ($SiO_2$), for which its refractive Index $n_{ICWBCd}$ 22200Bn is $n_{ICWBCd}=1.45$.

Input connecting waveguide top cladding material ICWTCd 22200T is silicon dioxide ($SiO_2$) for which its refractive Index $n_{ICWTCd}$ 22200Tn is 1.45.

Input connecting waveguide left cladding material ICWLCd 22200L is silicon dioxide ($SiO_2$), for which its refractive Index $n_{ICWLCd}$ 22200Ln is 1.45

Input connecting waveguide right cladding material ICWRCd 22200R is silicon dioxide ($SiO_2$), for which its refractive Index $n_{ICWRCd}$ 22200Rn is 1.45

The above form an input connecting waveguide ICWG 22200WG. The core-cladding refractive-index difference $n_{Rd}^2$ defined by $n_{Rd}^2=(n_{Co}^2-n_{Cd}^2)$ for waveguide ICWG 22200WG is $n_{Rd}^2=(3.6^2-1.45^2)=10.86$ with $n_{Co}=3.6$ and $n_{Cd}=1.45$. Its averaged Cladding Refractive Index is given by $n_{aICWCd}=(n_{ICWBCd}^2 \times A_{ICWBCd}+n_{ICWTCd}^2 \times A_{ICWTCd}+n_{ICWRCd}^2 A_{ICWRCd}+n_{ICWLCd}^2 A_{ICWLCd})/(A_{ICWBCd}+A_{ICWTCd}+A_{ICWRCd}+A_{ICWLCd})^{0.5}=1.45$. Its averaged Core Refractive Index is given by $n_{aCo}=(n_{Co1}^2 \times A_{Co1}+n_{Co2}^2 \times A_{Co2}+n_{Co3}^2 A_{Co3}+\ldots+n_{Com}^2 A_{Com})/(A_{Co1}+A_{Co2}+A_{Co3}+\ldots+A_{Com})^{0.5}=3.6$.

The input optical beam IBM 22140 has propagating refractive index $n_{IBM}$ 22140$n$, for which $n_{IBM}$ is approximately 2.8 with optical power $P_{bm}$ 22140P approximately 1 mW, electric field polarization $E_{bm}$ 22140E to be in the horizontal direction parallel to the substrate surface. It has a beam effective area $A_{bm}$ 22140A of $A_{bm}=0.04$ $\mu m^2$ and an optical wavelength centered at $\lambda_{bm}$ 22140L with $\lambda_{bm}=1550$ nm with plurality of (N) frequency channels $\lambda_{bm1}=1548$ nm, $\lambda_{bm2}=1549$ nm, $\lambda_{bm3}=1550$ nm, $\lambda_{bm4}=1551$ nm, and $\lambda_{bm3}=1552$ nm centered at $\lambda_{bm}=1550$ nm.

Input Beam Coupler Structure (IBCS) Region
The input tapering waveguide core ITWCo 223000 is made of silicon. Its width at a location $z1$, ITWCo-$z1$ 22300$z1$ is denoted as width $w_{ITWCo-z1}$ 22300$w$-$z1$. This width is tapered from width at $z1=0$ $w_{ITWCo-z1=0}$ 22300$w$-$z1=0$ that has a value of $w_{ITWCo-z1=0}=400$ nanometers (nm) to a width at $z1>0$ $w_{ITWCo-z1>0}$ 22300$w$-$z1>0$ that is narrower than 400 nm in a linear fashion.

The thickness of the tapering waveguide core $d_{ITWCo-z1}$ 22300$d$-$z1$ made of silicon is $d_{ITWCo-z1}=250$ nm with a refractive index $n_{ITWCo-z1}$ 22300$n$-$z$ that is $n_{ITWCo-z1}=3.6$. The total length of tapering waveguide $g_{ITWCo}$ 22300$g$ is $g_{ITWCo}=20$ micrometers ($\mu m$). The width of the waveguide core at the end of the tapering at $z1=g_{ITWCo}$ is $w_{ITWCo-g}$ 22300$w$-$g$ with $w_{ITWCo-g}=50$ nm.

Input supporting structure ISTR 21200 has width $w_{ISTR}$ 21200$w$ with $w_{ISTR}=50$ nm and thickness $d_{ISTR}$ 21200$d$ with $d_{ISTR}=250$ nm and length $g_{ISTR}$ 21200$g$ with $g_{ISTR}=20$ micrometers. It has an effective layer averaged refractive index $n_{laISTR}$ 21200$nla$ with $n_{laISTR}<2.5$.

Left cladding material ISTRLCd 21200L is air and has a refractive index $n_{ISTRLCd}$ 21200Ln given by $n_{ISTRLCd}=1$, and Right cladding material ISTRRCd 21200R is air and has a refractive index $n_{ISTRRCd}$ 21200Rn given by $n_{ISTRRCd}=1$. Its bottom cladding ISTRBCd 21200B is silicon dioxide (this is part of a Burried-Oxide BOX layer in a typical Silicon-On-Insulator SOI wafer) with averaged refractive index $n_{ISTRBCd}$ 21200Bn of $n_{ISTRBCd}=1.45$.

The top cladding ITWTCd-$z1$ 22300T-$z1$ before going into the ALS region is silicon dioxide ($SiO_2$) has refractive index $n_{ITWTCd-z1}$ 22300Tn-$z1$ with $n_{ITWTCd-z1}=1.45$. The bottom cladding ITWBCd-$z1$ 22300B-$z1$ before going into the ALS region is silicon dioxide ($SiO_2$) has refractive index $n_{ITWBCd-z1}$ 22300Bn-$z1$ with $n_{ITWBCd-z1}=1.45$.

The left cladding ITWLCd-$z1$ 22300L-$z1$ before going into the ALS region is silicon dioxide ($SiO_2$) has refractive index $n_{ITWLCd-z1}$ 22300Ln-$z1$ with $n_{ITWLCd-z1}=1.45$. The right cladding ITWRCd-$z1$ 22300R-$z1$ before going into the ALS region is silicon dioxide ($SiO_2$) has refractive index $n_{ITWRCd-z1}$ 22300Rn-$z1$ with $n_{ITWRCd-z1}=1.45$.

In this exemplary embodiment, $n_{ITWTCd-z1}=n_{ITWBCd-z1}=n_{ITWRCd-z1}=n_{ITWRCd-z1}=n_{ICWRCd}$, and $n_{ICWTCd}=n_{ICWBCd}=n_{ICWLCd}=n_{ICWRCd}$. Input tapering waveguide core ITWCo 22300 starting at $z1=z1ALS$ 22300$z1ALS$, where $z1ALS=10$ micrometers, is laid with an active layer structure ALS 22500. $0<z1$ $ALS<g_{ITWCo}$.

Active Layer Structure-Beam Transport into the Structure
The active layer structure ALS 22500 is shown by the Table 3-1 below:

TABLE 3-1

| ALS 22500 Layer Number | Layer Thickness | NPNN TCO CASE | Doping/ (1/cm³) |
|---|---|---|---|
| BIM (21250) | 100 nm | $In_2O_3$ | |
| BSCOC 1 (21300) | 100 nm | InGaAsP 1.3 um (Bottom layer-just above the substrate) | $N = 1 \times 10^{19}$ |
| BIDC 2 (21350LN) | 40 nm | InP | $N = 1 \times 10^{19}$ |
| BVC 3 (21400) | 20 nm | InGaAsP 1.3 um | $N = 1 \times 10^{19}$ |
| EC 4 (21500LI₁) | 10 nm | AlGaInAs 1.3 um | $N_1 = 1 \times 10^{19}$ |
| EC 5 (21500MLI₁) | 4 nm barrier | AlGaInAs/1.19 um/−0.3% tensile strained | $MI_1 = I$ |
| EC 6 (21500MLI₂) | 2 × 7 nm barrier inside | AlGaInAs/1.19 um/−0.3% tensile strained | $MI_2 = I$ |
| EC 7 (21500MLI₃) | 3 × 11 nm Well (PL = 1500 nm) | AlGaInAs/1.55 um/0.31% compressive strained | $MI_3 = I$ |
| EC 8 (21500MLI₄) | 4 nm barrier | AlGaInAs/1.19 um/−0.3% tensile strained | $MI_4 = I$ |
| EC 9 (21500MLI₅) | 43 nm | AlGaInAs 1.3 um | $MI_5 = I$ |

TABLE 3-1-continued

| ALS 22500 Layer Number | Layer Thickness | NPNN TCO CASE | Doping/ (1/cm$^3$) |
|---|---|---|---|
| EC 10 (21500LP$_1$) | 20 nm | AlGaInAs 1.3 um | P$_1$ = 1 × 10$^{18}$ |
| TVC 11 (21600P$_2$) | 25 nm | InGaAsP 1.3 um | P$_2$ = 0.7 × 10$^{19}$ |
| TVC 12 (21600N$_2$) | 20 nm | InGaAsP 1.3 um | N$_2$ = 4 × 10$^{19}$ |
| TIDC 13 (21650) | 20 nm | InP | N = 1 × 10$^{19}$ |
| TVSCOC 14 (21700) | 40 nm | InGaAsP (Top layer) | N = 1 × 10$^{19}$ |
| Total | 380 nm | | |

In the table, the materials are unstrained (with InP as the substrate) if not specified as strained. The wavelength specified will be the material bandgap wavelength of the quaternary material involved (proper choice of the material composition is needed to achieve the required material bandgap and strain when grown on InP substrate).

Bottom Side Conduction and Ohmic Contact Layer

The active layer structure ALS 22500 has a bottom side conduction and Ohmic contact layer BSCOC 21300 that is InGaAsP layer given by layer 1 in Table 3-1 with thickness $d_{BSC}$ 21300$d$, where $d_{BSC}$=100 nm and width $w_{BSC}$ 21300$w$, where $w_{BSC}$ is approximately 54 micrometers along most of the length of the ALS. Its refractive index $n_{BSC}$ 21300$n$ is $n_{BSC}$=3.4.

Bottom Interspaced Material Layer

The bottom interspaced material layer BIM 21250 is made of a Low-Refractive-Index Ohmic Transparent Conducting (LRI-OTC) material composed of Indium oxide (In$_2$O$_3$) with thickness $d_{BIM}$ 21250$d$ equals to $d_{BIM}$=100 nm, width $w_{BIM}$ 21250$w$ equals to $w_{BIM}$=54 micrometers, and average refractive index $n_{BIM}$ 21250$n$ equals to $n_{BIM}$=1.7.

Bottom Metal Contact Pads

The first bottom left metal contact pad FBLM 21900L is a multi-layer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-1. The total thickness of the metal contact pad is $d_{FBLM}$ 21900Ld, with $d_{FBLM}$=1068 nm, and width $w_{FBLM}$ 21900Lw, where $w_{FBLM}$ is approximately 20 micrometers. The length of the metal contact pad $g_{FBLM}$ 21900Lg is approximately 500 micrometers.

The first bottom right metal contact pad FBRM 21900R is multilayer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-1. The total thickness of the metal contact pad is $d_{FBRM}$ 21900Rd, with $d_{FBRM}$=1068 nm, and width $w_{FBRM}$ 21900Rw, where $w_{FBRM}$ is approximately 20 micrometers. The length of the metal contact pad $g_{FBRM}$ 21900Rg is approximately 500 micrometers.

Bottom Metal Electrodes

On top of the first bottom left metal contact pad FBLM 21900L is deposited the first bottom left metal electrode FBLME 21120L which is gold of thickness of approximately 2 micrometer thick.

On top of the first bottom right metal contact pad FBRM 21900R is deposited the first bottom right metal electrode FBRME 21120R which is gold of thickness of approximately 2 micrometer thick.

Bottom Interspaced Dielectric Current Conduction Layer

Bottom interspaced dielectric current conduction layer BIDC 21350 is a n-doped InP given by layer 2 in Table 3-1 with thickness $d_{BIDC}$ 21350$d$ equals to $d_{BIDC}$=40 nm, width $w_{BIDC}$ 21350$w$ equals to $w_{BIDC}$=54 micrometers, and average refractive index $n_{BIDC}$ 21350$n$ equals to about $n_{BIDC}$=3.0.

Bottom Vertical Current Conduction Layer

Bottom vertical current conduction layer BVC 21400 is n-doped InGaAsP given by layer 3 in Table 3-1 with thickness $d_{BVC}$ 21400$d$ equals to $d_{BVC}$=20 nm, width $w_{BVC}$ 21400$w$ equals to $w_{BVC}$=2 micrometers, and an averaged refractive index $n_{BVC}$ 21400$n$ equals to $n_{BVC}$=3.4.

Electro-Active Layer

Electro-active layer EC 21500 is made up of layers 4, 5, 6, 7, 8, 9, 10 in Table 3-1 with an averaged refractive index of the entire layer given by $n_{EC}$ 21500$n$ with $n_{EC}$ equals to approximately $n_{EC}$=3.4. Under an applied electric field, there will be a change in averaged refractive index $dn_{EC}$ 21500$dn$. The average refractive index becomes $n_{EC}$ (new)=$n_{EC}$+$dn_{EC}$.

The total thickness $d_{EC}$ 21500$d$ of this Electro-active layer is $d_{EC}$=114.5 nm. Its width $w_{EC}$ 21500$w$ is equal to $w_{EC}$=2 micrometers.

The electro-active layer has a PqN junction at layer 4 to 10 for which layer 4 is layer 21500LN$_1$ that is N-doped with a dopant density of 21500N$_1$=1×10$^{19}$/cm$^3$ and layer 10 is layer 21500LP$_1$ that is P-doped with a dopant density of 21500P$_1$=1×10$^{18}$/cm$^3$ The intermediate layers 21500MLI$_m$ are all I-doped or intrinsic semiconductor.

The applied field $E_{EC}$ 21500E (which may cause a current $C_{EC}$ 21500C to flow) is across the entire electro-active layer with a negative voltage applied to the top and positive voltage applied to the bottom of this entire electro-active layer known to those skilled in the art as reverse bias (with respect to the PN junction in the electro-active layer) of voltage $V_R$ 21500VR so the applied electro-active $V_{EC}$ 21500VEC is $V_R$.

The voltage applied to the electrodes of the Photodetector $V_{MOD}$ 20000V is approximately given by $V_{EC}$.

Top Vertical Current Conduction Layer

Top vertical current conduction layer TVC 21600 is given by layer 11 and 12 in Table 3-1 made up of InGaAsP layer that is composed of 25 nm-thick layer 21600LP$_2$ that is P-doped with dopant density 21600P$_2$=1×10$^{18}$/cm$^3$, followed by 20 nm-thick N-doped InGaAsP layer 21600LN$_2$ with dopant density 21600N$_2$=1×10$^{19}$/cm$^3$. The total thickness for TVC 21600 is $d_{TVC}$ 21600$d$ with $d_{TVC}$=45 nm. Its width is W$_{TVC}$ 21600$w$ equals to W$_{TVC}$=2 micrometers, and its averaged refractive index is $n_{TVC}$ 21600$n$ equals to $n_{TVC}$=3.4. This N$_2$P$_2$ junction forms a forward-Biased PN Junction (or Tunnel PN Junction). It forms a PN-changing PN junction (called PNCPN junction) 21600PNCPN.

Top Interspaced Dielectric Current Conduction Layer

Top interspaced dielectric conduction layer TIDC 21650 is N-doped InP layer given by layer 13 in Table 3-1 with thickness $d_{TIDC}$ 21650$d$ equals to $d_{TIDC}$=20 nm, width $w_{TIDC}$ 21650$w$ equals to $w_{TIDC}$=8 micrometers, and averaged refractive index $n_{TIDC}$ 21650$n$ equals to $n_{TIDC}$=3.0.

Top Vertical/Side Conduction and Ohmic Contact Layer

Top vertical/side conduction and Ohmic contact layer TVSCOC 21700 is made up of InGaAsP given by layer 14 in Table 3-1 with thickness $d_{TVSC}$ 21700$d$ equals to $d_{TVSC}$=40 nm, width $w_{TVSC}$ 21700$w$ equals to $w_{TVSC}$=8 micrometers, and an averaged refractive index $n_{TVSC}$ 21700$n$ equals to $n_{TVSC}$=3.4.

Top Metal Contact Pads

The first top left metal contact pad FTLM 21800L is multilayer metal made up of (17 nm Au followed by 17 nm Ge followed by 17 nm Au followed by 17 nm Ni followed by 1000 nm Au) deposited on top of the top surface of n-doped layer 21700 given by layer 14 in Table 3-1. The total thickness of the metal contact pad is $d_{FTLM}$ 21800Ld, with $d_{FTLM}$=1068 nm, and width $w_{FTLM}$ 21800Lw, where $w_{FTLM}$ is approximately 3 micrometers. The length of the metal contact pad $g_{FTLM}$ 21800Lg is approximately 500 micrometers.

The first top right metal contact pad FTRM 21800R is multilayer metal made up of (17 nm Au followed by 17 nm Ge followed by 17 nm Au followed by 17 nm Ni followed by 1000 nm Au) deposited on top of the top surface of n-doped layer 21700 given by layer 14 in Table 3-1. The total thickness of the metal contact pad is $d_{FTRM}$ 21800Rd, with $d_{FTRM}$=1068 nm, and width $w_{FTRM}$ 21800Rw, where $w_{FTRM}$ is approximately 3 micrometers. The length of the metal contact pad $g_{FTRM}$ 21800Rg is approximately 500 micrometers.

There is no top middle metal contact pad FTMM 21800M.
Top Metal Electrodes.

On top of the first top left metal contact pad FTLM 21800L is deposited the first top left metal electrode FTLME 21130L which is gold of thickness of approximately 2 micrometer thick.

On top of the first top right metal contact pad FTRM 21800R is deposited the first top right metal electrode FTRME 21130R which is gold of thickness of approximately 2 micrometer thick.

Beam Transport to Electro-Active Waveguiding Core Structure

Input tapering waveguide region between z1=z1ALS 22300z1ALS and z1=$g_{ITWCo}$ 22300g, Tapering waveguide core width $w_{ITWCo-z}$ 22300w varies down to a smaller value of $w_{ITWCo-g}$=50 nm at z1=$g_{ITWCo}$ 22300g from its vale at z1=z1 ALS 22300z1ALS. Clearly $W_{ITWCo-g} \ll \lambda_{bm}/(2*n_{ITWCo})$, with $\lambda_{bm}$=1550 nm and $n_{ITWCo}$=3.6, where * is number multiplication.

Output Connecting Waveguide

Output connecting waveguide core OCWCo 28200 has averaged Refractive Index $n_{OCWCo}=n_{aOCWCo}$=3.6, thickness $d_{OCWCo}$ 28200d is $d_{OCWCo}$=250 nm, and width $W_{OCWCo}$ 28200w is $W_{OCWCo}$=400 nm.

Output connecting waveguide OCWG 28200WG has Output connecting-waveguide bottom cladding material OCWBCd 28200B that is silicon dioxide (SiO$_2$) for which the refractive index $n_{OCWBCd}$ 28200Bn is $n_{OCWBCd}$=1.45.

Output connecting waveguide top cladding material OCWTCd 28200T is silicon dioxide foe which the refractive index $n_{OCWTCd}$ 28200Tn is $n_{OCWTCd}$=1.45.

Output connecting waveguide left cladding material OCWLCd 28200L is silicon dioxide for which the refractive index $n_{OCWLCd}$ 28200Ln is $n_{OCWLCd}$=1.45.

Output connecting waveguide right cladding material OCWRCd 28200R is silicon dioxide for which the refractive index $n_{OCWRCd}$ 28200Rn is $n_{OCWRCd}$=1.45.

The resulted averaged cladding refractive Index $n_{aOCWCd}$ 28200aCdn is $n_{aOCWCd}$=1.45.

Output optical beam OBM 28140
Output Beam Coupler Structure (OBCS) Region

Output tapering waveguide core OTWCo 28300 is made of silicon. Its width at a location z2 OTWCo-z2 is denoted as width $w_{OTWCo-z2}$ 28300w-z2. This width is tapered from width at z2=0 $w_{OTWCo-z2=0}$ 28300w-z2=0 that has a value of $w_{OTWCo-z2=0}$=400 nm to a width at z2>0 $w_{OTWCo-z2>0}$ 28300w-z2>0 that is narrower than 400 nm in a linear fashion. The thickness of the tapering waveguide core $d_{OTWCo-z2}$ 28300d-z2 made of silicon is $d_{OTWCo-z2}$=250 nm with a refractive index $n_{OTWCo-z2}$ 28300n-z2 that is $n_{OTWCo-z2}$=3.6.

The total length of tapering waveguide $g_{OTWCo}$ 28300g is $g_{OTWCo}$=20 micrometers (μm). The width of the waveguide core at the end of the tapering at z2=$g_{OTWCo}$ is $w_{OTWCo-g}$ 28300w-g with $w_{OTWCo-g}$=50 nm.

Output supporting structure OSTR 29200 has width $w_{OSTR}$ 29200w with $w_{OSTR}$=50 nm and thickness $d_{OSTR}$ 29200d with $d_{OSTR}$=250 nm and length $g_{OSTR}$ 29200g with $g_{OSTR}$=20 micrometers. It has an effective layer averaged refractive index $n_{laOSTR}$ 29200nla with $n_{laOSTR}$<2.5.

The top cladding OTWTCd-z2 28300T-z2 is silicon dioxide (SiO$_2$) has refractive index $n_{OTWTCd-z2}$ 28300Tn-z2 with $n_{OTWTCd-z2}$=1.45 before going into the ALS region.

The bottom cladding OTWBCd-z2 28300B-z2 is silicon dioxide (SiO$_2$) has refractive index $n_{OTWBCd-z2}$ 28300Bn-z2 with $n_{OTWBCd-z2}$=1.45.

The left cladding OTWLCd-z2 28300L-z2 is silicon dioxide (SiO$_2$) has refractive index $n_{OTWLCd-z2}$ 28300Ln-z2 with $n_{OTWLCd-z2}$=1.45.

The right cladding OTWRCd-z2 28300R-z2 is silicon dioxide (SiO$_2$) has refractive index $n_{OTWRCd-z2}$ 28300Rn-z2 with $n_{OTWRCd-z2}$=1.45.

In this exemplary embodiment, $n_{OTWTCd-z2}=n_{OTWBCd-z2}=n_{OTWLCd-z2}=n_{OTWRCd-z2}=n_{OCWTCd}$, and $n_{OCWTCd}=n_{OCWBCd}=n_{OCWLCd}=n_{OCWRCd}$ Output tapering waveguide core OTWCo 28300 starting at z2=z2ALS 28300z2ALS, is laid with an active layer structure ALS 22500. 0<z2ALS<$g_{OTWCo}$.

Most of the output optical beam energy of beam OBM 28140 is transported to output tapering waveguide core OTWCo 28300 from the electro-active waveguiding core structure EWCoS 22600, through the output tapering waveguide region between z2=z2ALS 28300z2ALS and z2=$g_{OTWCo}$ 28300g, where the output tapering waveguide core width $w_{OCWCo-z2}$ 28300w-z2 varies down to a smaller value of $w_{OTWCo-g}$ at z2=$g_{ITWCo}$ 28300g from its vale at z2=z2ALS, 28300z2ALS. The tapering waveguide core width is reduced to well below half the optical wavelength in the waveguide core given by $\lambda_{bm}/(2 \times n_{OTWCo})$ so that $w_{OTWCo} \ll \lambda_{bm}/(2 \times n_{OTWCo})$. After the energy transported from the electro-active waveguiding core structure EWCoS 22600 that contains the electro-active layer EC 21500 down to the output taper at z2=0 where the taper core width is $w_{OTWCo-z2=0}$ 28300w0 and $w_{OTWCo-z2=0}=w_{OCWCo}$ 28200, the optical beam is denoted as output optical beam or beam OBM 28140.

Length of Active Layer Structure

The length of the active layer structure SL$_{mod}$ 22550 is approximately 500 micrometers.

High Refractive Index Contrast and Mode Overlapping
For the bottom cladding:
Waveguide core refractive index is $n_{co}$=3.6
Waveguide bottom cladding is $n_{BCd}$=1.45 (given by layer ISTRBC with $n_{ISTRBCd}$=1.45)
Waveguide core-to-cladding refractive index difference square to be $n_{rd}^2=(n_{co}^2-n_{BCd}^2)$=10.86.
Refractive index contrast ratio to be: $R_{cts}=n_{rd}^2/(n_{co}^2+n_{BCd}^2)$=0.7, which is in the very-strongly guiding regime.
For the top cladding:
Waveguide core refractive index is $n_{co}$=3.6
Waveguide bottom cladding is $n_{TCd}$=1 (given by material above TVSCOC layer which is air with n=1)

Waveguide core-to-cladding refractive index difference square to be $n_{rd}^2=(n_{co}^2-n_{TCd}^2)=11.96$.
Refractive index contrast ratio to be: $R_{cts}=n_{rd}^2/(n_{co}^2+n_{TCd}^2)=0.86$, which is in the very-strongly guiding regime.

A Second Exemplary Device of Photodetector with Transparent Conductor Geometry A preferred embodiment of an exemplary device is Photodetector Device 20000 with the following specifications referred to as a second exemplary device of Photodetector with Ohmic transparent conductor geometry: The main difference between this and the First Exemplary Device is in Table 3-2, in which the active layer is designed for Photodetector. Also, there are no left and right top metal contact pads, only middle metal contact pad.

Substrate SUB 21100 is silicon wafer substrate with a thickness of about 0.3 mm. Input connecting waveguide core ICWCo 22200 is made of silicon for which its averaged material refractive index $n_{ICWCo}$ 22200n is around $n_{ICWCo}=3.6$, thickness $d_{ICWCo}$ 22200d is $d_{ICWCo}=250$ nm, and width $w_{ICWCo}$ 22200w is $W_{ICWCo}=400$ nm.

Input connecting-waveguide bottom cladding material ICWBCd 22200B is silicon dioxide ($SiO_2$), for which its refractive Index $n_{ICWBCd}$ 22200Bn is $n_{ICWBCd}=1.45$.

Input connecting waveguide top cladding material ICWTCd 22200T is silicon dioxide ($SiO_2$) for which its refractive Index $n_{ICWTCd}$ 22200Tn is 1.45.

Input connecting waveguide left cladding material ICWLCd 22200L is silicon dioxide ($SiO_2$), for which its refractive Index $n_{ICWLCd}$ 22200Ln is 1.45

Input connecting waveguide right cladding material ICWRCd 22200R is silicon dioxide ($SiO_2$), for which its refractive Index $n_{ICWRCd}$ 22200Rn is 1.45

The above form an input connecting waveguide ICWG 22200WG. The core-cladding refractive-index difference $n_{Rd}$ defined by $n_{Rd}^2=(n_{Co}^2-n_{Cd}^2)$ for waveguide ICWG 22200WG is $n_{Rd}^2=(3.6^2-1.45^2)=10.86$ with $n_{Co}=3.6$ and $n_{Cd}=1.45$. Its averaged Cladding Refractive Index is given by $n_{aICWCd}=(n_{ICWBCd}^2 \times A_{ICWBCd}+n_{ICWTCd}^2 \times A_{ICWTCd}+n_{ICWRCd}^2 A_{ICWRCd}+n_{ICWLCd}^2 A_{ICWLCd})/(A_{ICWBCd}+A_{ICWTCd}+A_{ICWRCd}+A_{ICWLCd})^{0.5}=1.45$. Its averaged Core Refractive Index is given by $n_{aCo}=(n_{Co1}^2 \times A_{Co1}+n_{Co2}^2 \times A_{Co2}+n_{Co3}^2 A_{Co3}+ \ldots +n_{Com}^2 A_{Com})/(A_{Co1}+A_{Co2}+A_{Co3}+ \ldots +A_{Com})^{0.5}=3.6$.

The input optical beam IBM 22140 has propagating refractive index $n_{IBM}$ 22140n, for which $n_{IBM}$ is approximately 2.8 with optical power $P_{bm}$ 22140P approximately 1 mW, electric field polarization $E_{bm}$ 22140E to be in the horizontal direction parallel to the substrate surface. It has a beam effective area $A_{bm}$ 22140A of $A_{bm}=0.04$ $\mu m^2$ and an optical wavelength centered at $\lambda_{bm}$ 22140L with $\mu_{bm}=1550$ nm with plurality of (N) frequency channels $\lambda_{bm1}=1548$ nm, $\lambda_{bm2}=1549$ nm, $\lambda_{bm3}=1550$ nm, $\lambda_{bm4}=1551$ nm, and $\lambda_{bm3}3=1552$ nm centered at $\lambda_{bm}=1550$ nm.

Input Beam Coupler Structure (IBCS) Region

The input tapering waveguide core ITWCo 223000 is made of silicon. Its width at a location z1, ITWCo-z1 22300z1 is denoted as width $w_{ITWCo-z1}$ 22300w-z1. This width is tapered from width at z1=0 $w_{ITWCo-z1=0}$ 22300w-z1=0 that has a value of $w_{ITWCo-z1=0}=400$ nanometers (nm) to a width at z1>0 $w_{ITWCo-z1>0}$ 22300w-z1>0 that is narrower than 400 nm in a linear fashion.

The thickness of the tapering waveguide core $d_{ITWCo-z1}$ 22300d-z1 made of silicon is $d_{ITWCo-z1}=250$ nm with a refractive index $n_{ITWCo-z1}$ 22300n-z that is $n_{ITWCo-z1}=3.6$. The total length of tapering waveguide $g_{ITWCo}$ 22300g is $g_{ITWCo}=20$ micrometers ($\mu m$). The width of the waveguide core at the end of the tapering at $z1=g_{ITWCo}$ is $w_{ITWCo-g}$ 22300w-g with $w_{ITWCo-g}=50$ nm.

Input supporting structure ISTR 21200 has width $w_{ISTR}$ 21200w with $w_{ISTR}=50$ nm and thickness $d_{ISTR}$ 21200d with $d_{ISTR}=250$ nm and length $g_{ISTR}$ 21200g with $g_{ISTR}=20$ micrometers. It has an effective layer averaged refractive index $n_{laISTR}$ 21200nla with $n_{laISTR}<2.5$.

Left cladding material ISTRLCd 21200L is air and has a refractive index $n_{ISTRLCd}$ 21200Ln given by $n_{ISTRLCd}=1$, and Right cladding material ISTRRCd 21200R is air and has a refractive index $n_{ISTRRCd}$ 21200Rn given by $n_{ISTRRCd}=1$. Its bottom cladding ISTRBCd 21200B is silicon dioxide (this is part of a Burried-Oxide BOX layer in a typical Silicon-On-Insulator SOI wafer) with averaged refractive index $n_{ISTRBCd}$ 21200Bn of $n_{ISTRBCd}=1.45$.

The top cladding ITWTCd-z1 22300T-z1 before going into the ALS region is silicon dioxide ($SiO_2$) has refractive index $n_{ITWTCd-z1}$ 22300Tn-z1 with $n_{ITWTCd-z1}=1.45$.
The bottom cladding ITWBCd-z1 22300B-z1 before going into the ALS region is silicon dioxide ($SiO_2$) has refractive index $n_{ITWBCd-z1}$ 22300Bn-z1 with $n_{ITWBCd-z1}=1.45$.
The left cladding ITWLCd-z1 22300L-z1 before going into the ALS region is silicon dioxide ($SiO_2$) has refractive index $n_{ITWBCd-z1}$ 22300Ln-z1 with $n_{ITWLCd-z1}=1.45$.
The right cladding ITWRCd-z1 22300R-z1 before going into the ALS region is silicon dioxide ($SiO_2$) has refractive index $n_{ITWRCd-z1}$ 22300Rn-z1 with $n_{ITWRCd-z1}=1.45$.
In this exemplary embodiment, $n_{ITWTCd-z1}=n_{ITWBCd-z1}=n_{ITWLCd-z1}=n_{ITWRCd-z1}=n_{ICWTCd}$, and $n_{ICWTCd}=n_{ICWBCd}=n_{ICWLCd}=n_{ICWRCd}$. Input tapering waveguide core ITWCo 22300 starting at z1=z1ALS 22300z1ALS, where z1ALS=10 micrometers, is laid with an active layer structure ALS 22500. $0<z1ALS<g_{ITWCo}$.

Active Layer Structure-Beam Transport into the Structure
The active layer structure ALS 22500 is shown by the Table 3-2 below:

TABLE 3-2

| ALS 22500 Layer Number | Layer Thickness | NPNN TCO CASE | Doping/ (1/cm$^3$) |
|---|---|---|---|
| BIM (21250) | 100 nm | $In_2O_3$ | |
| BSCOC 1 (21300) | 100 nm | InGaAsP 1.3 um (Bottom layer-just above the substrate) | N = 1 × 10$^{19}$ |
| BIDC 2 (21350LN) | 40 nm | InP | N = 1 × 10$^{19}$ |
| BVC 3 (21400) | 20 nm | InGaAsP 1.3 um | N = 1 × 10$^{19}$ |
| EC 4 (21500LN$_1$) | 10 nm | AlGaInAs 1.3 um | N$_1$ = 1 × 10$^{19}$ |
| EC 5 (21500MLI$_1$) | 11 nm barrier | AlGaInAs/1.19 um/−0.3% tensile strained | MI$_1$ = I |
| EC 6 (21500MLI$_2$) | 3 × 7 nm barrier inside | AlGaInAs/1.19 um/−0.3% tensile strained | MI$_2$ = I |
| EC 7 (21500MLI$_3$) | 4 × 11 nm Well (PL = 1500 nm) | AlGaInAs/1.55 um/0.31% compressive strained | MI$_3$ = I |
| EC 8 (21500MLI$_4$) | 11 nm barrier | AlGaInAs/1.19 um/−0.3% tensile strained | MI$_4$ = I |
| EC 9 (21500MLI$_5$) | 43 nm | AlGaInAs 1.3 um | MI$_5$ = I |
| EC 10 (21500LP$_1$) | 20 nm | AlGaInAs 1.3 um | P$_1$ = 1 × 10$^{18}$ |
| TVC 11 (21600P$_2$) | 25 nm | InGaAsP 1.3 um | P$_2$ = 1 × 10$^{18}$ |
| TVC 12 (21600N$_2$) | 20 nm | InGaAsP 1.3 um | N$_2$ = 1 × 10$^{19}$ |

TABLE 3-2-continued

| ALS 22500 Layer Number | Layer Thickness | NPNN TCO CASE | Doping/ (1/cm³) |
|---|---|---|---|
| TIDC 13 (21650) | 20 nm | InP | $N = 1 \times 10^{19}$ |
| TVSCOC 14 (21700) | 240 nm | In$_2$O$_3$ (Top layer) | |
| Total | 625 nm | | |

In the table, the materials are unstrained (with InP as the substrate) if not specified as strained. The wavelength specified will be the material bandgap wavelength of the quaternary material involved (proper choice of the material composition is needed to achieve the required material bandgap and strain when grown on InP substrate).

Bottom Side Conduction and Ohmic Contact Layer

The active layer structure ALS 22500 has a bottom side conduction and Ohmic contact layer BSCOC 21300 that is InGaAsP layer given by layer 1 in Table 3-2 with thickness $d_{BSC}$ 21300$d$, where $d_{BSC}$=100 nm and width $w_{BSC}$ 21300$w$, where $w_{BSC}$ is approximately 54 micrometers along most of the length of the ALS. Its refractive index $n_{BSC}$ 21300$n$ is $n_{BSC}$=3.4.

Bottom Interspaced Material Layer

The bottom interspaced material layer BIM 21250 is made of a Low-Refractive-Index Ohmic Transparent Conducting (LRI-OTC) material composed of Indium oxide (In$_2$O$_3$) with thickness $d_{BIM}$ 21250$d$ equals to $d_{BIM}$=100 nm, width $w_{BIM}$ 21250$w$ equals to $w_{BIM}$=54 micrometers, and average refractive index $n_{BIM}$ 21250$n$ equals to $n_{BIM}$=1.7.

Bottom Metal Contact Pads

The first bottom left metal contact pad FBLM 21900L is a multi-layer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-2. The total thickness of the metal contact pad is $d_{FBLM}$ 21900L$d$, with $d_{FBLM}$=1068 nm, and width $w_{FBLM}$ 21900L$w$, where $w_{FBLM}$ is approximately 20 micrometers. The length of the metal contact pad $g_{FBLM}$ 21900L$g$ is approximately 500 micrometers.

The first bottom right metal contact pad FBRM 21900R is multilayer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-2. The total thickness of the metal contact pad is $d_{FBRM}$ 21900R$d$, with $d_{FBRM}$=1068 nm, and width $w_{FBRM}$ 21900R$w$, where $w_{FBRM}$ is approximately 20 micrometers. The length of the metal contact pad $g_{FBRM}$ 21900R$g$ is approximately 500 micrometers.

Bottom Metal Electrodes

On top of the first bottom left metal contact pad FBLM 21900L is deposited the first bottom left metal electrode FBLME 21120L which is gold of thickness of approximately 2 micrometer thick.

On top of the first bottom right metal contact pad FBRM 21900R is deposited the first bottom right metal electrode FBRME 21120R which is gold of thickness of approximately 2 micrometer thick.

Bottom Interspaced Dielectric Current Conduction Layer

Bottom interspaced dielectric current conduction layer BIDC 21350 is a n-doped InP given by layer 2 in Table 3-2 with thickness $d_{BIDC}$ 21350$d$ equals to $d_{BIDC}$=40 nm, width $w_{BIDC}$ 21350$w$ equals to $w_{BIDC}$=54 micrometers, and average refractive index $n_{BIDC}$ 21350$n$ equals to about $n_{BIDC}$=3.0.

Bottom Vertical Current Conduction Layer

Bottom vertical current conduction layer BVC 21400 is n-doped InGaAsP given by layer 3 in Table 3-2 with thickness $d_{BVC}$ 21400$d$ equals to $d_{BVC}$=20 nm, width $w_{BVC}$ 21400$w$ equals to $w_{BVC}$=2 micrometers, and an averaged refractive index $n_{BVC}$ 21400$n$ equals to $n_{BVC}$=3.4.

Electro-Active Layer

Electro-active layer EC 21500 is made up of layers 4, 5, 6, 7, 8, 9, 10 in Table 3-1 with an averaged refractive index of the entire layer given by $n_{EC}$ 21500$n$ with $n_{EC}$ equals to approximately $n_{EC}$=3.4. Under an applied electric field, there will be a change in averaged refractive index $dn_{EC}$ 21500$dn$. The average refractive index becomes $n_{EC}$(new)=$n_{EC}$+$dn_{EC}$.

The total thickness $d_{EC}$ 21500$d$ of this Electro-active layer is $d_{EC}$=160 nm. Its width $w_{EC}$ 21500$w$ is equal to $w_{EC}$=2 micrometers.

The electro-active layer has a PqN junction at layer 4 to 10 for which layer 4 is layer 21500LN$_1$ that is N-doped with a dopant density of 21500N$_1$=1×10$^{19}$/cm$^3$ and layer 10 is layer 21500LP$_1$ that is P-doped with a dopant density of 21500P$_1$=1×10$^{18}$/cm$^3$ The intermediate layers 21500MLI$_m$ are all undoped (intrinsic semiconductor).

The applied field E$_{EC}$ 21500E (which may cause a current C$_{EC}$ 21500C to flow) is across the entire electro-active layer with a negative voltage applied to the top and positive voltage applied to the bottom of this entire electro-active layer known to those skilled in the art as reverse bias (with respect to the PN junction in the electro-active layer) of voltage V$_R$ 21500VR so the applied electro-active V$_{EC}$ 21500VEC is V$_R$.

The voltage applied to the electrodes of the Photodetector V$_{MOD}$ 20000V is approximately given by V$_{EC}$.

Top Vertical Current Conduction Layer

Top vertical current conduction layer TVC 21600 is given by layer 11 and 12 in Table 3-2 made up of InGaAsP layer that is composed of 25 nm-thick layer 21600LP$_2$ that is P-doped with dopant density 21600P$_2$=1×10$^{18}$/cm$^3$, followed by 20 nm-thick N-doped InGaAsP layer 21600LN$_2$ with dopant density 21600N$_2$=1×10$^{19}$/cm$^3$. The total thickness for TVC 21600 is $d_{TVC}$ 21600$d$ with $d_{TVC}$=45 nm. Its width is $w_{TVC}$ 21600$w$ equals to $w_{TVC}$=2 micrometers, and its averaged refractive index is $n_{TVC}$ 21600$n$ equals to $n_{TVC}$=3.4. This N$_2$P$_2$ junction forms a forward-Biased PN Junction (or Tunnel PN Junction). It forms a PN-changing PN junction (called PNCPN junction) 21600PNCPN.

Top Interspaced Dielectric Current Conduction Layer

Top interspaced dielectric conduction layer TIDC 21650 is N-doped InP layer given by layer 13 in Table 3-2 with thickness $d_{TIDC}$ 21650$d$ equals to $d_{TIDC}$=20 nm, width $w_{TIDC}$ 21650$w$ equals to $w_{TIDC}$=2 micrometers, and averaged refractive index $n_{TIDC}$ 21650$n$ equals to $n_{TIDC}$=3.0.

Top Vertical/Side Conduction and Ohmic Contact Layer

Top vertical/side conduction and Ohmic contact layer TVSCOC 21700 is made up of Low-Refractive-Index Ohmic Transparent Conductor (LRI-OTC) (In$_2$O$_3$) given by layer 14 in Table 3-2 with thickness $d_{TVSC}$ 21700$d$ equals to $d_{TVSC}$=240 nm, width $w_{TVSC}$ 21700$w$ equals to $w_{TVSC}$=2 micrometers, and an averaged refractive index $n_{TVSC}$ 21700$n$ equals to $n_{TVSC}$=1.7.

Top Metal Contact Pads

The first top middle metal contact pad FTMM 21800M is multilayer metal made up of (17 nm Au followed by 17 nm Ge followed by 17 nm Au followed by 17 nm Ni followed by 1000 nm Au) deposited on top of the top surface of n-doped layer 21700 given by layer 14 in Table 3-2. The total thickness of the metal contact pad is $d_{FTMM}$ 21800Md, with $d_{FTMM}$=1068 nm, and width $w_{FTMM}$ 21800Mw, where $w_{FTMM}$ is approximately 2 micrometers. The length of the metal contact pad $g_{FTMM}$ 21800Mg is approximately 500 micrometers.

There is no top left or right metal contact pad FTLM 21800L or FTRM 21800R.

Top Metal Electrodes.

On top of the first top middle metal contact pad FTMM 21800M is deposited the first top middle metal electrode FTMME 21130M which is gold of thickness of approximately 2 micrometer thick.

Beam Transport to Electro-Active Waveguiding Core Structure

Input tapering waveguide region between z1=z1ALS 22300z1ALS and z1=$g_{ITWCo}$ 22300g, Tapering waveguide core width $w_{ITWCo-z}$ 22300w varies down to a smaller value of $w_{ITWCo-g}$=50 nm at z1=$g_{ITWCo}$ 22300g from its vale at z1=z1 ALS 22300z1ALS.

Clearly $W_{ITWCo-g} \ll \lambda_{bm}/(2*n_{ITWCo})$, with $\lambda_{bm}$=1550 nm and $n_{ITWCo}$=3.6, where * is number multiplication.

Output Connecting Waveguide

Output connecting waveguide core OCWCo 28200 has averaged Refractive Index $n_{OCWCo}$=$n_{aOCWCo}$=3.6, thickness $d_{OCWCo}$ 28200d is $d_{OCWCo}$=250 nm, and width $W_{OCWCo}$ 28200w is $W_{OCWCo}$=400 nm.

Output connecting waveguide OCWG 28200WG has Output connecting-waveguide bottom cladding material OCWBCd 28200B that is silicon dioxide (SiO$_2$) for which the refractive index $n_{OCWBCd}$ 28200Bn is $n_{OCWBCd}$=1.45.

Output connecting waveguide top cladding material OCWTCd 28200T is silicon dioxide foe which the refractive index $n_{OCWTCd}$ 28200Tn is $n_{OCWTCd}$=1.45.

Output connecting waveguide left cladding material OCWLCd 28200L is silicon dioxide for which the refractive index $n_{OCWLCd}$ 28200Ln is $n_{OCWLCd}$=1.45.

Output connecting waveguide right cladding material OCWRCd 28200R is silicon dioxide for which the refractive index $n_{OCWRCd}$ 28200Rn is $n_{OCWRCd}$=1.45.

The resulted averaged cladding refractive Index $n_{aOCWCd}$ 28200aCdn is $n_{aOCWCd}$=1.45.

Output optical beam OBM 28140

Output Beam Coupler Structure (OBCS) Region

Output tapering waveguide core OTWCo 28300 is made of silicon. Its width at a location z2 OTWCo-z2 is denoted as width $w_{OTWCo-z2}$ 28300w-z2. This width is tapered from width at z2=0 $w_{OTWCo-z2=0}$ 28300w-z2=0 that has a value of $w_{OTWCo-z2=0}$=400 nm to a width at z2>0 $w_{OTWCo-z2>0}$ 28300w-z2>0 that is narrower than 400 nm in a linear fashion. The thickness of the tapering waveguide core $d_{OTWCo-z2}$ 28300d-z2 made of silicon is $d_{OTWCo-z2}$=250 nm with a refractive index $n_{OTWCo-z2}$ 28300n-z2 that is $n_{OTWCo-z2}$=3.6.

The total length of tapering waveguide $g_{OTWCo}$ 28300g is $g_{OTWCo}$=20 micrometers (μm). The width of the waveguide core at the end of the tapering at z2=$g_{OTWCo}$ is $w_{OTWCo-g}$ 28300w-g with $w_{OTWCo-g}$=50 nm.

Output supporting structure OSTR 29200 has width $w_{OSTR}$ 29200w with $w_{OSTR}$=50 nm and thickness $d_{OSTR}$ 29200d with $d_{OSTR}$=250 nm and length $g_{OSTR}$ 29200g with $g_{OSTR}$=20 micrometers. It has an effective layer averaged refractive index $n_{laOSTR}$ 29200nla with $n_{laOSTR}$<2.5.

The top cladding OTWTCd-z2 28300T-z2 is silicon dioxide (SiO$_2$) has refractive index $n_{OTWTCd-z2}$ 28300Tn-z2 with $n_{OTWTCd-z2}$=1.45 before going into the ALS region.

The bottom cladding OTWBCd-z2 28300B-z2 is silicon dioxide (SiO$_2$) has refractive index $n_{OTWBCd-z2}$ 28300Bn-z2 with $n_{OTWBCd-z2}$=1.45.

The left cladding OTWLCd-z2 28300L-z2 is silicon dioxide (SiO$_2$) has refractive index $n_{OTWLCd-z2}$ 28300Ln-z2 with $n_{OTWLCd-z2}$=1.45.

The right cladding OTWRCd-z2 28300R-z2 is silicon dioxide (SiO$_2$) has refractive index $n_{OTWRCd-z2}$ 28300Rn-z2 with $n_{OTWRCd-z2}$=1.45.

In this exemplary embodiment, $n_{OTWTCd-z2}$=$n_{OTWBCd-z2}$=$n_{OTWLCd-z2}$=$n_{OTWRCd-z2}$=$n_{OCWTCd}$, and $n_{OCWTCd}$=$n_{OTWBCd}$=$n_{OTWLCd}$=$n_{OTWRCd}$ Output tapering waveguide core OTWCo 28300 starting at z2=z2ALS 28300z2ALS, is laid with an active layer structure ALS 22500. 0<z2ALS<$g_{OTWCo}$.

Most of the output optical beam energy of beam OBM 28140 is transported to output tapering waveguide core OTWCo 28300 from the electro-active waveguiding core structure EWCoS 22600, through the output tapering waveguide region between z2=z2ALS 28300z2ALS and z2=$g_{OTWCo}$ 28300g, where the output tapering waveguide core width $w_{OTWCo-z2}$ 28300w-z2 varies down to a smaller value of $w_{OTWCo-g}$ at z2=$g_{ITWCo}$ 28300g from its vale at z2=z2ALS, 28300z2ALS. The tapering waveguide core width is reduced to well below half the optical wavelength in the waveguide core given by $\lambda_{bm}/(2 \times n_{OTWCo})$ so that $w_{OTWCo-g} \ll \lambda_{bm}/(2 \times n_{OTWCo})$. After the energy transported from the electro-active waveguiding core structure EWCoS 22600 that contains the electro-active layer EC 21500 down to the output taper at z2=0 where the taper core width is $w_{OTWCo-z2=0}$ 28300w0 and $w_{OTWCo-z2=0}$=$w_{OCWCo}$ 28200, the optical beam is denoted as output optical beam or beam OBM 28140.

Length of Active Layer Structure

The length of the active layer structure $SL_{mod}$ 22550 is approximately 500 micrometers.

High Refractive Index Contrast and Mode Overlapping

For the bottom cladding:

Waveguide core refractive index is $n_{BCo}$=3.6

Waveguide bottom cladding is $n_{BCd}$=1.45 (given by layer ISTRBC with $n_{ISTRBCd}$=1.45)

Waveguide core-to-cladding refractive index difference square to be $n_{rd}^2 = (n_{co}^2 - n_{BCd}^2) = 10.86$.

Refractive index contrast ratio to be: $R_{cts} = n_{rd}^2/(n_{co}^2 + n_{BCd}^2) = 0.7$, which is in the very-strongly guiding regime.

For the top cladding:

Waveguide core refractive index is $n_{co}$=3.6

Waveguide bottom cladding is $n_{TCd}$=1.7 (given by TVSCOC layer which is In$_2$O$_3$ with $n_{TVSCOC}$=1.7)

Waveguide core-to-cladding refractive index difference square to be $n_{rd}^2 = (n_{co}^2 - n_{TCd}^2) = 10$.

Refractive index contrast ratio to be: $R_{cts} = n_{rd}^2/(n_{co}^2 + n_{TCd}^2) = 0.64$, which is in the very-strongly guiding regime.

A Third Exemplary Device of Optical Amplifier with Transparent Conductor Geometry A preferred embodiment of an exemplary device is Optical Amplifier Device 20000 with the following specifications referred to as a third exemplary device Optical Amplifier with Ohmic transparent conductor geometry: The main difference between this and the Second Exemplary Device is in Table 3-3, in which the active layer is designed for Optical Amplifier operated with forward bias.

Substrate SUB 21100 is silicon wafer substrate with a thickness of about 0.3 mm. Input connecting waveguide core ICWCo 22200 is made of silicon for which its averaged material refractive index $n_{ICWCo}$ 22200n is around $n_{ICWCo}$=3.6, thickness $d_{ICWCo}$ 22200d is $d_{ICWCo}$=250 nm, and width $W_{ICWCo}$ 22200w is $W_{ICWCo}$=400 nm.

Input connecting-waveguide bottom cladding material ICWBCd 22200B is silicon dioxide (SiO$_2$), for which its refractive Index $n_{ICWBCd}$ 22200Bn is $n_{ICWBCd}$=1.45.

Input connecting waveguide top cladding material ICWTCd 22200T is silicon dioxide (SiO$_2$) for which its refractive Index $n_{ICWTCd}$ 22200Tn is 1.45.

Input connecting waveguide left cladding material ICWLCd 22200L is silicon dioxide (SiO$_2$), for which its refractive Index $n_{ICWLCd}$ 22200Ln is 1.45

Input connecting waveguide right cladding material ICWRCd 22200R is silicon dioxide (SiO$_2$), for which its refractive Index $n_{ICWRCd}$ 22200Rn is 1.45

The above form an input connecting waveguide ICWG 22200WG. The core-cladding refractive-index difference $n_{Rd}$ defined by $n_{Rd}^2=(n_{Co}^2-n_{Cd}^2)$ for waveguide ICWG 22200WG is $n_{Rd}^2=(3.6^2-1.45^2)=10.86$ with $n_{Co}$=3.6 and $n_{Cd}$=1.45. Its averaged Cladding Refractive Index is given by $n_{aICWCd}=(n_{ICWBCd}^2 \times A_{ICWBCd}+n_{ICWTCd}^2 \times A_{ICWTCd}+n_{ICWRCd}^2 A_{ICWRCd}+n_{ICWLCd}^2 A_{ICWLCd})/(A_{ICWBCd}+A_{ICWTCd}+A_{ICWRCd}+A_{ICWLCd})^{0.5}=1.45$. Its averaged Core Refractive Index is given by $n_{aCo}=(n_{Co1}^2 \times A_{Co1}+n_{Co2}^2 \times A_{Co2}+n_{Co3}^2 A_{Co3}+ \ldots +n_{Com}^2 A_{Com})/(A_{Co1}+A_{Co2}+A_{Co3}+ \ldots +A_{Com})^{0.5}=3.6$.

The input optical beam IBM 22140 has propagating refractive index $n_{IBM}$ 22140n, for which $n_{IBM}$ is approximately 2.8 with optical power $P_{bm}$ 22140P approximately 1 mW, electric field polarization $E_{bm}$ 22140E to be in the horizontal direction parallel to the substrate surface. It has a beam effective area $A_{bm}$ 22140A of $A_{bm}$=0.04 μm$^2$ and an optical wavelength centered at $\lambda_{bm}$ 22140L with $\lambda_{bm}$=1550 nm with plurality of (N) frequency channels $\lambda_{bm1}$=1548 nm, $\lambda_{bm2}$=1549 nm, $\lambda_{bm3}$=1550 nm, $\lambda_{bm4}$=1551 nm, and $\lambda_{bm3}$=1552 nm centered at $\lambda_{bm}$=1550 nm.

Input Beam Coupler Structure (IBCS) Region

The input tapering waveguide core ITWCo 223000 is made of silicon. Its width at a location z1, ITWCo-z1 22300z1 is denoted with $w_{ITWCo-z1}$ 22300w-z1. This width is tapered from width at z1=0 $w_{ITWCo-z1=0}$ 22300w-z1=0 that has a value of $w_{ITWCo-z1=0}$=400 nanometers (nm) to a width at z1>0 $w_{ITWCo-z1>0}$ 22300w-z1>0 that is narrower than 400 nm in a linear fashion.

The thickness of the tapering waveguide core $d_{ITWCo-z1}$ 22300d-z1 made of silicon is $d_{ITWCo-z1}$=250 nm with a refractive index $n_{ITWCo-z1}$ 22300n-z that is $n_{ITWCo-z1}$=3.6. The total length of tapering waveguide $g_{ITWCo}$ 22300g is $g_{ITWCo}$=20 micrometers (μm). The width of the waveguide core at the end of the tapering at z1=$g_{ITWCo}$ is $w_{ITWCo-g}$ 22300w-g with $w_{ITWCo-g}$=50 nm.

Input supporting structure ISTR 21200 has width $w_{ISTR}$ 21200w with $w_{ISTR}$=50 nm and thickness $d_{ISTR}$ 21200d with $d_{ISTR}$=250 nm and length $g_{ISTR}$ 21200g with $g_{ISTR}$=20 micrometers. It has an effective layer averaged refractive index $n_{laISTR}$ 21200nla with $n_{laISTR}$<2.5.

Left cladding material ISTRLCd 21200L is air and has a refractive index $n_{ISTRLCd}$ 21200Ln given by $n_{ISTRLCd}$=1, and Right cladding material ISTRRCd 21200R is air and has a refractive index $n_{ISTRRCd}$ 21200Rn given by $n_{ISTRRCd}$=1. Its bottom cladding ISTRBCd 21200B is silicon dioxide (this is part of a Burried-Oxide BOX layer in a typical Silicon-On-Insulator SOI wafer) with averaged refractive index $n_{ISTRBCd}$ 21200Bn of $n_{ISTRBCd}$=1.45.

The top cladding ITWTCd-z1 22300T-z1 before going into the ALS region is silicon dioxide (SiO$_2$) has refractive index $n_{ITWTCd-z1}$ 22300Tn-z1 with $n_{ITWTCd-z1}$=1.45. The bottom cladding ITWBCd-z1 22300B-z1 before going into the ALS region is silicon dioxide (SiO$_2$) has refractive index $n_{ITWBCd-z1}$ 22300Bn-z1 with $n_{ITWBCd-z1}$=1.45.

The left cladding ITWLCd-z1 22300L-z1 before going into the ALS region is silicon dioxide (SiO$_2$) has refractive index $n_{ITWLCd-z1}$ 22300Ln-z1 with $n_{ITWLCd-z1}$=1.45.

The right cladding ITWRCd-z1 22300R-z1 before going into the ALS region is silicon dioxide (SiO$_2$) has refractive index $n_{ITWRCd-z1}$ 22300Rn-z1 with $n_{ITWRCd-z1}$=1.45. In this exemplary embodiment, $n_{ITWTCd-z1}=n_{ITWBCd-z1}=n_{ITWLCd-z1}=n_{ITWRCd-z1}=n_{ICWTCd}$, and $n_{ICWTCd}=n_{ICWBCd}=n_{ICWLCd}=n_{ICWRCd}$.m Input tapering waveguide core ITWCo 22300 starting at z1=z1ALS 22300z1ALS, where z1ALS=10 micrometers, is laid with an active layer structure ALS 22500. 0<z1ALS<$g_{ITWCo}$.

Active Layer Structure-Beam Transport into the Structure

The active layer structure ALS 22500 is shown by the Table 3-3 below:

TABLE 3-3

| ALS 22500 Layer Number | Layer Thickness | NPNN TCO CASE | Doping/ (1/cm$^3$) |
|---|---|---|---|
| BIM (21250) | 100 nm | In$_2$O$_3$ | |
| BSCOC 1 (21300) | 100 nm | InGaAsP 1.3 um (Bottom layer-just above the substrate) | N = 1 × 10$^{19}$ |
| BIDC 2 (21350LN) | 40 nm | InP | N = 1 × 10$^{19}$ |
| BVC 3 (21400) | 20 nm | InGaAsP 1.3 um | N = 1 × 10$^{19}$ |
| EC 4 (21500LN$_1$) | 10 nm | AlGaInAs 1.3 um | N$_1$ = 1 × 10$^{19}$ |
| EC 5 (21500MLI$_1$) | 4 nm barrier | AlGaInAs/1.19 um/−0.3% tensile strained | MI$_1$ = I |
| EC 6 (21500MLI$_2$) | 2 × 7 nm barrier inside | AlGaInAs/1.19 um/−0.3% tensile strained | MI$_2$ = I |
| EC 7 (21500MLI$_3$) | 3 × 11 nm Well (PL = 1500 nm) | AlGaInAs/1.55 um/0..31% compressive strained | MI$_3$ = I |
| EC 8 (21500MLI$_4$) | 4 nm barrier | AlGaInAs/1.19 um/−0.3% tensile strained | MI$_4$ = I |
| EC 9 (21500MLI$_5$) | 43 nm | AlGaInAs 1.3 um | MI$_5$ = I |
| EC 10 (21500LP$_1$) | 20 nm | AlGaInAs 1.3 um | P$_1$ = 1 × 10$^{18}$ |
| TVC 11 (21600P$_2$) | 25 nm | InGaAsP 1.3 um | P$_2$ = 0.7 × 10$^{19}$ |
| TVC 12 (21600N$_2$) | 20 nm | InGaAsP 1.3 um | N$_2$ = 4 × 10$^{19}$ |
| TIDC 13 (21650) | 20 nm | InP | N = 1 × 10$^{19}$ |
| TVSCOC 14 (21700) | 240 nm | In$_2$O$_3$ (Top layer) | N = 1 × 10$^{19}$ |
| Total | 580 nm | | |

In the table, the materials are unstrained (with InP as the substrate) if not specified as strained. The wavelength specified will be the material bandgap wavelength of the quaternary material involved (proper choice of the material composition is needed to achieve the required material bandgap and strain when grown on InP substrate).

Bottom Side Conduction and Ohmic Contact Layer

The active layer structure ALS 22500 has a bottom side conduction and Ohmic contact layer BSCOC 21300 that is InGaAsP layer given by layer 1 in Table 3-3 with thickness $d_{BSC}$ 21300d, where $d_{BSC}$=100 nm and width $w_{BSC}$ 21300w, where $w_{BSC}$ is approximately 54 micrometers along most of the length of the ALS. Its refractive index $n_{BSC}$ 21300n is $n_{BSC}$=3.4.

Bottom Interspaced Material Layer

The bottom interspaced material layer BIM 21250 is made of a Low-Refractive-Index Ohmic Transparent Conducting (LRI-OTC) material composed of Indium oxide ($In_2O_3$) with thickness $d_{BIM}$ 21250d equals to $d_{BIM}$=100 nm, width $w_{BIM}$ 21250w equals to $w_{BIM}$=54 micrometers, and average refractive index $n_{BIM}$ 21250n equals to $n_{BIM}$=1.7.

Bottom Metal Contact Pads

The first bottom left metal contact pad FBLM 21900L is a multi-layer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-3. The total thickness of the metal contact pad is $d_{FBLM}$ 21900Ld, with $d_{FBLM}$=1068 nm, and width $w_{FBLM}$ 21900Lw, where $w_{FBLM}$ is approximately 20 micrometers. The length of the metal contact pad $g_{FBLM}$ 21900Lg is approximately 500 micrometers.

The first bottom right metal contact pad FBRM 21900R is multilayer metal made up of (17 nm Au followed by 17 nm Ge followed by 17 nm Au followed by 17 nm Ni followed by 1000 nm Au) deposited on top of the top surface of n-doped layer 21300 given by layer 1 in Table 3-3. The total thickness of the metal contact pad is $d_{FBRM}$ 21900Rd, with $d_{FBRM}$=1068 nm, and width $w_{FBRM}$ 21900Rw, where $w_{FBRM}$ is approximately 20 micrometers. The length of the metal contact pad $g_{FBRM}$ 21900Rg is approximately 500 micrometers.

Bottom Metal Electrodes

On top of the first bottom left metal contact pad FBLM 21900L is deposited the first bottom left metal electrode FBLME 21120L which is gold of thickness of approximately 2 micrometer thick.

On top of the first bottom right metal contact pad FBRM 21900R is deposited the first bottom right metal electrode FBRME 21120R which is gold of thickness of approximately 2 micrometer thick.

Bottom Interspaced Dielectric Current Conduction Layer

Bottom interspaced dielectric current conduction layer BIDC 21350 is a n-doped InP given by layer 2 in Table 3-3 with thickness $d_{BIDC}$ 21350d equals to $d_{BIDC}$=40 nm, width $w_{BIDC}$ 21350w equals to $w_{BIDC}$=54 micrometers, and average refractive index $n_{BIDC}$ 21350n equals to about $n_{BIDC}$=3.0.

Bottom Vertical Current Conduction Layer

Bottom vertical current conduction layer BVC 21400 is n-doped InGaAsP given by layer 3 in Table 3-3 with thickness $d_{BVC}$ 21400d equals to $d_{BVC}$=20 nm, width $w_{BVC}$ 21400w equals to $w_{BVC}$=2 micrometers, and an averaged refractive index $n_{BVC}$ 21400n equals to $n_{BVC}$=3.4.

Electro-Active Layer

Electro-active layer EC 21500 is made up of layers 4, 5, 6, 7, 8, 9, 10 in Table 3-1 with an averaged refractive index of the entire layer given by $n_{EC}$ 21500n with $n_{EC}$ equals to approximately $n_{EC}$=3.4. Under an applied electric field, there will be a change in averaged refractive index $dn_{EC}$ 21500dn. The average refractive index becomes $n_{EC}$ (new)=$n_{EC}$+$dn_{EC}$.

The total thickness $d_{EC}$ 21500d of this Electro-active layer is $d_{EC}$=160 nm. Its width $w_{EC}$ 21500w is equal to $w_{EC}$=2 micrometers.

The electro-active layer has a PqN junction at layer 4 to 10 for which layer 4 is layer 21500LN$_1$ that is N-doped with a dopant density of 21500N$_1$=$1\times10^{19}$/$cm^3$ and layer 10 is layer 21500LP$_1$ that is P-doped with a dopant density of 21500P$_1$=$1\times10^{18}$/$cm^3$ The intermediate layers 21500MLI$_m$ are all I-doped or intrinsic semiconductor.

The applied field $E_{EC}$ 21500E (which may cause a current $C_{EC}$ 21500C to flow) is across the entire electro-active layer with a positive voltage applied to the top and negative voltage applied to the bottom of this entire electro-active layer known to those skilled in the art as forward bias (with respect to the PN junction in the electro-active layer) of voltage $V_F$ 21500VF so the applied electro-active $V_{EC}$ 21500VEC is $V_F$.

The voltage applied to the electrodes of the Optical Amplifier $V_{MOD}$ 20000V is approximately given by $V_{EC}$.

Top Vertical Current Conduction Layer

Top vertical current conduction layer TVC 21600 is given by layer 11 and 12 in Table 3-3 made up of InGaAsP layer that is composed of 25 nm-thick layer 21600LP$_2$ that is P-doped with dopant density 21600P$_2$=$0.7\times10^{18}$/$cm^3$, followed by 20 nm-thick N-doped InGaAsP layer 21600LN$_2$ with dopant density 21600N$_2$=$4\times10^{19}$/$cm^3$. The total thickness for TVC 21600 is $d_{TVC}$ 21600d with $d_{TVC}$=45 nm. Its width is $W_{TVC}$ 21600w equals to $W_{TVC}$=2 micrometers, and its averaged refractive index is $n_{TVC}$ 21600n equals to $n_{TVC}$=3.4. This $N_2P_2$ junction forms a Tunnel PN Junction. It forms a PN-changing PN junction (called PNCPN junction) 21600PNCPN.

Top Interspaced Dielectric Current Conduction Layer

Top interspaced dielectric conduction layer TIDC 21650 is N-doped InP layer given by layer 13 in Table 3-3 with thickness $d_{TIDC}$ 21650d equals to $d_{TIDC}$=20 nm, width $w_{TIDC}$ 21650w equals to $w_{TIDC}$=2 micrometers, and averaged refractive index $n_{TIDC}$ 21650n equals to $n_{TIDC}$=3.0.

Top Vertical/Side Conduction and Ohmic Contact Layer

Top vertical/side conduction and Ohmic contact layer TVSCOC 21700 is made up of Low-Refractive-Index Ohmic Transparent Conductor (LRI-OTC) ($In_2O_3$) given by layer 14 in Table 3-3 with thickness $d_{TVSC}$ 21700d equals to $d_{TVSC}$=240 nm, width $w_{TVSC}$ 21700w equals to $w_{TVSC}$=2 micrometers, and an averaged refractive index $n_{TVSC}$ 21700n equals to $n_{TVSC}$=1.7.

Top Metal Contact Pads

The first top middle metal contact pad FTMM 21800M is multilayer metal made up of (17 nm Au followed by 17 nm Ge followed by 17 nm Au followed by 17 nm Ni followed by 1000 nm Au) deposited on top of the top surface of n-doped layer 21700 given by layer 14 in Table 3-3. The total thickness of the metal contact pad is $d_{FTMM}$ 21800Md, with $d_{FTMM}$=1068 nm, and width $w_{FTMM}$ 21800Mw, where $w_{FTMM}$ is approximately 2 micrometers. The length of the metal contact pad $g_{FTMM}$ 21800Mg is approximately 500 micrometers.

There is no top left or right metal contact pad FTLM 21800L or FTRM 21800R.

Top Metal Electrodes.

On top of the first top middle metal contact pad FTMM 21800M is deposited the first top middle metal electrode FTMME 21130M which is gold of thickness of approximately 2 micrometer thick.

Beam Transport to Electro-Active Waveguiding Core Structure

Input tapering waveguide region between z1=z1ALS 22300z1ALS and z1=$g_{ITWCo}$ 22300g, Tapering waveguide core width $w_{ITWCo\text{-}z1}$ 22300w varies down to a smaller value of $w_{ITWCo\text{-}g}$=50 nm at z1=$g_{ITWCo}$ 22300g from its vale at z1=z1ALS 22300z1ALS. Clearly $W_{ITWCo\text{-}g} \ll \lambda_{bm}/(2*n_{ITWCo})$, with $\lambda_{bm}$=1550 nm and $n_{ITWCo}$=3.6, where * is number multiplication.

Output Connecting Waveguide

Output connecting waveguide core OCWCo 28200 has averaged Refractive Index $n_{OCWCo}=n_{aOCWCo}=3.6$, thickness $d_{OCWCo}$ 28200$d$ is $d_{OCWCo}=250$ nm, and width $W_{OCWCo}$ 28200$w$ is $W_{OCWCo}=400$ nm.

Output connecting waveguide OCWG 28200WG has Output connecting-waveguide bottom cladding material OCWBCd 28200B that is silicon dioxide ($SiO_2$) for which the refractive index $n_{OCWBCd}$ 28200Bn is $n_{OCWBCd}=1.45$.

Output connecting waveguide top cladding material OCWTCd 28200T is silicon dioxide foe which the refractive index $n_{OCWTCd}$ 28200Tn is $n_{OCWTCd}=1.45$.

Output connecting waveguide left cladding material OCWLCd 28200L is silicon dioxide for which the refractive index $n_{OCWLCd}$ 28200Ln is $n_{OCWLCd}=1.45$.

Output connecting waveguide right cladding material OCWRCd 28200R is silicon dioxide for which the refractive index $n_{OCWRCd}$ 28200Rn is $n_{OCWRCd}=1.45$.

The resulted averaged cladding refractive Index $n_{aOCWCd}$ 28200$a$Cdn is $n_{aOCWCd}=1.45$.

Output optical beam OBM 28140

Output Beam Coupler Structure (OBCS) Region

Output tapering waveguide core OTWCo 28300 is made of silicon. Its width at a location $z2$ OTWCo-$z2$ is denoted as width $w_{OTWCo-z2}$ 28300$w$-$z2$. This width is tapered from width at $z2=0$ $w_{OTWCo-z2=0}$ 28300$w$-$z2=0$ that has a value of $w_{OTWCo-z2=0}=400$ nm to a width at $z2>0$ $w_{OTWCo-z2>0}$ 28300$w$-$z2>0$ that is narrower than 400 nm in a linear fashion. The thickness of the tapering waveguide core $d_{OTWCo-z2}$ 28300$d$-$z2$ made of silicon is $d_{OTWCo-z2}=250$ nm with a refractive index $n_{OTWCo-z2}$ 28300$n$-$z2$ that is $n_{OTWCo-z2}=3.6$.

The total length of tapering waveguide $g_{OTWCo}$ 28300$g$ is $g_{OTWCo}=20$ micrometers (μm). The width of the waveguide core at the end of the tapering at $z2=g_{OTWCo}$ is $w_{OTWCo-g}$ 28300$w$-$g$ with $w_{OTWCo-g}=50$ nm.

Output supporting structure OSTR 29200 has width $w_{OSTR}$ 29200$w$ with $w_{OSTR}=50$ nm and thickness $d_{OSTR}$ 29200$d$ with $d_{OSTR}=250$ nm and length $g_{OSTR}$ 29200$g$ with $g_{OSTR}=20$ micrometers. It has an effective layer averaged refractive index $n_{laOSTR}$ 29200$nla$ with $n_{laOSTR}<2.5$.

The top cladding OTWTCd-$z2$ 28300T-$z2$ is silicon dioxide ($SiO_2$) has refractive index $n_{OTWTCd-z2}$ 28300Tn-$z2$ with $n_{OTWTCd-z2}=1.45$ before going into the ALS region.

The bottom cladding OTWBCd-$z2$ 28300B-$z2$ is silicon dioxide ($SiO_2$) has refractive index $n_{OTWBCd-z2}$ 28300Bn-$z2$ with $n_{OTWBCd-z2}=1.45$.

The left cladding OTWLCd-$z2$ 28300L-$z2$ is silicon dioxide ($SiO_2$) has refractive index $n_{OTWLCd-z2}$ 28300Ln-$z2$ with $n_{OTWLCd-z2}=1.45$.

The right cladding OTWRCd-$z2$ 28300R-$z2$ is silicon dioxide ($SiO_2$) has refractive index $n_{OTWRCd-z2}$ 28300Rn-$z2$ with $n_{OTWRCd-z2}=1.45$.

In this exemplary embodiment, $n_{OTWTCd-z2}=n_{OTWBCd-z2}=n_{OTWLCd-z2}=n_{OTWRCd-z2}=n_{OCWTCd}$, and $n_{OCWTCd}=n_{OCWBCd}=n_{OCWLCd}=n_{OCWRCd}$.

Output tapering waveguide core OTWCo 28300 starting at $z2=z2ALS$ 28300$z2ALS$, is laid with an active layer structure ALS 22500. $0<z2ALS<g_{OTWCo}$.

Most of the output optical beam energy of beam OBM 28140 is transported to output tapering waveguide core OTWCo 28300 from the electro-active waveguiding core structure EWCoS 22600, through the output tapering waveguide region between $z2=z2ALS$ 28300$z2ALS$ and $z2=g_{OTWCo}$ 28300$g$, where the output tapering waveguide core width $w_{OTWCo-z2}$ 28300$w$-$z2$ varies down to a smaller value of $w_{OTWCo-g}$ at $z2=g_{ITWCo}$ 28300$g$ from its vale at $z2=z2ALS$, 28300$z2ALS$. The tapering waveguide core width is reduced to well below half the optical wavelength in the waveguide core given by $\lambda_{bm}/(2\times n_{OTWCo})$ so that $w_{OTWCo-g}\ll\lambda_{bm}/(2\times n_{OTWCo})$. After the energy transported from the electro-active waveguiding core structure EWCoS 22600 that contains the electro-active layer EC 21500 down to the output taper at $z2=0$ where the taper core width is $w_{OTWCo-z2=0}$ 28300$w0$ and $w_{OTWCo-z2=0}=w_{OCWCo}$ 28200, the optical beam is denoted as output optical beam or beam OBM 28140.

Length of Active Layer Structure

The length of the active layer structure $SL_{mod}$ 22550 is approximately 500 micrometers.

High Refractive Index Contrast and Mode Overlapping

For the bottom cladding:
Waveguide core refractive index is $n_{co}=3.6$
Waveguide bottom cladding is $n_{BCd}=1.45$ (given by layer ISTRBC with $n_{ISTRBCd}=1.45$)
Waveguide core-to-cladding refractive index difference square to be $n_{rd}^2=(n_{co}^2-n_{BCd}^2)=10.86$.
Refractive index contrast ratio to be: $R_{cts}=n_{rd}^2/(n_{co}^2+n_{BCd}^2)=0.7$, which is in the very-strongly guiding regime.

For the top cladding:
Waveguide core refractive index is $n_{co}=3.6$
Waveguide bottom cladding is $n_{TCd}=1.7$ (given by TVSCOC layer which is $In_2O_3$ with $n_{TVSCOC}=1.7$)
Waveguide core-to-cladding refractive index difference square to be $n_{rd}^2=(n_{co}^2-n_{TCd}^2)=10$.
Refractive index contrast ratio to be: $R_{cts}=n_{rd}^2/(n_{co}^2+n_{TCd}^2)=0.64$, which is in the very-strongly guiding regime.

A Fourth Exemplary Device of All-Optical Switch
(Modified from Side Conduction Geometry)

A preferred embodiment of an exemplary device is All-Optical Switch Device 20000 with the following specifications referred to as a fourth exemplary device of All-Optical Switch (modified from side-conduction geometry):

Substrate SUB 21100 is silicon wafer substrate with a thickness of about 0.3 mm. Input connecting waveguide core ICWCo 22200 is made of silicon for which its averaged material refractive index $n_{ICWCo}$ 22200$n$ is around $n_{ICWCo}=3.6$, thickness $d_{ICWCo}$ 22200$d$ is $d_{ICWCo}=250$ nm, and width $w_{ICWCo}$ 22200$w$ is $W_{ICWCo}=400$ nm.

Input connecting-waveguide bottom cladding material ICWBCd 22200B is silicon dioxide ($SiO_2$), for which its refractive Index $n_{ICWBCd}$ 22200Bn is $n_{ICWBCd}=1.45$.

Input connecting waveguide top cladding material ICWTCd 22200T is silicon dioxide ($SiO_2$) for which its refractive Index $n_{ICWTCd}$ 22200Tn is 1.45.

Input connecting waveguide left cladding material ICWLCd 22200L is silicon dioxide ($SiO_2$), for which its refractive Index $n_{ICWLCd}$ 22200Ln is 1.45

Input connecting waveguide right cladding material ICWRCd 22200R is silicon dioxide ($SiO_2$), for which its refractive Index $n_{ICWRCd}$ 22200Rn is 1.45

The above form an input connecting waveguide ICWG 22200WG. The core-cladding refractive-index difference $n_{Rd}$ defined by $n_{Rd}^2=(n_{Co}^2-n_{Cd}^2)$ for waveguide ICWG 22200WG is $n_{Rd}^2=(3.6^2-1.45^2)=10.86$ with $n_{Co}=3.6$ and $n_{Cd}=1.45$. Its averaged Cladding Refractive Index is given by $n_{aICWCd}=(n_{ICWBCd}^2\times A_{ICWBCd}+n_{ICWTCd}^2\times A_{ICWTCd}+n_{ICWRCd}^2 A_{ICWRCd}+n_{ICWLCd}^2 A_{ICWLCd})/(A_{ICWBCd}+A_{ICWTCd}+A_{ICWRCd}+A_{ICWLCd})^{0.5}=1.45$. Its averaged Core Refractive Index is given by $n_{aCo}=(n_{Co1}^2\times A_{Co1}+n_{Co2}^2\times A_{Co2}+n_{Co3}^2 A_{Co3}+\ldots+n_{Com}^2 A_{Com})/(A_{Co1}+A_{Co2}+A_{Co3}+\ldots+A_{Com})^{0.5}=3.6$.

The input optical beam IBM 22140 has propagating refractive index $n_{IBM}$ 22140n, for which $n_{IBM}$ is approximately 2.8 with optical power $P_{bm}$ 22140P approximately 1 mW, electric field polarization $E_{bm}$ 22140E to be in the horizontal direction parallel to the substrate surface. It has a beam effective area $A_{bm}$ 22140A of $A_{bm}$=0.04 μm² and an optical wavelength centered at $\lambda_{bm}$ 22140L with $\lambda_{bm}$=1550 nm with plurality of (N) frequency channels $\lambda_{bm1}$=1548 nm, $\lambda_{bm2}$=1549 nm, $\lambda_{bm3}$=1550 nm, $\lambda_{bm4}$=1551 nm, and $\lambda_{bm3}$=1552 nm centered at $\lambda_{bm}$=1550 nm.

Input Beam Coupler Structure (IBCS) Region

The input tapering waveguide core ITWCo 223000 is made of silicon. Its width at a location z1, ITWCo-z1 22300z1 is denoted as width $w_{ITWCo-z1}$ 22300w-z1. This width is tapered from width at z1=0 $w_{ITWCo-z1}$=0 22300w-z1=0 that has a value of $w_{ITWCo-z1=0}$=400 nanometers (nm) to a width at z1>0 $w_{ITWCo-z1>0}$ 22300w-z1>0 that is narrower than 400 nm in a linear fashion.

The thickness of the tapering waveguide core $d_{ITWCo-z1}$ 22300d-z1 made of silicon is $d_{ITWCo-z1}$=250 nm with a refractive index ITWCo-z1 22300n-z that is $n_{ITWCo-z1}$=3.6. The total length of tapering waveguide $g_{ITWCo}$ 22300g is $g_{ITWCo}$=20 micrometers (μm). The width of the waveguide core at the end of the tapering at z1=$g_{ITWCo}$ is $w_{ITWCo-g}$ 22300w-g with $w_{ITWCo-g}$=50 nm.

Input supporting structure ISTR 21200 has width $w_{ISTR}$ 21200w with $w_{ISTR}$=50 nm and thickness $d_{ISTR}$ 21200d with $d_{ISTR}$=250 nm and length $g_{ISTR}$ 21200g with $g_{ISTR}$=20 micrometers. It has an effective layer averaged refractive index $n_{laISTR}$ 21200nla with $n_{laISTR}$<2.5.

Left cladding material ISTRLCd 21200L is air and has a refractive index $n_{ISTRLCd}$ 21200Ln given by $n_{ISTRLCd}$=1, and Right cladding material ISTRRCd 21200R is air and has a refractive index $n_{ISTRRCd}$ 21200Rn given by $n_{ISTRRCd}$=1. Its bottom cladding ISTRBCd 21200B is silicon dioxide (this is part of a Buried-Oxide BOX layer in a typical Silicon-On-Insulator SOI wafer) with averaged refractive index $n_{ISTRBCd}$ 21200Bn of $n_{ISTRBCd}$=1.45.

The top cladding ITWTCd-z1 22300T-z1 before going into the ALS region is silicon dioxide (SiO₂) has refractive index $n_{ITWTCd-z1}$ 22300Tn-z1 with $n_{ITWTCd-z1}$=1.45.

The bottom cladding ITWBCd-z1 22300B-z1 before going into the ALS region is silicon dioxide (SiO₂) has refractive index $n_{ITWBCd-z1}$ 22300Bn-z1 with $n_{ITWBCd-z1}$=1.45.

The left cladding ITWLCd-z1 22300L-z1 before going into the ALS region is silicon dioxide (SiO₂) has refractive index $n_{ITWLCd-z1}$ 22300Ln-z1 with $n_{ITWLCd-z1}$=1.45.

The right cladding ITWRCd-z1 22300R-z1 before going into the ALS region is silicon dioxide (SiO₂) has refractive index $n_{ITWRCd-z1}$ 22300Rn-z1 with $n_{ITWRCd-z1}$=1.45.

In this exemplary embodiment, $n_{ITWRCd-z1}$=$n_{ITWBCd-z1}$=$n_{ITWLCd-z1}$=$n_{ITWRCd-z1}$=$n_{ICWTCd}$, and $n_{ICWTCd}$=$n_{ICWBCd}$=$n_{ICWLCd}$=$n_{ICWRCd}$. Input tapering waveguide core ITWCo 22300 starting at z1=z1ALS 22300z1ALS, where z1ALS=10 micrometers, is laid with an active layer structure ALS 22500. 0<z1ALS<$g_{ITWCo}$.

Active Layer Structure-Beam Transport into the Structure

The active layer structure ALS 22500 is shown by the Table 3-4 below:

TABLE 3-4

| ALS 22500 Layer Number | Layer Thickness | NPNN TCO CASE | Doping/ (1/cm³) |
|---|---|---|---|
| BIM (21250) | 100 nm | In₂O₃ | |
| BSCOC 1 (21300) | 100 nm | InGaAsP 1.3 um (Bottom layer-just above the substrate) | I |
| BIDC 2 (21350LI) | 40 nm | InP | I |
| BVC 3 (21400) | 20 nm | InGaAsP 1.3 um | I |
| EC 4 (21500LI₁) | 10 nm | AlGaInAs 1.3 um | I₁ = I |
| EC 5 (21500MLI₁) | 4 nm barrier | AlGaInAs/1.19 um/−0.3% tensile strained | MI₁ = I |
| EC 6 (21500MLI₂) | 2 × 7 nm barrier inside | AlGaInAs/1.19 um/−0.3% tensile strained | MI₂ = I |
| EC 7 (21500MLI₃) | 3 × 11 nm Well (PL = 1500 nm) | AlGaInAs/1.55 um/0.31% compressive strained | MI₃ = I |
| EC 8 (21500MLI₄) | 4 nm barrier | AlGaInAs/1.19 um/−0.3% tensile strained | MI₄ = I |
| EC 9 (21500MLI₅) | 43 nm | AlGaInAs 1.3 um | MI₅ = I |
| EC 10 (21500LI₂) | 20 nm | AlGaInAs 1.3 um | I₂ = I |
| TVC 11 (21600I₁) | 25 nm | InGaAsP 1.3 um | I₁ = I |
| TVC 12 (21600I₂) | 20 nm | InGaAsP 1.3 um | I₂ = I |
| TIDC 13 (21650) | 20 nm | InP | I |
| TVSCOC 14 (21700) | 40 nm | InGaAsP (Top layer) | I |
| Total | 380 nm | | |

In the table, the materials are unstrained (with InP as the substrate) if not specified as strained. The wavelength specified will be the material bandgap wavelength of the quaternary material involved (proper choice of the material composition is needed to achieve the required material bandgap and strain when grown on InP substrate).

Bottom Side Conduction and Ohmic Contact Layer

The active layer structure ALS 22500 has a bottom side conduction and Ohmic contact layer BSCOC 21300 that is InGaAsP layer given by layer 1 in Table 3-4 with thickness $d_{BSC}$ 21300d, where $d_{BSC}$=100 nm and width $w_{BSC}$ 21300w, where $w_{BSC}$ is approximately 54 micrometers along most of the length of the ALS. Its refractive index $n_{BSC}$ 21300n is $n_{BSC}$=3.4.

Bottom Interspaced Material Layer

The bottom interspaced material layer BIM 21250 is made of a Low-Refractive-Index Ohmic Transparent Conducting (LRI-OTC) material composed of Indium oxide (In₂O₃) with thickness $d_{BIM}$ 21250d equals to $d_{BIM}$=100 nm, width $w_{BIM}$ 21250w equals to $w_{BIM}$=54 micrometers, and average refractive index $n_{BIM}$ 21250n equals to $n_{BIM}$=1.7.

Bottom Metal Contact Pads

There is no metal contact pad such as metal contact pad FBLM 21900L/R

Bottom Metal Electrodes

There is no bottom metal electrode such as metal electrode FBLME 21120L/R

Bottom Interspaced Dielectric Current Conduction Layer

Bottom interspaced dielectric current conduction layer BIDC 21350 is a I-doped (undoped) InP given by layer 2 in Table 3-4 with thickness $d_{BIDC}$ 21350d equals to $d_{BIDC}$=40 nm, width $w_{BIDC}$ 21350w equals to $w_{BIDC}$=54 micrometers, and average refractive index $n_{BIDC}$ 21350n equals to about $n_{BIDC}$=3.0.

Bottom Vertical Current Conduction Layer

Bottom vertical current conduction layer BVC 21400 is I-doped (undoped) InGaAsP given by layer 3 in Table 3-4 with thickness $d_{BVC}$ 21400$d$ equals to $d_{BVC}$=20 nm, width $w_{BVC}$ 21400$w$ equals to $w_{BVC}$=2 micrometers, and an averaged refractive index $n_{BVC}$ 21400$n$ equals to $n_{BVC}$=3.4.

Electro-Active Layer

Electro-active layer EC 21500 is made up of layers 4, 5, 6, 7, 8, 9, 10 in Table 3-4 with an averaged refractive index of the entire layer given by $n_{EC}$ 21500$n$ with $n_{EC}$ equals to approximately $n_{EC}$=3.4. Under an applied electric field, there will be a change in averaged refractive index $dn_{EC}$ 21500$dn$. The average refractive index becomes $n_{EC}$ (new)=$n_{EC}$+$dn_{EC}$.

The total thickness $d_{EC}$ 21500$d$ of this Electro-active layer is $d_{EC}$=114.5 nm. Its width $w_{EC}$ 21500$w$ is equal to $w_{EC}$=2 micrometers.

The electro-active layer has a PqN junction at layer 4 to 10 for which layer 4 is layer 21500$LI_1$ that is I-doped (undoped) and layer 10 is layer 21500$LI_2$ that is I-doped (undoped).

The intermediate layers 21500$MLI_m$ are all I-doped or intrinsic semiconductor.

The applied field $E_{EC}$ 21500E (which may cause a current $C_{EC}$ 21500C to flow) is across the entire electro-active layer with a negative voltage applied to the top and positive voltage applied to the bottom of this entire electro-active layer known to those skilled in the art as reverse bias (with respect to the PN junction in the electro-active layer) of voltage $V_R$ 21500VR so the applied electro-active $V_{EC}$ 21500VEC is $V_R$.

The voltage applied to the electrodes of the Photodetector $V_{MOD}$ 20000V is approximately given by $V_{EC}$.

Top Vertical Current Conduction Layer

Top vertical current conduction layer TVC 21600 is given by layer 11 and 12 in Table 3-4 made up of InGaAsP layer that is composed of 25 nm-thick layer 21600$LI_1$ that is I-doped (undoped), followed by 20 nm-thick I-doped (undoped) InGaAsP layer 21600$LI_2$. The total thickness for TVC 21600 is $d_{TVC}$ 21600$d$ with $d_{TVC}$=45 nm. Its width is $W_{TVC}$ 21600$w$ equals to $W_{TVC}$=2 micrometers, and its averaged refractive index is $n_{TVC}$ 21600$n$ equals to $n_{TVC}$=3.4. This $N_2P_2$ junction forms a forward-Biased PN Junction (or Tunnel PN Junction). It forms a PN-changing PN junction (called PNCPN junction) 21600PNCPN.

Top Interspaced Dielectric Current Conduction Layer

Top interspaced dielectric conduction layer TIDC 21650 is I-doped (undoped) InP layer given by layer 13 in Table 34 with thickness $d_{TIDC}$ 21650$d$ equals to $d_{TIDC}$=20 nm, width $w_{TIDC}$ 21650$w$ equals to $w_{TIDC}$=8 micrometers, and averaged refractive index $n_{TIDC}$ 21650$n$ equals to $n_{TIDC}$=3.0.

Top Vertical/Side Conduction and Ohmic Contact Layer

Top vertical/side conduction and Ohmic contact layer TVSCOC 21700 is made up of InGaAsP given by layer 14 in Table 3-4 with thickness $d_{TVSC}$ 21700$d$ equals to $d_{TVSC}$=40 nm, width $w_{TVSC}$ 21700$w$ equals to $w_{TVSC}$=8 micrometers, and an averaged refractive index $n_{TVSC}$ 21700$n$ equals to $n_{TVSC}$=3.4.

Top Metal Contact Pads

There is no top metal contact pad such metal contact pad FTLM 21800L/R

There is no top middle metal contact pad FTMM 21800M.

Top Metal Electrodes.

There is no top metal electrode such as metal electrode FTLME 21130L/R.

Beam Transport to Electro-Active Waveguiding Core Structure

Input tapering waveguide region between z1=z1ALS 22300z1ALS and z1=$g_{ITWCo}$ 22300$g$, Tapering waveguide core width $w_{ITWCo-z}$ 22300$w$ varies down to a smaller value of $w_{ITWCo-g}$=50 nm at z1=$g_{ITWCo}$ 22300$g$ from its vale at z1=z1 ALS 22300z1ALS.

Clearly $w_{ITWCo-g} \ll \lambda_{bm}/(2*n_{ITWCo})$, with $\lambda_{bm}$=1550 nm and $n_{ITWCo}$=3.6, where * is number multiplication.

Output Connecting Waveguide

Output connecting waveguide core OCWCo 28200 has averaged Refractive Index $n_{OCWCo}$=$n_{aOCWCo}$=3.6, thickness $d_{OCWCo}$ 28200$d$ is $d_{OCWCo}$=250 nm, and width $W_{OCWCo}$ 28200$w$ is $W_{OCWCo}$=400 nm.

Output connecting waveguide OCWG 28200WG has Output connecting-waveguide bottom cladding material OCWBCd 28200B that is silicon dioxide ($SiO_2$) for which the refractive index $n_{OCWBCd}$ 28200Bn is $n_{OCWBCd}$=1.45.

Output connecting waveguide top cladding material OCWTCd 28200T is silicon dioxide foe which the refractive index $n_{OCWTCd}$ 28200Tn is $n_{OCWTCd}$=1.45.

Output connecting waveguide left cladding material OCWLCd 28200L is silicon dioxide for which the refractive index $n_{OCWLCd}$ 28200Ln is $n_{OCWLCd}$=1.45.

Output connecting waveguide right cladding material OCWRCd 28200R is silicon dioxide for which the refractive index $n_{OCWRCd}$ 28200Rn is $n_{OCWRCd}$=1.45.

The resulted averaged cladding refractive Index $n_{aOCWCd}$ 28200$a$Cdn is $n_{aOCWCd}$=1.45.

Output optical beam OBM 28140

Output Beam Coupler Structure (OBCS) Region

Output tapering waveguide core OTWCo 28300 is made of silicon. Its width at a location z2 OTWCo-z2 is denoted as width $w_{OTWCo-z2}$ 28300$w$-z2. This width is tapered from width at z2=0 $w_{OTWCo-z2}$=0 28300$w$-z2=0 that has a value of $w_{OTWCo-z2}$=0=400 nm to a width at z2>0 $w_{OTWCo-z2>0}$ 28300$w$-z2>0 that is narrower than 400 nm in a linear fashion. The thickness of the tapering waveguide core $d_{OTWCo-z2}$ 28300$d$-z2 made of silicon is $d_{OTWCo-z2}$=250 nm with a refractive index $n_{OTWCo-z2}$ 28300$n$-z2 that is $n_{OTWCo-z2}$=3.6.

The total length of tapering waveguide $g_{OTWCo}$ 28300$g$ is $g_{OTWCo}$=20 micrometers (μm). The width of the waveguide core at the end of the tapering at z2=$g_{OTWCo}$ is $w_{OTWCo-g}$ 28300$w$-g with $w_{OTWCo-g}$=50 nm.

Output supporting structure OSTR 29200 has width $w_{OSTR}$ 29200$w$ with $w_{OSTR}$=50 nm and thickness $d_{OSTR}$ 29200$d$ with $d_{OSTR}$=250 nm and length $g_{OSTR}$ 29200$g$ with $g_{OSTR}$=20 micrometers. It has an effective layer averaged refractive index $n_{laOSTR}$ 29200$n$/a with $n_{laOSTR}$<2.5.

The top cladding OTWTCd-z2 28300T-z2 is silicon dioxide ($SiO_2$) has refractive index $n_{OTWTCd-z2}$ 28300Tn-z2 with $n_{OTWTCd-z2}$=1.45 before going into the ALS region.

The bottom cladding OTWBCd-z2 28300B-z2 is silicon dioxide ($SiO_2$) has refractive index $n_{OTWBCd-z2}$ 28300Bn-z2 with $n_{OTWBCd-z2}$=1.45.

The left cladding OTWLCd-z2 28300L-z2 is silicon dioxide ($SiO_2$) has refractive index $n_{OTWLCd-z2}$ 28300Ln-z2 with $n_{OTWLCd-z2}$=1.45.

The right cladding OTWRCd-z2 28300R-z2 is silicon dioxide ($SiO_2$) has refractive index $n_{OTWRCd-z2}$ 28300Rn-z2 with $n_{OTWRCd-z2}$=1.45.

In this exemplary embodiment, $n_{OTWTCd-z2}$=$n_{OTWBCd-z2}$=$n_{OTWLCd-z2}$=$n_{OTWRCd-z2}$=$n_{OCWTCd}$, and $n_{OCWTCd}$=$n_{OCWBCd}$=$n_{OCWLCd}$=$n_{OCWRCd}$ Output tapering waveguide core OTWCo 28300 starting at z2=z2ALS 28300z2ALS, is laid with an active layer structure ALS 22500. 0<z2ALS<$g_{OTWCo}$.

Most of the output optical beam energy of beam OBM 28140 is transported to output tapering waveguide core OTWCo 28300 from the electro-active waveguiding core structure EWCoS 22600, through the output tapering waveguide region between z2=z2ALS 28300z2ALS and z2=$g_{OTWCo}$ 28300g, where the output tapering waveguide core width $w_{OTWCo\text{-}z2}$ 28300w-z2 varies down to a smaller value of $w_{OTWCo\text{-}g}$ at z2=$g_{ITWCo}$ 28300g from its vale at z2=z2ALS, 28300z2ALS. The tapering waveguide core width is reduced to well below half the optical wavelength in the waveguide core given by $\lambda_{bm}/(2 \times n_{OTWCo})$ so that $w_{OTWCo\text{-}g} \ll \lambda_{bm}/(2 \times n_{OTWCo})$. After the energy transported from the electro-active waveguiding core structure EWCoS 22600 that contains the electro-active layer EC 21500 down to the output taper at z2=0 where the taper core width is $w_{OTWCo\text{-}z2=0}$ 28300w0 and $w_{OTWCo\text{-}z2=0}=w_{OCWCo}$ 28200, the optical beam is denoted as output optical beam or beam OBM 28140.

Length of Active Layer Structure

The length of the active layer structure $SL_{mod}$ 22550 is approximately 500 micrometers.

High Refractive Index Contrast and Mode Overlapping

For the bottom cladding:

Waveguide core refractive index is $n_{co}$=3.6

Waveguide bottom cladding is $n_{BCd}$=1.45 (given by layer ISTRBC with $n_{ISTRBCd}$=1.45)

Waveguide core-to-cladding refractive index difference square to be $n_{rd}^2=(n_{co}^2-n_{BCd}^2)$=10.86.

Refractive index contrast ratio to be: $R_{cts}=n_{rd}^2/(n_{co}^2+n_{BCd}^2)$=0.7, which is in the very-strongly guiding regime.

For the top cladding:

Waveguide core refractive index is $n_{co}$=3.6

Waveguide bottom cladding is $n_{TCd}$=1 (given by material above TVSCOC layer which is air with n=1)

Waveguide core-to-cladding refractive index difference square to be $n_{rd}^2=(n_{co}^2-n_{TCd}^2)$=11.96.

Refractive index contrast ratio to be: $R_{cts}=n_{rd}^2/(n_{co}^2+n_{TCd}^2)$=0.86, which is in the very-strongly guiding regime.

Final Summary

The main parts of the embodiments can be summarized as follows:

1. An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

2. An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

The electro-active layer has a low-refractive-index Ohmic transparent conductor (LRI-OTC) layer electrically connected from the top to the electro-active layer. The LRI-OTC forms part of the top electro-active waveguide cladding.

3. An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin region or very-thin such that $d_{CORE}<(\lambda_{op}/n_{Co})$.

4. An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in an very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.5, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin or very-thin region such that $d_{CORE}<(\lambda_{op}/n_{Co})$.

(PqN case)

5. An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

A voltage is applied across the first P-layer of this first PN junction, and the first N-layer of the first PN junction to result in an applied electric field, an electric current, or either injection or depletion of carriers in the electro-active layer.

6. (PqN case plus Tunnel) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

7. (NqN case) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first NqN junction in which a first N-layer with N-dopant is vertically connected (vertical means in a direction perpendicular to the substrate plane; horizontal means in a direction parallel to the substrate plane) to a first q-layer with either N or P dopant or that is undoped (i.e. being an Intrinsic semiconductor material) and the first q-layer is further connected to a second N-layer with N-dopant.

A voltage is applied across the first N-layer and the second N-layer of this first NqN junction to result in an applied electric field, an electric current, or either injection or depletion of carriers in the electro-active layer.

8. (PqN case plus Tunnel plus TCO) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

The electro-active layer has a low-refractive-index Ohmic transparent conductor (LRI-OTC) layer electrically connected from the top to the electro-active layer. The LRI-OTC forms part of the top electro-active waveguide cladding.

9. (PqN case plus Tunnel plus taper WG) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2 \times n_{ITWCo-z1})$ to a value smaller than half the wavelength in the material $\lambda_{op}/(2 \times n_{ITWCo-z1})$, so that $w_{ITWCo-z1} < \lambda_{op}/(2 \times n\ n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

10. (PqN case plus Tunnel plus taper WG plus QW) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2 \times n_{ITWCo-z1})$ to a value smaller than half the wavelength in the material $\lambda_{op}/(2 \times n\ n_{ITWCo-z1})$, so that $w_{ITWCo-z1} < \lambda_{op}/(2 \times n\ n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

11. (PqN case plus Tunnel plus taper WG plus doped QW) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2\times n_{ITWCo-z1})$ to a value smaller than half the wavelength in the material $\lambda_{op}/(2\times n\ n_{ITWCo-z1})$, so that $w_{ITWCo-z1}<\lambda_{op}/(2\times n\ n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

At least one of the first P-layer, first N-layer, or the first q-layer contains at least one quantum well. The doping density at the quantum well is in the highly-doped, medium-highly-doped, very-highly-doped, or ultra-highly-doped regime with a dopant density higher than about $2\times 10^{17}/cm^3$ with either N doping or P doping.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

12. (PqN case plus Tunnel plus taper WG plus very highly doped QW) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2\times n_{ITWCo-z1})$ to a value smaller than half the wavelength in the material $\lambda_{op}/(2\times n\ n_{ITWCo-z1})$, so that $w_{ITWCo-z1}<\lambda_{op}/(2\times n\ n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

At least one of the first P-layer, first N-layer, or the first q-layer contains at least one quantum well. The doping density at the quantum well is in the medium-highly-doped, very-highly-doped, or ultra-highly-doped regime with a dopant density higher than about $5 \times 10^{17}/cm^3$ with either N doping or P doping.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

13. (PqN case plus Tunnel plus taper WG plus ultra-highly doped QW) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2 \times n_{ITWCo-z1})$ to a value smaller than half the wavelength in the material $\lambda_{op}/(2 \times n_{ITWCo-z1})$, so that $w_{ITWCo-z1} < \lambda_{op}/(2 \times n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE}<(2*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

At least one of the first P-layer, first N-layer, or the first q-layer contains at least one quantum well. The doping density at the quantum well is in the very-highly-doped, or ultra-highly-doped regime with a dopant density higher than about $1.5 \times 10^{18}/cm^3$ with either N doping or P doping.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

A voltage is applied across the second N-layer of the second PN junction, and the first N-layer of the first PN junction to result in an applied electric field, an electric current, or either injection or depletion of carriers in the electro-active layer.

14. (PqN case plus Tunnel plus taper WG plus ultra-highly doped QW plus top side conduction) An active photonic device deposed on a substrate. The device has at least an input connecting waveguide core deposed on the substrate connecting the energy of an optical beam to and from an electro-active layer. The optical beam has one or more optical wavelengths around an operating optical wavelength $\lambda_{op}$.

The input connecting waveguide core becomes an input tapering waveguide core and enters below an electro-active layer. The optical beam energy is well-confined in the input tapering waveguide core before the tapering waveguide core enters below the electro-active layer. The optical beam energy is no longer well-confined in the input tapering waveguide core at some point after the tapering waveguide core enters below the electro-active layer. The refractive index of the tapering waveguide core is given by $n_{ITWCo-z1}$.

The width $w_{ITWCo-z1}$ of the input tapering waveguide core after penetrating below the electro-active layer is reduced from a value approximately equal to or larger than half the wavelength in the material $\lambda_{op}/(2 \times n_{ITWCo-z1})$ to a value smaller than half the wavelength in the material $\lambda_{op}/(2 \times n\ n_{ITWCo-z1})$, so that $w_{ITWCo-z1} < op/(2 \times n\ n_{ITWCo-z1})$ at some point under the electro-active layer.

The refractive index $n_{EC}$ or the optical gain/absorption coefficient $\alpha_{EC}$ of at least part of the material in the electro-active layer can be altered by an applied electric field, an electric current, or either injection or depletion of carriers in the electro-active layer. The electro-active layer is either part of or in spatial proximity to an electro-active waveguide core.

The electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

The electro-active waveguide core thickness $d_{CORE}$ is in the ultra-thin, very-thin, medium-thin, or thin region such that $d_{CORE} < (2^*\lambda_{op}/n_{Co})$.

A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

At least one of the first P-layer, first N-layer, or the first q-layer contains at least one quantum well. The doping density at the quantum well is in the very-highly-doped, or ultra-highly-doped regime with a dopant density higher than about $1.5 \times 10^{18}/cm^3$ with either N doping or P doping.

The first P-layer is electrically connected to a second P-layer with P-dopant of a second PN junction, referred to as the PN-changing PN junction (PNCPN). This second P-layer is electrically connected to a second N-layer with N-dopant of this second PN junction.

The invention claimed is:

1. An active photonic device (an active photonic device refers to a photonic device that can act as one of the following: an optical amplifier, a laser, a light emitter, a photodetector, an optical modulator, an optical switch, a plasmonic device, or an all-optical device) deposed on a substrate, comprising:

an input connecting waveguide core deposed on the substrate connecting an energy of an optical beam to and from an electro-active layer, the optical beam having one or more optical wavelengths around an operating optical wavelength $\lambda_{op}$;

the input connecting waveguide core becomes an input tapering waveguide core and enters and extends below an electro-active layer, wherein the optical beam energy is well-confined in the input tapering waveguide core before the tapering waveguide core enters below the electro-active layer, and the optical beam energy is no longer well-confined in the input tapering waveguide core at some point after the tapering waveguide core extends below the electro-active layer; and a refractive index $n_{EC}$ or the optical gain/absorption coefficient $\alpha_{EC}$ of at least part of a material in the electro-active layer can be altered by an applied electric field, an electric current, or either injection or depletion of carriers in the electro-active layer, wherein the electro-active layer is either part of or in spatial proximity to an electro-active waveguide core.

2. The device as claimed in claim 1, wherein the electro-active waveguide core and an electro-active waveguide cladding structure is in a medium-strongly guiding or very-strongly guiding regime such that a refractive index contrast of the waveguide core layer with both a top and a bottom waveguide cladding defined by: $R_{cts}=(n_{Co}^2-n_{Cd}^2)/(n_{Co}^2+n_{Cd}^2)$ are both larger than about 0.2, where $n_{Cd}$ is the averaged material refractive index of either the top or the bottom waveguide cladding region, and $n_{Co}$ is the averaged material refractive index of the waveguide core region.

3. The device as claimed in claim 1, wherein the electro-active waveguide core and electro-active waveguide cladding structure is in a very-strongly guiding regime such that the refractive index contrast of the waveguide core layer with both the top and the bottom waveguide cladding defined by: $R_{cts}=n_{Co}^2-n_{Cd}^2)/n_{Co}^2+n_{Cd}^2)$ are both larger than about 0.5, where $n_{Cd}$ is the averaged material refractive index of either the top or the bottom waveguide cladding region, and $n_{Co}$ is the averaged material refractive index of the waveguide core region.

4. The device as claimed in claim 1, wherein the electro-active waveguide core thickness $d_{CORE}$ is in the ultra-thin, very-thin, medium-thin, or thin region such that $d_{CORE} < (2^*\lambda_{op}/n_{Co})$.

5. The device as claimed in claim 1, wherein the electro-active waveguide core thickness $d_{CORE}$ is in the ultra-thin region or very-thin region such that $d_{CORE} < (\lambda_{op}/n_{Co})$.

6. The device as claimed in claim 1, wherein the electro-active layer has a low-refractive-index Ohmic transparent conductor (LRI-OTC) layer electrically connected from the top to the electro-active layer, wherein the LRI-OTC forms part of the top electro-active waveguide cladding.

7. The device as claimed in claim 1, further comprising A structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

8. The device as claimed in claim 7, wherein a voltage is applied across the first P-layer of this first PN junction, and the first N-layer of the first PN junction to result in an applied electric field, an electric current, or either injection or depletion of carriers in the electro-active layer.

9. The device as claimed in claim 7, wherein a voltage is applied across the second N-layer of the second PN junction, and the first N-layer of the first PN junction to result in an applied electric field, an electric current, or either injection or depletion of carriers in the electro-active layer.

10. The device as claimed in claim 1, further comprising a structure electrically connected to the electro-active layer comprises at least a first NqN junction in which a first N-layer with N-dopant is vertically connected (vertical means in a direction perpendicular to the substrate plane; horizontal means in a direction parallel to the substrate plane) to a first q-layer with either N or P dopant or that is undoped (i.e. being an Intrinsic semiconductor material) and the first q-layer is further connected to a second N-layer with N-dopant.

11. The device as claimed in claim 10, wherein a voltage is applied across the first N-layer and the second N-layer of this first NqN junction to result in an applied electric field, an electric current, or either injection or depletion of carriers in the electro-active layer.

12. An active photonic device (an active photonic device refers to a photonic device that can act as one of the following: an optical amplifier, a laser, a light emitter, a photodetector, an optical modulator, an optical switch, a plasmonic device, or an all-optical device) deposed on a substrate, comprising:
- an input connecting waveguide core deposed on the substrate connecting an energy of an optical beam to and from an electro-active layer, the optical beam having one or more optical wavelengths around an operating optical wavelength $\lambda_{op}$;
- the input connecting waveguide core becomes an input tapering waveguide core and enters and extends below an electro-active layer, wherein the optical beam energy is well-confined in the input tapering waveguide core before the tapering waveguide core enters below the electro-active layer, and the optical beam energy is no longer well-confined in the input tapering waveguide core at some point after the tapering waveguide core extends below the electro-active layer and the refractive index of the tapering waveguide core is given by $n_{ITWCo-z1}$;
- a refractive index $n_{EC}$ or the optical gain/absorption coefficient $n_{EC}$ of at least part of a material in the electro-active layer can be altered by an applied electric field, an electric current, or either injection or depletion of carriers in the electro-active layer, wherein the electro-active layer is either part of or in spatial proximity to an electro-active waveguide core; and
- the width $w_{ITWCo-z1}$ of the input tapering waveguide core after penetrating below the electro-active layer is reduced from a value approximately equal to or larger than half the wavelength in the material $\lambda_{pp}/(2\times n_{ITWCo-z1})$ to a value smaller than half the wavelength in the material $\lambda_{op}/(2\times n_{ITWCo-z1})$, so that $w_{ITWCo-z1}<\lambda_{op}/(2\times n_{ITWCo-z1})$ at some point under the electro-active layer,
- wherein the electro-active waveguide core and electro-active waveguide cladding structure is in a medium-strongly guiding or very-strongly guiding regime such that the refractive index contrast of the waveguide core layer with both the top and the bottom waveguide cladding defined by: $R_{cts}=n_{Co}^2-n_{Cd}^2)/(n_{Co}^2+n_{Cd}^2)$ are both larger than about 0.5, where $n_{Cd}$ is the averaged material refractive index of either the top or the bottom waveguide cladding region, and $n_{Co}$ is the averaged material refractive index of the waveguide core region.

13. The device as claimed in claim 12, wherein the electro-active waveguide core thickness $d_{CORE}$ is in the ultra-thin, very-thin, medium-thin, or thin region such that $d_{CORE}<(2*\lambda_{op}/n_{Co})$.

14. The device as claimed in claim 12, further comprising a structure electrically connected to the electro-active layer comprises at least a first PN junction in which a first P-layer with P-dopant is vertically connected (vertical means in a direction perpendicular to the substrate plane; horizontal means in a direction parallel to the substrate plane) to a first N-layer with N-dopant, or a PqN junction in which a first P-layer with P-dopant is connected to a first q-layer with either N or P dopant or that is undoped (i.e. being an Intrinsic semiconductor material) and the q-layer is further connected to a first N-layer with N-dopant.

15. The device as claimed in claim 14, further comprising a second P-layer with P-dopant of a second PN junction, wherein second P-layer is electrically connected to a second N-layer with N-dopant of this second PN junction, wherein a voltage is applied across the second N-layer of the second PN junction, and the first N-layer of the first PN junction to result in an applied electric field, an electric current, or either injection or depletion of carriers in the electro-active layer.

16. The device as claimed in claim 14, wherein at least one of the first P-layer, first N-layer, or the first q-layer contains at least one quantum well, wherein the doping density at the quantum well is in the highly-doped, medium-highly-doped, very-highly-doped, or ultra-highly-doped regime with a dopant density higher than about $2\times10^{17}/cm^3$ with either N doping or P doping.

17. The device as claimed in claim 14, wherein at least one of the first P-layer, first N-layer, or the first q-layer contains at least one quantum well, wherein the doping density at the quantum well is in the medium-highly-doped, very-highly-doped, or ultra-highly-doped regime with a dopant density higher than about $5\times10^{17}/cm^3$ with either N doping or P doping.

18. The device as claimed in claim 14, wherein at least one of the first P-layer, first N-layer, or the first q-layer contains at least one quantum well, wherein the doping density at the quantum well is in the very-highly-doped, or ultra-highly-doped regime with a dopant density higher than about $1.5\times10^{18}/cm^3$ with either N doping or P doping.

19. An active photonic device (an active photonic device refers to a photonic device that can act as one of the following: an optical amplifier, a laser, a light emitter, a photodetector, an optical modulator, an optical switch, a plasmonic device, or an all-optical device) deposed on a substrate, comprising:
- an input connecting waveguide core deposed on the substrate connecting an energy of an optical beam to and from an electro-active layer, the optical beam having one or more optical wavelengths around an operating optical wavelength $\lambda_{op}$;
- the input connecting waveguide core becomes an input tapering waveguide core and enters and extends below an electro-active layer, wherein the optical beam energy is well-confined in the input tapering waveguide core before the tapering waveguide core enters below the electro-active layer, and the optical beam energy is no longer well-confined in the input tapering waveguide core at some point after the tapering waveguide core extends below the electro-active layer; and
- a refractive index $n_{EC}$ or the optical gain/absorption coefficient $\alpha_{EC}$ of at least part of a material in the electro-active layer can be altered by an optical beam, an applied electric field, an electric current, or either injection or depletion of carriers in the electro-active layer, wherein the electro-active layer is either part of or in spatial proximity to an electro-active waveguide core, wherein an electro-active waveguide core and electro-active waveguide cladding structure is in a medium-strongly guiding or very-strongly guiding regime such that the refractive index contrast of the waveguide core layer with both a top and a bottom waveguide cladding defined by: $R_{cts}=(n_{Co}^2-n_{Cd}^2)/(n_{Co}^2+n_{Cd}^2)$ are both larger than about 0.5, where $n_{Cd}$ is the averaged material refractive index of either the top or the bottom waveguide cladding, and $n_{Co}$ is the averaged material refractive index of the electro-active waveguide core.

* * * * *